(12) United States Patent
Blagg et al.

US012517130B2

(10) Patent No.: US 12,517,130 B2
(45) Date of Patent: Jan. 6, 2026

(54) ISOINDOLINE DERIVATIVES WHICH BIND TO AN ATP BINDING SITE

(71) Applicant: NeoPhore Limited, Altrincham (GB)

(72) Inventors: Julian Blagg, Altrincham (GB); Jonathan Richard Anthony Roffey, Altrincham (GB); Paul Colin Michael Winship, Saffron Walden (GB); Gareth William Langley, Saffron Walden (GB)

(73) Assignee: NeoPhore Limited, Altrincham (GB)

( * ) Notice: Subject to any disclaimer, the term of this patent is extended or adjusted under 35 U.S.C. 154(b) by 757 days.

(21) Appl. No.: 17/793,912

(22) PCT Filed: Jan. 20, 2021

(86) PCT No.: PCT/GB2021/050122
§ 371 (c)(1),
(2) Date: Jul. 19, 2022

(87) PCT Pub. No.: WO2021/148786
PCT Pub. Date: Jul. 29, 2021

(65) Prior Publication Data
US 2023/0061002 A1    Mar. 2, 2023

(30) Foreign Application Priority Data

Jan. 20, 2020   (GB) ..................................... 2000789
Mar. 11, 2020   (GB) ..................................... 2003559

(51) Int. Cl.
*G01N 33/573*     (2006.01)
*C07D 209/44*     (2006.01)
*G01N 33/68*      (2006.01)

(52) U.S. Cl.
CPC ......... *G01N 33/573* (2013.01); *C07D 209/44* (2013.01); *G01N 33/6875* (2013.01); *G01N 2333/922* (2013.01)

(58) Field of Classification Search
CPC ............... C07D 209/44; G01N 33/573; G01N 33/6875
See application file for complete search history.

(56) References Cited

U.S. PATENT DOCUMENTS

| | | |
|---|---|---|
| 2005/0245741 A1 | 11/2005 | Hossain et al. |
| 2011/0098290 A1 | 4/2011 | Williams et al. |
| 2013/0210820 A1 | 8/2013 | Williams et al. |
| 2018/0016274 A1 | 1/2018 | Stockley et al. |
| 2019/0375732 A1 | 12/2019 | Hung et al. |
| 2023/0061002 A1 | 3/2023 | Blagg et al. |
| 2023/0183197 A1 | 6/2023 | Blagg et al. |

FOREIGN PATENT DOCUMENTS

| | | |
|---|---|---|
| WO | WO-2006/117669 A1 | 11/2006 |
| WO | WO-2008/044027 A2 | 4/2008 |
| WO | WO-2008/044034 A1 | 4/2008 |
| WO | WO-2008/044054 A2 | 4/2008 |
| WO | WO-2009/060835 A1 | 5/2009 |
| WO | WO-2009/125230 A1 | 10/2009 |
| WO | WO-2013/106643 A2 | 7/2013 |
| WO | WO-2015/038649 A1 | 3/2015 |
| WO | WO-2017/182783 A2 | 10/2017 |
| WO | WO-2018/013840 A1 | 1/2018 |
| WO | WO-2018/132769 A1 | 7/2018 |
| WO | WO-2019/014600 A1 | 1/2019 |
| WO | WO-2019/118830 A1 | 6/2019 |
| WO | WO-2019/195384 A1 | 10/2019 |
| WO | WO-2020/014409 A1 | 1/2020 |
| WO | WO-2020/104820 A1 | 5/2020 |
| WO | WO-2021/148786 A1 | 7/2021 |
| WO | WO-2021/245405 A1 | 12/2021 |
| WO | WO-2023/002165 A1 | 1/2023 |
| WO | WO-2024/153947 A1 | 7/2024 |

OTHER PUBLICATIONS

Geng et al., "Design, synthesis and pharmacological evaluation of ALK and Hsp90 dual inhibitors bearing resorcinol and 2,4-diaminopyrimidine motifs," European Journal of Medicinal Chemistry, 152: 76-86 (2018).
Howes et al., "A fluorescence polarization assay for inhibitor of HSP90," Analytical Biochemistry, 350(2): 202-213 (2006).
International Search Report and Written Opinion for International Application No. PCT/GB2021/050122 dated Mar. 26, 2021.
United Kingdom Search Report for United Kingdom Application No. GB2000789.4 dated Jul. 28, 2020.
United Kingdom Search Report for United Kingdom Application No. GB2003559.8 dated Aug. 24, 2020.
International Preliminary Report on Patentability for International Application No. PCT/GB2021/050122 dated Jul. 26, 2022.
CAS Registry, RN 1205503-07-6, Entered STN: Feb. 10, 2010.
CAS Registry, RN 1205503-88-3, Entered STN: Feb. 10, 2010.
CAS Registry, RN 1205651-62-2, Entered STN: Feb. 10, 2010.
CAS Registry, RN 1205956-70-2, Entered STN: Feb. 11, 2010.
CAS Registry, RN 1787791-23-4, Entered STN: Jun. 24, 2015.
CAS Registry, RN 1787938-12-8, Entered STN: Jun. 24, 2015.
CAS Registry, RN 1789367-78-7, Entered STN: Jun. 26, 2015.
CAS Registry, RN 1789647-37-5, Entered STN: Jun. 26, 2015.
CAS Registry, RN 2175533-83-0, Entered STN: Feb. 18, 2018.
CAS Registry, RN 2176339-35-6, Entered STN: Feb. 19, 2018.
CAS Registry, RN 2178341-19-8, Entered STN: Feb. 22, 2018.
CAS Registry, RN 2178690-92-9, Entered STN: Feb. 22, 2018.
CAS Registry, RN 2308309-15-9, Entered STN: May 15, 2019.
CAS Registry, RN 2308341-72-0, Entered STN: May 15, 2019.
CAS Registry, RN 2309215-16-3, Entered STN: May 16, 2019.
CAS Registry, RN 2309421-83-6, Entered STN: May 16, 2019.
CAS Registry, RN 2309595-03-5, Entered STN: May 17, 2019.

(Continued)

*Primary Examiner* — Kamal A Saeed
(74) *Attorney, Agent, or Firm* — Foley Hoag LLP; David P. Halstead; Alexander J. Chatterley

(57) ABSTRACT

The present invention relates to novel probe compounds of formulae I and II defined herein. The present invention also relates to methods of synthesising these novel probe compounds and to their use in assays and screens for determining the binding of a test molecule to the ATP-binding site of a target protein, such as, for example, the Mismatch Repair (MMR) component proteins PMS2 and MLH1, or for determining the location and/or quantity of such target proteins in a biological sample.

18 Claims, 11 Drawing Sheets

(56) References Cited

OTHER PUBLICATIONS

CAS Registry, RN 2309697-85-4, Entered STN: May 17, 2019.
CAS Registry, RN 2309799-38-8, Entered STN: May 17, 2019.
CAS Registry, RN 2309872-58-8, Entered STN: May 17, 2019.
CAS Registry, RN 2319690-79-2, Entered STN: May 28, 2019.
CAS Registry, RN 2319779-92-3, Entered STN: May 29, 2019.
CAS Registry, RN 2319894-26-1, Entered STN: May 29, 2019.
CAS Registry, RN 2319910-48-8, Entered STN: May 29, 2019.
CAS Registry, RN 2320038-07-9, Entered STN: May 29, 2019.
CAS Registry, RN 2320127-11-3, Entered STN: May 29, 2019.
CAS Registry, RN 2320200-21-1, Entered STN: May 29, 2019.
CAS Registry, RN 2320354-64-9, Entered STN: May 29, 2019.
CAS Registry, RN 2320366-84-3, Entered STN: May 29, 2019.
CAS Registry, RN 2320527-80-6, Entered STN: May 29, 2019.
CAS Registry, RN 2320687-14-5, Entered STN: May 30, 2019.
CAS Registry, RN 2320826-51-3, Entered STN: May 30, 2019.
CAS Registry, RN 2323186-97-4, Entered STN: Jun. 3, 2019.
CAS Registry, RN 2323202-04-4, Entered STN: Jun. 3, 2019.
CAS Registry, RN 2323321-41-9, Entered STN: Jun. 3, 2019.
CAS Registry, RN 2323832-22-8, Entered STN: Jun. 4, 2019.
CAS Registry, RN 2323865-95-6, Entered STN: Jun. 4, 2019.
CAS Registry, RN 2323926-99-2, Entered STN: Jun. 4, 2019.
CAS Registry, RN 2324489-57-6, Entered STN: Jun. 5, 2019.
CAS Registry, RN 2370266-61-6, Entered STN: Aug. 30, 2019.
CAS Registry, RN 2370706-42-4, Entered STN: Aug. 30, 2019.
CAS Registry, RN 2371690-58-1, Entered STN: Sep. 1, 2019.
CAS Registry, RN 2372664-35-0, Entered STN: Sep. 3, 2019.
CAS Registry, RN 2372772-96-6, Entered STN: Sep. 3, 2019.
CAS Registry, RN 2373061-79-9, Entered STN: Sep. 3, 2019.
CAS Registry, RN 2373874-32-7, Entered STN: Sep. 4, 2019.
CAS Registry, RN 2389560-46-5, Entered STN: Dec. 12, 2019.
CAS Registry, RN 2390800-65-2, Entered STN: Dec. 15, 2019.
CAS Registry, RN 2401412-76-6, Entered STN: Jan. 7, 2020.
CAS Registry, RN 2405499-84-3, Entered STN: Jan. 13, 2020.
CAS Registry, RN 2406731-67-5, Entered STN: Jan. 14, 2020.
Database CA [Online], Chemical Abstracts Service, Columbus, Ohio, US; Kimura, Shinya et al: ""Preparation of 2H-chromen-2-one, 1,2-dihydroquinolin-2-one, and 3H-isoquinolin-3-one derivatives having ubiquitin-binding activity"", XP002803853, retrieved from STN Database accession No. 2009:580918 abstract & WO 2009/060835 AI (Univ Kyoto [JP]; Riken [JP] et al.) May 14, 2009 (May 14, 2009).
Database Chemcats [Online], Chemical Abstracts Service, Columbus, Ohio, US; Feb. 27, 2020 (Feb. 27, 2020), Aurora Screening Compounds 3: XP002803852, Database accession No. 1915233285, 1857559366, 1506809590, 1300807168, AN: 1113588225, AN: 0652247019, AN: 0580432166, AN: 0373840129 corresponding to RN: 2472069-33-1, RN: 2402034-10-8, RN: 2403532-27-2, RN: 2405990-30-7, RN: 2373605-21-9, RN: 2471417-65-7.
International Search Report and Written Opinion for International Application No. PCT/GB21/51349, mailed Aug. 20, 2021.
International Search Report and Written Opinion for International Application No. PCT/GB24/50147 dated Apr. 2, 2024.
Leenders et al., "Cancer prevention by aspirin in children with Constitutional Mismatch Repair Deficiency (CMMRD)," European Journal of Human Genetics, 26: pp. 1417-1423 (2018).
Thornber, "Isosterism and molecular modification in drug design." Chemical Society Reviews 8.4 (1979): 563-580.
United Kingdom Search Report for GB Application No. 2300881.6 dated Jul. 14, 2023.

Example 6

ISOINDOLINE DERIVATIVES WHICH BIND TO AN ATP BINDING SITE

This Application is a U.S. National Stage filing under 35 U.S.C. § 371 of PCT Application No. PCT/GB2021/050122, filed Jan. 20, 2021, which claims priority from United Kingdom Patent Application No. 2003559.8 filed on Mar. 11, 2020, in the United Kingdom and United Kingdom Patent Application No. 2000789.4, filed on Jan. 20, 2020 in the United Kingdom. The contents of International Patent Application PCT/GB2021/050122 are incorporated herein by reference in their entirety.

The present invention relates to novel probe molecules. The present invention also relates to methods of synthesising these novel probe molecules and to their use in assays and screens for determining the binding of a test molecule to the ATP-binding site of a target protein, such as, for example, the Mismatch Repair (MMR) component proteins PMS2 and MLH1, or for determining the location and/or quantity of such target proteins in a biological sample.

BACKGROUND

The GHKL-family of ATPases comprise the chaperone protein HSP90 [1], the Mismatch Repair (MMR) component proteins PMS2 and MLH1 [2] as well as DNA Gyrase—a bacterial type II topoisomerase enzyme that catalyzes the super-coiling of double-stranded DNA [3]. Each member of the GHKL family harbors an ATP-binding site and ATP-binding is known to be important for the function of GHKL family proteins [4].

ATP-competitive inhibitors of HSP90 have shown utility as anticancer agents [5,6] and ATP-competitive fluorescent probes have been reported for the discovery of compounds that bind to the ATP-binding site of HSP90 and displace the fluorescent probe [7]. In such assays, fluorescent dye molecules that are attached to a small ligand (so called fluorescence probe molecule) that rapidly rotates and disrupts the plane of polarized light prior to emission resulting in low fluorescence polarisation. Binding of the probe molecule to a slowly rotating protein, such as HSP90, results in high fluorescence polarisation; displacement of the probe molecule by a test ligand results in a concentration-dependent reduction in fluorescence polarisation. Thus, fluorescence polarisation can be applied to provide a direct quantitative readout of the extent of binding of test compounds to a protein such as Hsp90 [7, 8] or DNA Gyrase [9].

Surprisingly, it has been discovered that commercially available ATP-derived fluorescent probes such as BODIPY-FL-ATP-gamma-S (Invitrogen), EDA-AMPPNP-5/6-TAMRA (Jena Bioscience GmbH) and EDA-AMPPNP-Cy5 (Jena Bioscience GmbH) demonstrate no signal in a fluorescence polarisation assay conducted according to the type of protocol exemplified herein and also demonstrate very weak binding by surface plasmon resonance to the N-terminal domain of MLH1. These probes are therefore unsuitable for use as fluorescence polarisation screening tools.

There is therefore a need for further probe compounds that demonstrate improved binding to the ATP-binding site of GHKL family members MLH1 and PMS2 and which are therefore suitable for use as fluorescence polarisation screening tools.

The present invention was devised with the foregoing in mind.

BRIEF SUMMARY OF THE DISCLOSURE

The present invention resides in the discovery of a new series of probe compounds that effectively bind to the ATP-binding site of the GHKL-family proteins MLH1 and PMS2.

These probe compounds can be used in assays and methods for assessing the binding affinity of test compounds to the ATP-binding site of MLH1 and PMS2. In addition, these probe compounds can be used to determine the location and/or quantity of MLH1 or PMS2 in a biological sample.

In a first aspect, the present invention provides a probe compound of formula I or II, or a salt thereof, as defined herein.

In another aspect, the present invention provides a method of synthesising a probe compound of formula I or II, or a salt thereof, as defined herein.

In another aspect, the present invention provides the use of a probe compound of formula I, or a salt thereof, in a displacement assay to determine the binding affinity of a test molecule to the ATP-binding site of a target protein. In an embodiment, the target protein is selected from MLH1, PMS2 or HSP90. In a particular embodiment, the target protein is MLH1 or PMS2.

In another aspect, the present invention provides a probe compound of formula I, or a salt thereof, for use in a displacement assay to determine the binding affinity of a test molecule for the ATP-binding site of a target protein. In an embodiment, the target protein is selected from MLH1, PMS2 or HSP90. In a particular embodiment, the target protein is MLH1 or PMS2.

In another aspect, the present invention provides an assay for determining the binding affinity of a test molecule for the ATP-binding site of a target protein, the assay comprising:
(i) incubating a test molecule with the target protein in the presence of a probe compound of formula I, or a salt thereof, as defined herein; and
(ii) determining whether a probe compound of the formula I is displaced from the ATP-binding site of the target protein.

In an embodiment, the target protein is selected from MLH1, PMS2 or HSP90. In a particular embodiment, the target protein is MLH1 or PMS2.

In another aspect, the present invention provides a method for determining the binding affinity of a test molecule for the ATP-binding site of a target protein, the assay comprising:
(i) incubating a test molecule with the target protein in the presence of a probe compound of formula I, or a salt thereof, as defined herein; and
(ii) determining whether a probe compound of the formula I is displaced from the ATP-binding site of the target protein.

In another aspect, the present invention provides an assay for determining the location and/or quantity of a target protein present within a biological sample, the assay comprising:
(i) contacting the biological sample with a probe compound of formula I, or a salt thereof, as defined herein; and
(ii) determining location and/or quantity of the compound of formula I present within the sample by detecting the location and/or intensity of the detection moieties of the compounds of formula I present within the biological sample.

In another aspect, the present invention provides an assay for determining the location and/or quantity of a target protein present within a biological sample, the assay comprising:
(i) contacting the biological sample with a probe compound of formula II, or a salt thereof, as defined herein; and
(ii) contacting the biological sample with a detection moiety Q, or a compound of the formula Q-$L_2$-Y as defined herein, that is capable of reacting with the functional group X present on the compound of formula II to form a compound of formula I in situ within the biological sample;
(iii) determining location and/or quantity of the compound of formula I present within the sample by detecting the location and/or intensity of the detection moieties of the compounds of formula I present within the biological sample.

In another aspect, the present invention provides a method for determining the location and/or quantity of a target protein present within a biological sample, the method comprising:
(i) contacting the biological sample with a probe compound of formula I, or a salt thereof, as defined herein; and
(ii) determining location and/or quantity of the compound of formula I present within the sample by detecting the location and/or intensity of the detection moieties of the compounds of formula I present within the biological sample.

In another aspect, the present invention provides a method for determining the location and/or quantity of a target protein present within a biological sample, the method comprising:
(i) contacting the biological sample with a probe compound of formula II, or a salt thereof, as defined herein; and
(ii) contacting the biological sample with a detection moiety Q, or a compound of the formula Q-$L_2$-Y as defined herein, that is capable of reacting with the functional group X present on the compound of formula II to form a compound of formula I in situ within the biological sample;
(iii) determining location and/or quantity of the compound of formula I present within the sample by detecting the location and/or intensity of the detection moieties of the compounds of formula I present within the biological sample.

In an embodiment, the target protein is selected from MLH1, PMS2 or HSP90. In a particular embodiment, the target protein is MLH1 or PMS2.

DETAILED DESCRIPTION

Definitions

Unless otherwise stated, the following terms used in the specification and claims have the following meanings set out below.

In this specification the term "alkyl" includes both straight and branched chain alkyl groups. References to individual alkyl groups such as "propyl" are specific for the straight chain version only and references to individual branched chain alkyl groups such as "isopropyl" are specific for the branched chain version only. For example, "(1-6C)alkyl" includes (1-4C)alkyl, (1-3C)alkyl, propyl, isopropyl and t butyl. A similar convention applies to other radicals, for example "cycloalkyl(1-2C)alkyl" includes cyclopropylmethyl, 1-cyclopropylethyl, 2-cyclopropylethyl etc.

The term "(m-nC)" or "Cm-n", or "(m-nC) group" or "Cm-n" used alone or as a prefix, refers to any group having m to n carbon atoms.

An "alkylene" group is an alkyl group that is positioned between and serves to connect two other chemical groups. Thus, "(3-20C)alkylene" means a linear saturated divalent hydrocarbon radical of one to three carbon atoms or a branched saturated divalent hydrocarbon radical of three atoms, for example, methylene, ethylene, propylene, and the like.

The term "(m-nC)cycloalkyl" means a hydrocarbon ring containing from m to n carbon atoms, for example "(3-6C)cycloalkyl" means a hydrocarbon ring containing from 3 to 6 carbon atoms, for example, cyclopropyl, cyclobutyl, cyclopentyl, cyclohexyl. The term "(m-nC)cycloalkyl" also encompasses non-aromatic saturated or partially saturated monocyclic carbocyclic ring system(s).

The term "halo" or "halogeno" refers to fluoro, chloro, bromo and iodo.

The term "optionally substituted" refers to either groups, structures, or molecules that are substituted and those that are not substituted.

Where optional substituents are chosen from "one or more" groups it is to be understood that this definition includes all substituents being chosen from one of the specified groups or the substituents being chosen from two or more of the specified groups.

The phrase "compound of the invention" means those compounds which are disclosed herein, both generically and specifically.

Probe Compounds

The present invention relates to a probe compound of formula I or II, or a salt thereof:

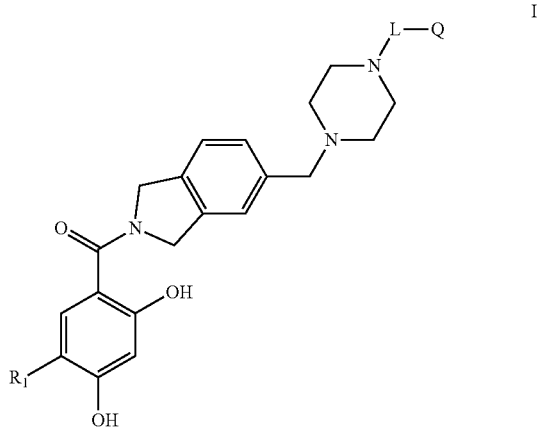

-continued

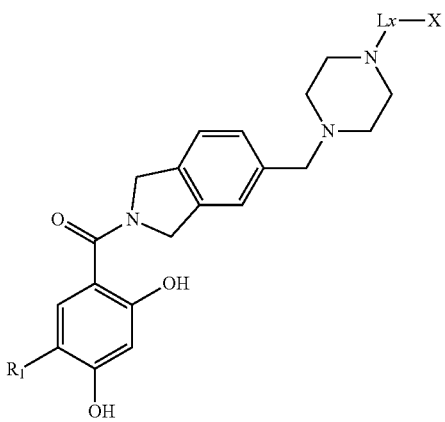

II wherein:
R$_1$ is halo or a (1-6C)alkyl, (3-6C)cycloalkyl or (3-4C)cycloalkyl-(1-2C)alkyl group, each of which is optionally substituted by one or more substituents selected from halo, cyano or hydroxy;
L is a linker;
Q is a detection moiety;
L$_x$ is a linker; and
X is a functional group.

Particular probe compounds of the invention include probe compounds of formula I or II, or a salt thereof, wherein R$_1$, L, Q, L$_x$ and X are each as defined herein before, or are as defined in any one of the following paragraphs (1) to (56):

(1) R$_1$ is halo or a (1-6C)alkyl, (3-4C)cycloalkyl or (3-4C)cycloalkyl-(1-2C)alkyl group, each of which is optionally substituted by one or more halo substituents;
(2) R$_1$ is halo or a (1-6C)alkyl, (3-4C)cycloalkyl or (3-4C)cycloalkyl-(1C)alkyl group, each of which is optionally substituted by one or more halo substituents;
(3) R$_1$ is halo or a (1-6C)alkyl, (3-4C)cycloalkyl or (3-4C)cycloalkyl-(1C)alkyl group, each of which is optionally substituted by one or more fluoro substituents;
(4) R$_1$ is fluoro, chloro or a (1-6C)alkyl, (3-4C)cycloalkyl or (3-4C)cycloalkyl-(1C)alkyl group, each of which is optionally substituted by one or more fluoro substituents;
(5) R$_1$ is a (1-6C)alkyl, (3-4C)cycloalkyl or (3-4C)cycloalkyl-(1C)alkyl group, each of which is optionally substituted by one or more fluoro substituents;
(6) R$_1$ is a (1-6C)alkyl group, which is optionally substituted by one or more fluoro substituents;
(7) R$_1$ is a (1-4C)alkyl group;
(8) R$_1$ is selected from methyl, ethyl, propyl, isopropyl, butyl, sec-butyl, tert-butyl, cyclopropyl, cyclopropylmethyl, cyclobutyl, trifluoromethyl;
(9) R$_1$ is isopropyl;
(10) L is a (2-20C)alkylene linker, wherein the alkylene chain optionally further comprises one or more —O—, —C(O)—, —C(O)NR$_{10}$—, —NR$_{10}$C(O)—, —C(O)O—, —OC(O)— or triazole ring linkages positioned either within the alkylene chain and/or at one of its termini, wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.
(11) L is a (3-20C)alkylene linker, wherein the alkylene chain optionally further comprises one or more —O—, —C(O)—, —C(O)NR$_{10}$—, —NR$_{10}$C(O)—, —C(O)O—, —OC(O)— or triazole ring linkages positioned either within the alkylene chain and/or at one of its termini, wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.
(12) L is a (2-20C)alkylene linker, wherein the alkylene chain further comprises one to eight —O— linkages and/or one to four —C(O)—, —C(O)NR$_{10}$—, —NR$_{10}$C(O)—, —C(O)O—, —OC(O)— or triazole ring linkages positioned either within the alkylene chain and/or at one of its termini;
wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.
(13) L is a (3-20C)alkylene linker, wherein the alkylene chain further comprises one to eight —O— linkages and/or one to four —C(O)—, —C(O)NR$_{10}$—, —NR$_{10}$C(O)—, —C(O)O—, —OC(O)— or triazole ring linkages positioned either within the alkylene chain and/or at one of its termini;
wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.
(14) L is a (2-18C)alkylene linker, wherein the alkylene chain optionally further comprises one to five —O— linkages; and/or one to four —C(O)—, —C(O)NR$_{10}$—, —NR$_{10}$C(O)—, —C(O)O—, —OC(O)— linkages or one triazole ring linkage positioned either within the alkylene chain and/or at one of its termini,
wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.
(15) L is a (3-12C)alkylene linker, wherein the alkylene chain optionally further comprises one to five —O— linkages; and/or one to four —C(O)—, —O(O)NR$_{10}$—, —NR$_{10}$C(O)—, —C(O)O—, —OC(O)— or triazole ring linkages positioned either within the alkylene chain and/or at one of its termini,
wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.
(16) L is a (2-18C)alkylene linker, wherein the alkylene chain further comprises one to five —O— linkages and/or one to three —C(O)—, —C(O)NR$_{10}$— or —NR$_{10}$C(O)— linkages or one triazole ring linkage positioned either within the alkylene chain and/or at one of its termini;
wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.
(17) L is a (3-12C)alkylene linker, wherein the alkylene chain further comprises one to five —O— linkages and/or one to three —C(O)—, —C(O)NR$_{10}$— or —NR$_{10}$C(O)— linkages or one triazole ring linkages positioned either within the alkylene chain and/or at one of its termini;

wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.

(18) L is a (2-18C)alkylene linker, wherein the alkylene chain further comprises one to five —O— linkages and/or one to three —C(O)—, —C(O)NR$_{10}$— or —NR$_{10}$C(O)— linkages or one triazole ring linkage positioned either within the alkylene chain and/or at one of its termini and wherein R$_{10}$ is hydrogen or (1-2C)alkyl.

(19) L is a (3-12C)alkylene linker, wherein the alkylene chain further comprises one to five —O— linkages and/or one to three —C(O)—, —C(O)NR$_{10}$— or —NR$_{10}$C(O)— linkages or one triazole ring linkage positioned either within the alkylene chain and/or at one of its termini and wherein R$_{10}$ is hydrogen or (1-2C)alkyl.

(20) L is a (2-18C)alkylene linker, wherein the alkylene chain further comprises one to three —O— linkages and/or one to three —C(O)—, —C(O)NR$_{10}$— or —NR$_{10}$C(O)— linkages or one triazole ring linkage positioned either within the alkylene chain and/or at one of its termini, and wherein R$_{10}$ is hydrogen or (1-2C)alkyl.

(21) L is a (3-12C)alkylene linker, wherein the alkylene chain further comprises one to three —O— linkages and/or one to three —C(O)—, —C(O)NR$_{10}$— or —NR$_{10}$C(O)— linkages or one triazole ring linkage positioned either within the alkylene chain and/or at one of its termini, and wherein R$_{10}$ is hydrogen or (1-2C)alkyl.

(22) L is a (2-18C)alkylene linker, wherein the alkylene chain further comprises one linkage and/or one —C(O)—, —C(O)NR$_{10}$— or —NR$_{10}$C(O)— linkage or one triazole ring linkage positioned either within the alkylene chain and/or at one of its termini, and wherein R$_{10}$ is hydrogen or (1-2C)alkyl.

(23) L is a (3-12C)alkylene linker, wherein the alkylene chain further comprises one —O— linkage and/or one —C(O)—, —C(O)NR$_{10}$— or —NR$_{10}$C(O)— linkage or one triazole ring linkage positioned either within the alkylene chain and/or at one of its termini, and wherein R$_{10}$ is hydrogen or (1-2C)alkyl.

(24) L is a (2-17C)alkylene linker, wherein the alkylene chain optionally further comprises one to four —O— linkages and/or one to three —C(O)—, —C(O)NR$_{10}$—, —NR$_{10}$C(O)—, —C(O)O—, —OC(O)— or triazole ring linkages positioned either within the alkylene chain and/or at one of its termini;

wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.

(25) L is a (3-10C)alkylene linker, wherein the alkylene chain optionally further comprises one to four —O— linkages and/or one to three —C(O)—, —C(O)NR$_{10}$—, —NR$_{10}$C(O)—, —C(O)O—, —OC(O)— or triazole ring linkages positioned either within the alkylene chain and/or at one of its termini;

wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.

(26) L is a (2-17C)alkylene linker, wherein the alkylene chain further comprises one to four —O— linkages; and/or one to three —C(O)—, —C(O)NR$_{10}$—, —NR$_{10}$C(O)—, —C(O)O—, —OC(O)— or triazole ring linkages positioned either within the alkylene chain and/or at one of its termini;

wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.

(27) L is a (3-10C)alkylene linker, wherein the alkylene chain further comprises one to four —O— linkages; and/or one to three —C(O)—, —C(O)NR$_{10}$—, —NR$_{10}$C(O)—, —C(O)O—, —OC(O)— or triazole ring linkages positioned either within the alkylene chain and/or at one of its termini;

wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.

(28) L is a (2-17C)alkylene linker, wherein the alkylene chain further comprises one to four —O— linkages and/or one to three —C(O)—, —C(O)NR$_{10}$—, —NR$_{10}$C(O)— or triazole ring linkages positioned either within the alkylene chain and/or at one of its termini;

wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.

(29) L is a (3-10C)alkylene linker, wherein the alkylene chain further comprises one to four —O— linkages and/or one to three —C(O)—, —C(O)NR$_{10}$—, —NR$_{10}$C(O)— or triazole ring linkages positioned either within the alkylene chain and/or at one of its termini;

wherein R$_{10}$ is hydrogen or (1-2C)alkyl and wherein the alkylene chain is optionally substituted by one or more substituents independently selected from halo, hydroxy, cyano, amino, (1-2C)alkyl, (1-2C)hydroxyalkyl, (1-2C)haloalkyl or (1-2C)alkoxy.

(30) L is a (2-17C)alkylene linker, wherein the alkylene chain further comprises one to four —O— linkages and/or one to three —C(O)—, —C(O)NR$_{10}$— or —NR$_{10}$C(O)— linkages or one triazole ring linkage positioned either within the alkylene chain and/or at one of its termini, and wherein R$_{10}$ is hydrogen or (1-2C)alkyl.

(31) L is a (3-10C)alkylene linker, wherein the alkylene chain further comprises one to four —O— linkages and/or one to three —C(O)—, —C(O)NR$_{10}$— or —NR$_{10}$C(O)— linkages or one triazole ring linkage positioned either within the alkylene chain and/or at one of its termini, and wherein R$_{10}$ is hydrogen or (1-2C)alkyl.

(32) L is a (2-17C)alkylene linker, wherein the alkylene chain further comprises one to three —O— linkages and/or one to three —C(O)—, —C(O)NR$_{10}$— or —NR$_{10}$C(O)— linkages or one triazole ring linkage

(33) L is a (3-10C)alkylene linker, wherein the alkylene chain further comprises one to three —O— linkages and/or one to three —C(O)—, —C(O)NR$_{10}$— or —NR$_{10}$C(O)— linkages or one triazole ring linkage positioned either within the alkylene chain and/or at one of its termini, and wherein R$_{10}$ is hydrogen or (1-2C)alkyl.
(34) L is a (2-17C)alkylene linker, wherein the alkylene chain further comprises one —O— linkage and/or one —C(O)—, —C(O)NR$_{10}$— or —NR$_{10}$C(O)— linkage or one triazole ring linkage positioned either within the alkylene chain and/or at one of its termini, and wherein R$_{10}$ is hydrogen or (1-2C)alkyl.
(35) L is a (3-10C)alkylene linker, wherein the alkylene chain further comprises one —O— linkage and/or one —C(O)—, —C(O)NR$_{10}$— or —NR$_{10}$C(O)— linkage or one triazole ring linkage positioned either within the alkylene chain and/or at one of its termini, and wherein R$_{10}$ is hydrogen or (1-2C)alkyl.
(36) L is a linker having the formula:

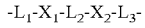

wherein
L$_1$ is absent or a (1-8C)alkylene;
X$_1$ is absent or selected from —O—, —C(O)—, —C(O)NR$_{10}$—, —NR$_{10}$C(O)—, —C(O)O—, —OC(O)— or a triazole ring;
L$_2$ is a (1-10C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 1 to 10 and b is 2 to 4;
X$_2$ is absent or selected from —O—, —C(O)—, —C(O)NR$_{10}$—, —NR$_{10}$C(O)—, —C(O)O—, —OC(O)— or a triazole ring;
L$_3$ is absent or a (1-8C)alkylene;
wherein R$_{10}$ is hydrogen or (1-2C)alkyl; and
with the proviso that at least one of X$_1$ or X$_2$ is present.
(37) L is a linker having the formula:

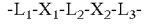

wherein
L$_1$ is absent or a (1-6C)alkylene;
X$_1$ is absent or selected from —O—, —C(O)—, —C(O)NR$_{10}$—, —NR$_{10}$C(O)—, —C(O)O—, —OC(O)— or a triazole ring;
L$_2$ is a (1-10C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 2 to 10 and b is 2 to 4;
X$_2$ is absent or selected from —O—, —C(O)—, —C(O)NR$_{10}$—, —NR$_{10}$C(O)—, —C(O)O—, —OC(O)— or a triazole ring;
L$_3$ is absent or a (1-6C)alkylene;
wherein R$_{10}$ is hydrogen or methyl; and
with the proviso that at least one of X$_1$ or X$_2$ is present.
(38) L is a linker having the formula:

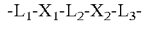

wherein
L$_1$ is absent or a (2-6C)alkylene;
X$_1$ is absent or selected from —O—, —C(O)—, —C(O)NR$_{10}$—, —NR$_{10}$C(O)— or a triazole ring;
L$_2$ is a (2-10C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 2 to 10 and b is 2 to 4;
X$_2$ is absent or selected from —O—, —C(O)—, —C(O)NR$_{10}$—, —NR$_{10}$C(O)— or a triazole ring;
L$_3$ is absent or a (1-6C)alkylene;
wherein R$_{10}$ is hydrogen or methyl; and
with the proviso that at least one of X$_1$ or X$_2$ is present.
(39) L is a linker having the formula:

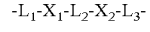

wherein
L$_1$ is absent or a (2-6C)alkylene;
X$_1$ is absent or selected from —O—, —C(O)—, —C(O)NR$_{10}$—, —NR$_{10}$C(O)— or a triazole ring;
L$_2$ is a (2-6C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 2 to 10 and b is 2 to 4;
X$_2$ is absent or selected from —O—, —C(O)—, —C(O)NR$_{10}$—, —NR$_{10}$C(O)— or a triazole ring;
L$_3$ is absent or a (2-6C)alkylene;
wherein R$_{10}$ is hydrogen or methyl; and
with the proviso that at least one of X$_1$ or X$_2$ is present.
(40) L is a linker having the formula:

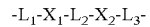

wherein
L$_1$ is absent;
X$_1$ is absent;
L$_2$ is absent or a (2-6C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 2 to 10 and b is 2 to 4;
X$_2$ is selected from —O—, —C(O)—, —C(O)NR$_{10}$—, —NR$_{10}$C(O)— or a triazole ring; L$_3$ is absent or a (2-6C)alkylene;
wherein R$_{10}$ is hydrogen or methyl; and
with the proviso that at least one of X$_1$ or X$_2$ is present.
(41) L is a linker having the formula:

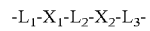

wherein
L$_1$ is a (2-6C)alkylene;
X$_1$ is selected from —O—, —C(O)NR$_{10}$—, —NR$_{10}$C(O)— or a triazole ring;
L$_2$ is a (2-6C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 2 to 10 and b is 2 to 4;
X$_2$ is selected from —O—, —C(O)NR$_{10}$—, —NR$_{10}$C(O)— or a triazole ring; L$_3$ is a (2-6C)alkylene;
wherein R$_{10}$ is hydrogen or methyl; and
with the proviso that at least one of X$_1$ or X$_2$ is present.
(42) Q is a detection moiety selected from the group consisting of a fluorophore, an oligonucleotide, a biomolecule, a molecular sensor, a protein, or a peptide.
(43) Q is a fluorophore.
(44) Q is a fluorophore selected from the group consisting of AlexaFluor dyes, Cyanine dyes, fluorescein, BODIPY or BODIPY derivatives (e.g. BODIPY TMR), TAMRA, Oregon Green dyes, FITC, Ru(bpy)3, Rhodamine dyes, Acridine orange, and Texas Red.
(45) Q is a fluorophore selected from the group consisting of AlexaFluor-647, AlexaFluor-633, AlexaFluor-594, AlexaFluor-488, Cyanine-5B, Cyanine-3B, Fluorescein, BODIPY or BODIPY derivatives (e.g. BODIPY TMR), TAMRA, Oregon Green 488, Oregon Green 514, FITC, Ru(bpy)3, Rhodamine dyes, Acridine orange, and Texas Red.

(46) X is a functional group that is capable of reacting with a functional group present on a detection moiety so as to covalently bind the detection moiety to the compound of formula II.
(47) X is a functional group that is capable of reacting with a functional group present on a detection moiety so as to covalently bind the detection moiety to the compound of formula II, wherein the detection moiety selected from the group consisting of a fluorophore, an oligonucleotide, a biomolecule, a molecular sensor, a protein, or a peptide.
(48) X is a functional group X that is capable of reacting with a functional group present on a fluorophore so as to covalently bind the fluorophore to the compound of formula II.
(49) X is a functional group that is capable of reacting with a functional group present on a fluorophore so as to covalently bind the fluorophore to the compound of formula II, and wherein the fluorophore is as defined in paragraph (44) or (45) above.
(50) X is a functional group selected from halo, $N_3$, or ethynyl (—C≡CH).
(51) X is ethynyl (—C≡CH) or $N_3$.
(52) $L_x$ is a linker group L as defined in any one of paragraphs (10) to (41) above.
(53) $L_x$ is a (1-8C)alkylene linker, wherein the alkylene chain optionally further comprises one or more —O—, —C(O)NR$_{10}$—, —NR$_{10}$C(O)—, —C(O)O—, —OC(O)— or triazole ring linkages positioned either within the alkylene chain and/or at one of its termini, wherein $R_{10}$ is hydrogen or (1-2C)alkyl.
(54) $L_x$ is a (1-8C)alkylene linker, wherein the alkylene chain optionally further comprises one —O—, —O(O)NR$_{10}$—, —NR$_{10}$C(O)—, —C(O)O—, —OC(O)— or triazole ring linkage positioned either within the alkylene chain and/or at one of its termini, wherein $R_{10}$ is hydrogen or (1-2C)alkyl.
(55) $L_x$ is a (1-50)alkylene linker.
(56) $L_x$ is a (1-30)alkylene linker.

Suitably, a halo group, when present, is fluoro and/or chloro, particularly fluoro.

Suitably, $R_1$ is as defined in any one paragraphs (1) to (9) above. More suitably, $R_1$ is as defined in either of paragraphs (8) and (9) above. In a particular group of probe compounds of formula I or II, $R_1$ is isopropyl.

The linker group L may be any suitable linker moiety that connects the detection moiety Q to the remainder of the probe compound of formula I or the functional group X to the remainder of the probe compound of formula II. Suitably, the linker group L is 3 to 30 atoms in length, more suitably, 4 to 20 atoms in length and even more suitably 5 to 18 atoms in length. In a particular group of probe compounds of formula I or II defined herein, L is 5 to 12 atoms in length.

Suitably, L is as defined in any one paragraphs (10) to (41) above. More suitably as defined in either of paragraphs (24) to (35) or (39) to (41) above. In a particular group of probe compounds of formula I or II, L is as defined in paragraph (40) or (41) above.

The detection moiety Q can be any moiety that can enable the probe compound of formula I to be detected and quantified. As described further below, the probe compounds of formula I defined herein are designed to be used in displacement assays, whereby the ability of a test compound to displace the probe compound of formula I from the ATP-binding site of target protein (e.g. MLH1 or PMS2) can be used to determine the binding affinity of that test compound for the ATP-binding site of the target protein. Thus, the detection moiety Q can be any moiety that can be readily detected and quantified. In certain circumstances, the detection moiety Q enables any probe compounds of formula I that have been displaced (i.e. is "unbound") from the ATP-binding site of the target protein to be detected and quantified. In certain embodiments of the invention, this may be achieved by collecting any displaced or "unbound" compound of formula I from the test sample and assaying the sample to determine how much unbound probe compound is present. This will in turn give an indication of how much of the probe compound present in the sample has been displaced by the test compound.

It will therefore be appreciated that the nature of detection moiety Q is not critical as long as it can be used to enable the amount of the probe compound of formula I present in a sample to be determined. A person skilled in the art will be able to select a suitable detection moiety Q and a suitable methodology for detecting and quantifying the amount of the compound of formula I in a sample, in particular to detect the amount of the probe compound of formula I that has been displaced from the ATP binding site of a target protein by a test compound.

Suitably, the detection moiety Q is selected from the group consisting of a fluorophore, an oligonucleotide, a biomolecule, a molecular sensor, a protein, or a peptide.

In embodiments where the detection moiety Q is an oligonucleotide, a biomolecule, a molecular sensor, a protein, or a peptide, then any suitable technique known in the art for detecting and quantifying the amount of the oligonucleotide, biomolecule, molecular sensor, protein, or peptide present may be utilised. For example, a fluorescently labelled secondary probe may be used that is capable of specifically binding to the detection moiety Q of the probe compound of formula I and, once any excess of the secondary probe has been removed, the amount of binding of the secondary probe to detection moiety Q of the compound for formula I can be detected and quantified, thereby enabling the amount of the probe compound of formula I to be determined.

For example, if Q is an oligonucleotide, then a secondary probe having a suitable detectable label, e.g. a fluorophore or radio-label, and a complimentary oligonucleotide sequence capable of hybridising to Q can be used to detect and quantify the amount of the probe compound of formula I present in sample (and suitably the amount of the probe compound displaced from the ATP-binding site of the target protein by a test compound). Similarly, if Q is a protein or peptide, then a secondary probe may be an antibody capable of selectively binding to that protein or peptide and a suitable detectable label, e.g. a fluorophore or radio-label.

More suitably, the detection moiety Q is a fluorophore. In such cases, the compound for formula I can be used in a fluorescence polarisation assay. In a particular group of probe compounds of formula I, the detection moiety Q is a fluorophore selected from the group consisting of AlexaFluor dyes, Cyanine dyes, fluorescein, BODIPY or BODIPY derivatives (e.g. BODIPY TMR), TAMRA, Oregon Green dyes, FITC, Ru(bpy)3, Rhodamine dyes, Acridine orange, and Texas Red. In a further group of probe compounds of formula I, the detection moiety Q is a fluorophore selected from the group consisting of AlexaFluor-647, AlexaFluor-633, AlexaFluor-594, AlexaFluor-488, Cyanine-5B, Cyanine-3B, Fluorescein, BODIPY TMR, TAMRA, Oregon Green 488, Oregon Green 514, FITC, Ru(bpy)3, Rhodamine dyes, Acridine orange, and Texas Red.

In a particular group of probe compounds of formula I, Q is a fluorophore, $R_1$ is as defined in paragraph (1) above and L is as defined in any one of paragraphs (10) to (41) above.

In a particular group of probe compounds of formula I, Q is a fluorophore, $R_1$ is as defined in paragraph (2) above and L is as defined in any one of paragraphs (10) to (41) above.

In a particular group of probe compounds of formula I, Q is a fluorophore, $R_1$ is as defined in paragraph (3) above and L is as defined in any one of paragraphs (10) to (41) above.

In a particular group of probe compounds of formula I, Q is a fluorophore, $R_1$ is as defined in paragraph (4) above and L is as defined in any one of paragraphs (10) to (41) above.

In a particular group of probe compounds of formula I, Q is a fluorophore, $R_1$ is as defined in paragraph (5) above and L is as defined in any one of paragraphs (10) to (41) above.

In a particular group of probe compounds of formula I, Q is a fluorophore, $R_1$ is as defined in paragraph (6) above and L is as defined in any one of paragraphs (10) to (41) above.

In a particular group of probe compounds of formula I, Q is a fluorophore, $R_1$ is as defined in paragraph (7) above and L is as defined in any one of paragraphs (10) to (41) above.

In a particular group of probe compounds of formula I, Q is a fluorophore, $R_1$ is as defined in paragraph (8) above and L is as defined in any one of paragraphs (10) to (41) above.

In a particular group of probe compounds of formula I, Q is a fluorophore, $R_1$ is as defined in paragraph (9) above and L is as defined in any one of paragraphs (10) to (41) above.

In a particular group of probe compounds of formula I, Q is a fluorophore, $R_1$ is as defined in paragraph (9) above and L is as defined in paragraph (10) above.

In a particular group of probe compounds of formula I, Q is a fluorophore, $R_1$ is as defined in paragraph (9) above and L is as defined in paragraph (11) above.

In a particular group of probe compounds of formula I, Q is a fluorophore, $R_1$ is as defined in paragraph (9) above and L is as defined in paragraph (14) above.

In a particular group of probe compounds of formula I, Q is a fluorophore, $R_1$ is as defined in paragraph (9) above and L is as defined in paragraph (15) above.

In a particular group of probe compounds of formula I, Q is a fluorophore, $R_1$ is as defined in paragraph (9) above and L is as defined in paragraph (18) above.

In a particular group of probe compounds of formula I, Q is a fluorophore, $R_1$ is as defined in paragraph (9) above and L is as defined in paragraph (19) above.

In a particular group of probe compounds of formula I, Q is a fluorophore, $R_1$ is as defined in paragraph (9) above and L is as defined in paragraph (22) above.

In a particular group of probe compounds of formula I, Q is a fluorophore, $R_1$ is as defined in paragraph (9) above and L is as defined in paragraph (23) above.

In a particular group of probe compounds of formula I, Q is a fluorophore, $R_1$ is as defined in paragraph (9) above and L is as defined in paragraph (26) above.

In a particular group of probe compounds of formula I, Q is a fluorophore, $R_1$ is as defined in paragraph (9) above and L is as defined in paragraph (27) above.

In a particular group of probe compounds of formula I, Q is a fluorophore, $R_1$ is as defined in paragraph (9) above and L is as defined in paragraph (30) above.

In a particular group of probe compounds of formula I, Q is a fluorophore, $R_1$ is as defined in paragraph (9) above and L is as defined in paragraph (31) above.

In a particular group of probe compounds of formula I, Q is a fluorophore, $R_1$ is as defined in paragraph (9) above and L is as defined in paragraph (34) above.

In a particular group of probe compounds of formula I, Q is a fluorophore, $R_1$ is as defined in paragraph (9) above and L is as defined in paragraph (35) above.

In a particular group of probe compounds of formula I, Q is a fluorophore, $R_1$ is as defined in paragraph (9) above and L is as defined in paragraph (36) above.

In a particular group of probe compounds of formula I, Q is a fluorophore, $R_1$ is as defined in paragraph (9) above and L is as defined in paragraph (37) above.

In a particular group of probe compounds of formula I, Q is a fluorophore, $R_1$ is as defined in paragraph (9) above and L is as defined in paragraph (38) above.

In a particular group of probe compounds of formula I, Q is a fluorophore, $R_1$ is as defined in paragraph (9) above and L is as defined in paragraph (39) above.

In a particular group of probe compounds of formula I, Q is a fluorophore, $R_1$ is as defined in paragraph (9) above and L is as defined in paragraph (40) above.

In a particular group of probe compounds of formula I, Q is a fluorophore, $R_1$ is as defined in paragraph (9) above and L is as defined in paragraph (41) above.

Suitably, X is as defined in any one of paragraphs (46) to (51) above.

It will be appreciated that X may be any suitable functional group that is capable of reacting with a functional group present on a detection moiety Q, or a compound of the formula $Q-L_2-Y$ as defined herein, to covalently bind the detection moiety to the compound of formula II and thereby form a compound of formula I as defined herein.

A person skilled in the art will be familiar with appropriate functional groups that can be used to form covalent linkages with a suitable detection moiety. For example, X may be selected from halo, $N_3$ or ethynyl (—C≡CH).

In a particular embodiment, X is $N_3$ or ethynyl.

Suitably, X is a functional group that is capable of reacting with a functional group present on the detection moiety to form a bond or triazole linkage between the detection moiety and the compound of formula II. In a particular embodiment, the linkage formed is a triazole linkage (which can be formed by CLICK chemistry).

Suitably, $L_x$ is as defined in any one of paragraphs (52) to (56) above.

In certain embodiments of the invention, a compound of formula I is formed by reacting a compound of formula II with a group of the formula:

$$Q-L_y-Y$$

wherein:
Q is a detection moiety as defined hereinbefore:
$L_y$ is absent or a linker group which, when covalently bound to the group $L_x$ of the compound of formula II forms a linker L of the compound of formula I;
Y is a functional group capable of reacting with the functional group X present on the compound of formula II to covalently link $Q-L_2$ to $L_x$ of the compound of formula II.

In an embodiment, $L_y$ is a (1-8C)alkylene linker, wherein the alkylene chain optionally further comprises one or more —O—, —C(O)$NR_{10}$—, —$NR_{10}$C(O)—, —C(O)O—, —OC(O)— or triazole ring linkages positioned either within the alkylene chain and/or at one of its termini, wherein $R_{10}$ is hydrogen or (1-2C)alkyl.

In another embodiment, $L_y$ is a (1-8C)alkylene linker, wherein the alkylene chain optionally further comprises one —O—, —C(O)$NR_{10}$—, —$NR_{10}$C(O)—, —C(O)O—, —OC(O)— or triazole ring linkage positioned either within the alkylene chain and/or at one of its termini, wherein $R_{10}$ is hydrogen or (1-2C)alkyl.

In a further embodiment, $L_y$ is a (1-5C)alkylene linker.

In another embodiment, $L_y$ is a (1-3C)alkylene linker.

It will be appreciated that Y may be any suitable functional group that is capable of reacting with a functional group X present on a probe compound of formula II to covalently bind the group Q-$L_y$ to the compound of formula II and thereby form a compound of formula I as defined herein.

A person skilled in the art will be familiar with appropriate functional groups that can be used to form covalent linkages with a functional group X on the compound of formula II. For example, Y may be selected from halo, $N_3$ or ethynyl.

In a particular embodiment, Y is $N_3$ when X is ethynyl or Y is ethynyl when X is $N_3$.

Suitably, Y is a functional group that is capable of reacting with a functional group X present on the probe compound of formula II to form a bond or triazole linkage. In a particular embodiment, the linkage formed is a triazole linkage (which can be formed by CLICK chemistry).

In a particular group of probe compounds of formula II, X is as defined in paragraph (50) above, $R_1$ is as defined in paragraph (1) above and $L_x$ is as defined in paragraph (52), (53) or (54) above.

In a particular group of probe compounds of formula II, X is as defined in paragraph (50) above, $R_1$ is as defined in paragraph (2) above and $L_x$ is as defined in paragraph (52), (53) or (54) above.

In a particular group of probe compounds of formula II, X is as defined in paragraph (50) above, $R_1$ is as defined in paragraph (3) above and $L_x$ is as defined in paragraph (52), (53) or (54) above.

In a particular group of probe compounds of formula II, X is as defined in paragraph (50) above, $R_1$ is as defined in paragraph (4) above and $L_x$ is as defined in paragraph (52), (53) or (54) above.

In a particular group of probe compounds of formula II, X is as defined in paragraph (50) above, $R_1$ is as defined in paragraph (5) above and $L_x$ is as defined in paragraph (52), (53) or (54) above.

In a particular group of probe compounds of formula II, X is as defined in paragraph (50) above, $R_1$ is as defined in paragraph (6) above and $L_x$ is as defined in paragraph (52), (53) or (54) above.

In a particular group of probe compounds of formula II, X is as defined in paragraph (50) above, $R_1$ is as defined in paragraph (7) above and $L_x$ is as defined in paragraph (52), (53) or (54) above.

In a particular group of probe compounds of formula II, X is as defined in paragraph (50) above, $R_1$ is as defined in paragraph (8) above and $L_x$ is as defined in paragraph (52), (53) or (54) above.

In a particular group of probe compounds of formula II, X is as defined in paragraph (50) above, $R_1$ is as defined in paragraph (9) above and $L_x$ is as defined in paragraph (52), (53) or (54) above.

In a particular group of probe compounds of formula II, X is as defined in paragraph (50) above, $R_1$ is as defined in paragraph (9) above and $L_x$ is as defined in paragraph (52) above.

In a particular group of probe compounds of formula II, X is as defined in paragraph (50) above, $R_1$ is as defined in paragraph (9) above and $L_x$ is as defined in paragraph (53) above.

In a particular group of probe compounds of formula II, X is as defined in paragraph (50) above, $R_1$ is as defined in paragraph (9) above and $L_x$ is as defined in paragraph (54) above.

In a particular group of probe compounds of formula II, X is as defined in paragraph (50) above, $R_1$ is as defined in paragraph (9) above and $L_x$ is as defined in paragraph (55) above.

In a particular group of probe compounds of formula II, X is as defined in paragraph (50) above, $R_1$ is as defined in paragraph (9) above and $L_x$ is as defined in paragraph (56) above.

Particular compounds of the invention include any one of the following:

1-(6-((2-(2-(4-((2-(2,4-Dihydroxy-5-isopropylbenzoyl) isoindolin-5-yl)methyl)piperazin-1-yl)ethoxy)ethyl) amino)-6-oxohexyl)-3,3-dimethyl-2-((1E,3E)-5-((E)-1,3, 3-trimethylindolin-2-ylidene)penta-1,3-dien-1-yl)-3H-indol-1-ium (Example 1);

3-(2-((1E,3E)-5-((Z)-3-(5-((2-(2-(4-((2-(2,4-dihydroxy-5-isopropylbenzoyl)isoindolin-5-yl)methyl)piperazin-1-yl) ethoxy)ethyl)amino)-5-oxopentyl)-3-methyl-5-sulfo-1-(3-sulfopropyl)indolin-2-ylidene)penta-1,3-dien-1-yl)-3, 3-dimethyl-5-sulfo-3H-indol-1-ium-1-yl)propane-1-sulfonate (Example 2);

1-(6-((5-(4-((2-(2,4-Dihydroxy-5-isopropylbenzoyl)isoindolin-5-yl)methyl)piperazin-1-yl)pentyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium formate (Example 3);

2-((5-(4-((2-(2,4-Dihydroxy-5-isopropylbenzoyl)isoindolin-5-yl)methyl)piperazin-1-yl)pentyl)carbamoyl)-5-(6-hydroxy-3-oxo-3H-xanthen-9-yl)benzoic acid and 5-((5-(4-((2-(2,4-dihydroxy-5-isopropylbenzoyl)isoindolin-5-yl)methyl)piperazin-1-yl)pentyl)carbamoyl)-2-(6-hydroxy-3-oxo-3H-xanthen-9-yl)benzoic acid (Example 4);

5-((5-(4-((2-(2,4-Dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl) benzoate ammonium (Example 5);

2,4-Dihydroxy-5-isopropylphenyl)(5-((4-(prop-2-yn-1-yl) piperazin-1-yl)methyl)isoindolin-2-yl)methanone (Example 6);

3-(5,5-Difluoro-7-(1H-pyrrol-2-yl)-5H-4$\lambda^4$,5$\lambda^4$-dipyrrolo [1,2-c:2',1'-f][1,3,2] diazaborinin-3-yl)-N-(5-(4-((2-(2,4-dihydroxy-5-isopropylbenzoyl)isoindolin-5-yl)methyl) piperazin-1-yl)pentyl)propanamide (Example 7);

1-(3-(5,5-Difluoro-7-(1H-pyrrol-2-yl)-5H-4$\lambda^4$,5$\lambda^4$-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)-3,6,9,12-tetraoxapentadecan-15-amide (Example 8);

4-(3-(5,5-Difluoro-7-(1H-pyrrol-2-yl)-5H-5$\lambda^4$,6$\lambda^4$-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)butanamide (Example 9);

3-(5,5-Difluoro-7-(1H-pyrrol-2-yl)-5H-4$\lambda^4$,5$\lambda^4$-dipyrrolo [1,2-c:2',1'-f][1,3,2] diazaborinin-3-yl)-1-(4-((2-(2,4-dihydroxy-5-isopropylbenzoyl)isoindolin-5-yl)methyl)piperazin-1-yl)propan-1-one (Example 10);

3-(5,5-Difluoro-7-(1H-pyrrol-2-yl)-5H-4$\lambda^4$,5$\lambda^4$-dipyrrolo [1,2-c:2',1'-f][1,3,2] diazaborinin-3-yl)-N-(15-(4-((2-(2, 4-dihydroxy-5-isopropylbenzoyl)isoindolin-5-yl)methyl) piperazin-1-yl)-15-oxo-3,6,9,12-tetraoxapentadecyl) propanamide (Example 11);

3-(5,5-Difluoro-7-(1H-pyrrol-2-yl)-5H-5λ$^4$,6λ$^4$-dipyrrolo [1,2-c:2',1'-f][1,3,2] diazaborinin-3-yl)-N-(4-(4-((2-(2,4-dihydroxy-5-isopropylbenzoyl)isoindolin-5-yl)methyl)piperazin-1-yl)-4-oxobutyl)propanamide (Example 12);

Tert-butyl (2-(2-(4-((2-(2,4-dihydroxy-5-isopropylbenzoyl) isoindolin-5-yl)methyl)piperazin-1-yl)ethoxy)ethyl) carbamate;

(5-((4-(2-(2-aminoethoxy)ethyl)piperazin-1-yl)methyl) isoindolin-2-yl)(2,4-dihydroxy-5-isopropylphenyl) methanone hydrochloride;

Tert-butyl (5-(4-((2-(2,4-dihydroxy-5-isopropylbenzoyl) isoindolin-5-yl)methyl)piperazin-1-yl)pentyl)carbamate;

(5-((4-(5-aminopentyl)piperazin-1-yl)methyl)isoindolin-2-yl)(2,4-dihydroxy-5-isopropylphenyl)methanone.

Particular probe compounds of the invention include any one of the following:

2,4-Dihydroxy-5-isopropylphenyl)(5-((4-(prop-2-yn-1-yl) piperazin-1-yl)methyl)isoindolin-2-yl)methanone (Example 6);

Tert-butyl (2-(2-(4-((2-(2,4-dihydroxy-5-isopropylbenzoyl) isoindolin-5-yl)methyl)piperazin-1-yl)ethoxy)ethyl) carbamate;

(5-((4-(2-(2-aminoethoxy)ethyl)piperazin-1-yl)methyl) isoindolin-2-yl)(2,4-dihydroxy-5-isopropylphenyl) methanone hydrochloride;

Tert-butyl (5-(4-((2-(2,4-dihydroxy-5-isopropylbenzoyl) isoindolin-5-yl)methyl)piperazin-1-yl)pentyl)carbamate;

(5-((4-(5-aminopentyl)piperazin-1-yl)methyl)isoindolin-2-yl)(2,4-dihydroxy-5-isopropylphenyl)methanone.

Particular probe compounds of the invention include any one of the following:

1-(6-((2-(2-(4-((2-(2,4-Dihydroxy-5-isopropylbenzoyl) isoindolin-5-yl)methyl)piperazin-1-yl)ethoxy)ethyl) amino)-6-oxohexyl)-3,3-dimethyl-2-((1E,3E)-5-((E)-1,3, 3-trimethylindolin-2-ylidene)penta-1,3-dien-1-yl)-3H-indol-1-ium (Example 1);

3-(2-((1E,3E)-5-((Z)-3-(5-((2-(2-(4-((2-(2,4-dihydroxy-5-isopropylbenzoyl)isoindolin-5-yl)methyl)piperazin-1-yl) ethoxy)ethyl)amino)-5-oxopentyl)-3-methyl-5-sulfo-1-(3-sulfopropyl)indolin-2-ylidene)penta-1,3-dien-1-yl)-3, 3-dimethyl-5-sulfo-3H-indol-1-ium-1-yl)propane-1-sulfonate (Example 2);

1-(6-((5-(4-((2-(2,4-Dihydroxy-5-isopropylbenzoyl)isoindolin-5-yl)methyl)piperazin-1-yl)pentyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium formate (Example 3);

2-((5-(4-((2-(2,4-Dihydroxy-5-isopropylbenzoyl)isoindolin-5-yl)methyl)piperazin-1-yl)pentyl)carbamoyl)-5-(6-hydroxy-3-oxo-3H-xanthen-9-yl)benzoic acid and 5-((5-(4-((2-(2,4-dihydroxy-5-isopropylbenzoyl)isoindolin-5-yl)methyl)piperazin-1-yl)pentyl)carbamoyl)-2-(6-hydroxy-3-oxo-3H-xanthen-9-yl)benzoic acid (Example 4);

5-((5-(4-((2-(2,4-Dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl) benzoate ammonium (Example 5);

3-(5,5-Difluoro-7-(1H-pyrrol-2-yl)-5H-4λ$^4$,5λ$^4$-dipyrrolo [1,2-c:2',1'-f][1,3,2] diazaborinin-3-yl)-N-(5-(4-((2-(2,4-dihydroxy-5-isopropylbenzoyl)isoindolin-5-yl)methyl) piperazin-1-yl)pentyl)propenamide (Example 7);

1-(3-(5,5-Difluoro-7-(1H-pyrrol-2-yl)-5H-4λ$^4$,5λ$^4$-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)-3,6,9,12-tetraoxapentadecan-15-amide (Example 8);

4-(3-(5,5-Difluoro-7-(1H-pyrrol-2-yl)-5H-5λ$^4$,6λ$^4$-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)butanamide (Example 9);

3-(5,5-Difluoro-7-(1H-pyrrol-2-yl)-5H-4λ$^4$,5λ$^4$-dipyrrolo [1,2-c:2',1'-f][1,3,2] diazaborinin-3-yl)-1-(4-((2-(2,4-dihydroxy-5-isopropylbenzoyl)isoindolin-5-yl)methyl)piperazin-1-yl)propan-1-one (Example 10);

3-(5,5-Difluoro-7-(1H-pyrrol-2-yl)-5H-4λ$^4$,5λ$^4$-dipyrrolo [1,2-c:2',1'-f][1,3,2] diazaborinin-3-yl)-N-(15-(4-((2-(2, 4-dihydroxy-5-isopropylbenzoyl)isoindolin-5-yl)methyl) piperazin-1-yl)-15-oxo-3,6,9,12-tetraoxapentadecyl) propanamide (Example 11);

3-(5,5-Difluoro-7-(1H-pyrrol-2-yl)-5H-5λ$^4$,6λ$^4$-dipyrrolo [1,2-c:2',1'-f][1,3,2] diazaborinin-3-yl)-N-(4-(4-((2-(2,4-dihydroxy-5-isopropylbenzoyl)isoindolin-5-yl)methyl) piperazin-1-yl)-4-oxobutyl)propanamide (Example 12).

A suitable salt of a probe compound of the invention is, for example, an acid-addition salt of a compound of the invention which is sufficiently basic, for example, an acid-addition salt with, for example, an inorganic or organic acid, for example hydrochloric, hydrobromic, sulfuric, phosphoric, trifluoroacetic, formic, citric methane sulfonate or maleic acid. In addition, a suitable salt of a compound of the invention which is sufficiently acidic is an alkali metal salt, for example a sodium or potassium salt, an alkaline earth metal salt, for example a calcium or magnesium salt, an ammonium salt or a salt with an organic base.

The present invention also encompasses probe compounds of the invention as defined herein which comprise one or more isotopic substitutions. For example, H may be in any isotopic form, including $^1$H, $^2$H (D) and $^3$H (T); C may be in any isotopic form, including $^{12}$C, $^{13}$C and $^{14}$C; and O may be in any isotopic form, including $^{16}$O and $^{18}$O; and the like.

It is also to be understood that certain probe compounds of the formula (I) may exist in solvated as well as unsolvated forms such as, for example, hydrated forms.

It is also to be understood that certain probe compounds of the formula (I) may exhibit polymorphism, and that the invention encompasses all such polymorphic forms.

Certain probe compounds of formula (I) may also exist in a number of different tautomeric forms and references to compounds of the formula (I) include all such forms.

Synthesis of the Probe Compounds

In another aspect, the present invention provides a method of synthesising a probe compound of formula I or II, or a salt thereof, as defined herein.

The probe compounds of the present invention can be prepared by any suitable technique known in the art. Particular processes for the preparation of these compounds are described further in the accompanying examples.

In the description of the synthetic methods described herein and in any referenced synthetic methods that are used to prepare the starting materials, it is to be understood that all proposed reaction conditions, including choice of solvent, reaction atmosphere, reaction temperature, duration of the experiment and workup procedures, can be selected by a person skilled in the art.

It is understood by one skilled in the art of organic synthesis that the functionality present on various portions of the molecule must be compatible with the reagents and reaction conditions utilised.

It will be appreciated that during the synthesis of the compounds of the invention in the processes defined herein, or during the synthesis of certain starting materials, it may be desirable to protect certain substituent groups to prevent their undesired reaction. The skilled chemist will appreciate when such protection is required, and how such protecting groups may be put in place, and later removed.

For examples of protecting groups see one of the many general texts on the subject, for example, 'Protective Groups in Organic Synthesis' by Theodora Green; 4$^{th}$ Edition; 2006 (publisher: John Wiley & Sons). Protecting groups may be removed by any convenient method described in the literature or known to the skilled chemist as appropriate for the removal of the protecting group in question, such methods being chosen so as to effect removal of the protecting group with the minimum disturbance of groups elsewhere in the molecule.

In one aspect, the present invention provides a process for synthesising a compound of formula I defined herein, the process comprising reacting a compound of formula II as defined herein with a compound of the formula Q-L$_2$-Y as defined herein to form a compound of formula I; and optionally thereafter:
(i) removing any protecting groups present;
(ii) forming a salt of the compound of formula I; and/or
(iii) isolating and purifying the compound of formula I.

Applications of the Probe Compounds

In one aspect, the present invention provides the use of a probe compound of formula I, or a salt thereof, as defined herein in a displacement assay to determine the binding affinity of a test molecule for the ATP-binding site of a target protein.

In another aspect, the present invention provides a probe compound of formula I, or a salt thereof, for use in a displacement assay to determine the binding affinity of a test molecule for the ATP-binding site of a target protein.

In an embodiment, the target protein is selected from MLH1, PMS2 or HSP90. In a particular embodiment, the target protein is MLH1 or PMS2. In a specific embodiment, the target protein is MLH1. In a further specific embodiment, the target protein is PMS2.

Displacement assays are well known in the art. In embodiments of the invention in which Q is a fluorophore, the displacement assay is a fluorescence polarisation assay. Fluorescence polarisation assays are well known in the art (see, for example, references [7, 8, 9] herein).

The test compound may be any biologic or small molecule compound that is to be screened for binding to the ATP-binding site of the target protein (e.g. MLH1 or PMS2).

In another aspect, the present invention provides an assay for determining the binding affinity of a test molecule for the ATP-binding site of a target protein, the assay comprising:
(i) incubating a test molecule with the target protein in the presence of a probe compound of formula I, or a salt thereof, as defined herein; and
(ii) determining whether any probe compound is displaced from the ATP-binding site of the target protein.

In an embodiment, the target protein is selected from MLH1, PMS2 or HSP90. In a particular embodiment, the target protein is MLH1 or PMS2. In a specific embodiment, the target protein is MLH1. In a further specific embodiment, the target protein is PMS2.

Suitably, the assay is a displacement assay. Displacement assays are well known in the art. In embodiments of the invention in which Q is a fluorophore, the displacement assay is a fluorescence polarisation assay. Fluorescence polarisation assays are well known in the art (see, for example, references [7, 8, 9] herein).

The step of determining whether any probe compound is displaced from the ATP-binding site of the target protein suitably comprises detecting whether the test compound results in an increase in the proportion of probe compound of formula I that is unbound to the ATP-binding site. This can be achieved by either detecting whether there is an increase in the amount of unbound probe compound (relative to a control) or, if the amount of bound probe compound can be readily detected (e.g. by fluorescence polarisation) then detecting whether there is a decrease in the amount of bound probe compound (again relative to a control).

The determination of the proportion of the probe compound that is bound to the ATP-binding site of the target protein relative to the amount that is unbound can be achieved by techniques known in the art. The particular techniques utilised will depend on the nature of the detection moiety Q in the compound of formula I. Suitably, Q is a fluorophore and the assay is a fluorescence polarisation assay. In such assays, the difference in the fluorescence caused by the displacement of probe compound from the ATP-binding site of the target protein can be detected and used to quantify the amount of any displaced probe compound—and thereby determine the binding affinity of the test compound for the ATP binding site of the target protein.

In another aspect, the present invention provides a method for determining the binding affinity of a test molecule for the ATP-binding site of a target protein, the assay comprising:
(i) incubating a test molecule with the target protein in the presence of a probe compound of formula I, or a salt thereof, as defined herein; and
(ii) determining whether any probe compound is displaced from the ATP-binding site of the target protein.

In an embodiment, the target protein is selected from MLH1, PMS2 or HSP90. In a particular embodiment, the target protein is MLH1 or PMS2. In a specific embodiment, the target protein is MLH1. In a further specific embodiment, the target protein is PMS2.

Suitably, the method is a displacement assay. Displacement assays are well known in the art. In embodiments of the invention in which Q is a fluorophore, the displacement assay is a fluorescence polarisation assay. Fluorescence polarisation assays are well known in the art (see, for example, references [7, 8, 9] herein).

The step of determining whether any probe compound is displaced from the ATP-binding site of the target protein can be conducted in the manner described above.

In another aspect, the present invention provides an assay for determining the location and/or quantity of a target protein present within a biological sample, the assay comprising:
(i) contacting the biological sample with a probe compound of formula I, or a salt thereof, as defined herein; and
(ii) determining location and/or quantity of the compound of formula I present within the sample by detecting the location and/or intensity of the detection moieties of the compounds of formula I present within the biological sample.

In another aspect, the present invention provides an assay for determining the location and/or quantity of a target protein present within a biological sample, the assay comprising:
(i) contacting the biological sample with a probe compound of formula II, or a salt thereof, as defined herein; and
(ii) contacting the biological sample with a detection moiety Q, or a compound of the formula Q-L$_2$-Y as defined herein, that is capable of reacting with the functional group X present on the compound of formula II to form a compound of formula I in situ within the biological sample;

(iii) determining location and/or quantity of the compound of formula I present within the sample by detecting the location and/or intensity of the detection moieties of the compounds of formula I present within the biological sample.

In another aspect, the present invention provides a method for determining the location and/or quantity of a target protein present within a biological sample, the method comprising:

(i) contacting the biological sample with a probe compound of formula I, or a salt thereof, as defined herein; and (ii) determining location and/or quantity of the compound of formula I present within the sample by detecting the location and/or intensity of the detection moieties of the compounds of formula I present within the biological sample.

In another aspect, the present invention provides a method for determining the location and/or quantity of a target protein present within a biological sample, the method comprising:

(i) MLH1 or PMS2 contacting the biological sample with a detection moiety Q, or a compound of the formula Q-L$_2$-Y as defined herein, that is capable of reacting with the functional group X present on the compound of formula I to form a compound of formula I in situ within the biological sample;

(ii) determining location and/or quantity of the compound of formula I present within the sample by detecting the location and/or intensity of the detection moieties of the compounds of formula I present within the biological sample.

In an embodiment, the target protein is selected from MLH1, PMS2 or HSP90. In a particular embodiment, the target protein is MLH1 or PMS2. In a specific embodiment, the target protein is MLH1. In a further specific embodiment, the target protein is PMS2.

Suitably the step of contacting the biological sample with a probe compound of formula I or II (step (i) in the above assays and methods), involves incubating the biological sample with the probe compound under conditions that enable it to bind to the ATP-binding site of a target protein (e.g. MLH1 or PMS2).

The determination of the distribution and quantity of the compound of formula I within the biological sample can be achieved by techniques known in the art. The particular techniques utilised will depend on the nature of the detection moiety Q in the compound of formula I. Suitably, Q is a fluorophore and the determination of location and quantity of the compound of formula I within the sample can be achieved by fluorescence microscopy/imaging. Appropriate calibration of the fluorescence intensity can be used to determine the quantity of the compound of formula I at various locations within the sample.

The assays and methods of the invention defined herein may optionally further comprise one or more washing steps conducted after step (i) to remove excess probe compound of formula I or II from the biological sample.

In embodiments where the probe compound is a compound of formula II, the assay and method defined herein involve contacting the biological sample with the compound of formula II to allow it to bind to the ATP binding site of a target protein, optionally washing the biological sample one or more times to remove any unbound probe compound of formula II, and then contacting the biological sample with a suitable detection moiety Q, or a compound of the formula Q-L$_2$-Y as defined herein, that is capable of reacting with the probe compound of formula II in situ within the biological sample to form a compound of formula I. The sample may optionally be washed after incubation with the detection moiety to remove any unbound/unreacted detection moiety from the sample. The detection moiety may be a group Q as defined herein bearing a suitable functional group that can react with the functional group X on the probe compound of formula II. Alternatively, the detection moiety may be a compound of the formula Q-L$_2$-Y as defined herein, which reacts with the compound of formula II to form a compound of formula I as defined herein.

Experimental Section

FIGURES

Figure 11:
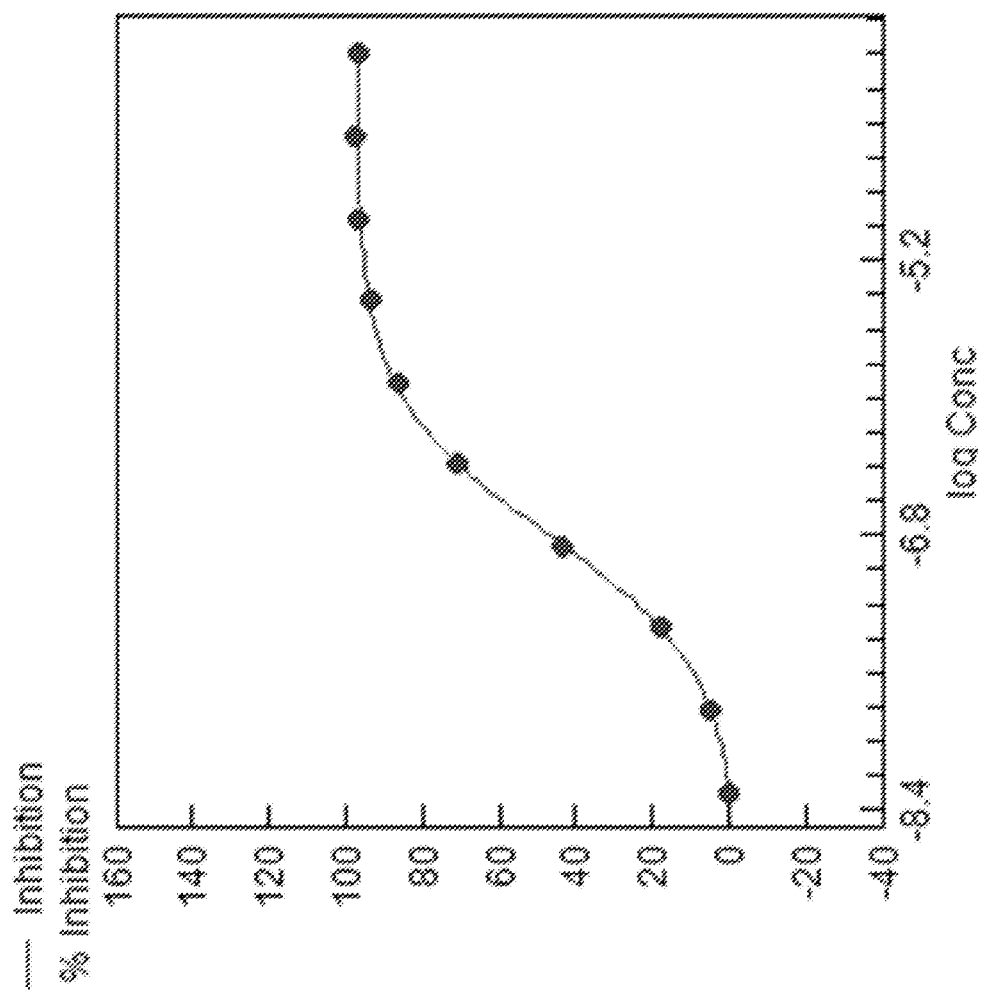

FIG. 11 shows inhibition data for compound AB, the IC$_{50}$ determined using Assay Protocol C, Analytical Methods For the preparation of Examples 1 to 6 and associated intermediates, commercially available starting materials, reagents and dry solvents were used as supplied. Flash column chromatography was performed using Merck silica gel 230-400 mesh size. Column chromatography was also performed using glass column chromatography or Flash chromatography. Flash chromatography was performed on combi-flash RF Teledyne Isco machine. Preparative TLC was performed on Merck plates. $^1$H NMR spectra were recorded on a Bruker Avance-400. Samples were prepared as solutions in a suitable deuterated solvent and referenced to the appropriate internal non-deuterated solvent peak or tetramethylsilane. Chemical shifts were recorded in ppm (δ) downfield of tetramethylsilane.

For the preparation of Examples 7 to 12, solvents were purchased from Sigma Aldrich or Fisher Scientific and used without purification. NanoBRET® 590 SE, NanoBRET® 590-O4-SE, and NanoBRET® 590-C4-SE were obtained from Promega Corp. Madison, WI Mass spectra were recorded on a Thermo Fisher Vanquish™ (LC-MS) and purity (≥95%) determined by reverse-phase high pressure liquid chromatography (RP-HPLC) using a Kinetex 5 µm EVO C18 100 Å LC Column 30×2.1 mm column or a Phenomenex Synergi 2.5 µm Max-RP 100 Å LC column. Compounds were purified on a Waters LC Prep 150 using a Waters XBridge Prep C18 OBD 30×250 mm column according to Standard Method 1: Initial mobile phase: 90% aqueous (0.1% TFA in $H_2O$), 10% acetonitrile; final mobile phase: 0% aqueous, 100% acetonitrile; 30 min linear gradient.

HPLC Method
Method-A

The sample was analyzed using the following conditions: Agilent Series 1260 Infinity-II with PDA detector, Column: Waters Sunfire C18, 150*4.6 mm, 3.5 micron, Column temperature: room temp., auto sampler temperature: 15° C., mobile phase A: 0.05% (v/v) tri-fluoroacetic acid in Milli-Q water (pH~2.5), mobile phase B: 100% acetonitrile; mobile phase gradient details: t=0 min (90% A, 10% B; gradient to t=7 min (10% A, 90% B); gradient to t=9 min (0% A, 100% B); t=14 min (0% A, 100% B); gradient to t=14.01 min (90% A, 10% B); end of run at t=17 min (90% A, 10% B), Flow rate: 1 mL/min, analysis time 17 min.

LC-MS Method
Method-A

Waters Acquity UPLC with binary solvent manager, PDA detector and Acquity QDA performance mass detector, column: Ymc tri-art C18, 50*2.1 mm, 1.9 micron, column temperature: 35° C., auto sampler temperature: 5° C., mobile phase A: 0.1% (v/v) formic acid in $ddH_2O$ (pH=2.70), Mobile Phase B: 0.1% formic acid (v/v) in water:acetonitrile (10:90), mobile phase gradient details: t=0 min (97% A, 3% B) flow: 0.8 mL/min; t=0.75 min (97% A, 3% B) flow: 0.8 mL/min; gradient to t=2.7 min (2% A, 98% B) flow: 0.8 mL/min; gradient to t=3 min (0% A, 100% B) flow: 1 mL/min; t=3.5 min (0% A, 100% B) flow: 1 mL/min; gradient to t=3.51 min (97% A, 3% B) flow: 0.8 mL/min; end of run at t=4 min (97% A, 3% B), Flow rate: 0.8 mL/min, analysis time 4 min. Mass detector parameter: ionization mode was cycled through positive and negative modes with cone voltage 10 V and 30 V and 0.8 kV capillary voltage, temperature of source and probe were 120° C. and 600° C. respectively.

Method-B

Waters Acquity UPLC with quaternary solvent manager, PDA detector and Acquity QDA mass detector, column: Ymc tri-art C18, 50*2.1 mm, 1.9 micron, column temperature: 35° C., auto sampler temperature: 5° C., mobile phase A: 0.1% (v/v) Formic acid in $ddH_2O$ (pH=2.70), mobile phase B: 0.1% (v/v) formic acid in water:acetonitrile (10: 90), mobile phase gradient details: t=0 min (97% A, 3% B) flow: 0.8 mL/min; t=0.75 min (97% A, 3% B) flow: 0.8 mL/min; gradient to t=2.7 min (2% A, 98% B) flow: 0.8 mL/min; gradient to t=3 min (0% A, 100% B) flow: 1 mL/min; t=3.5 min (0% A, 100% B) flow: 1 mL/min; gradient to t=3.51 min (97% A, 3% B) flow: 0.8 mL/min; end of run at t=4 min (97% A, 3% B), Flow rate: 0.8 mL/min, analysis time 4 min. Mass detector parameter: probe was ESI capillary probe, ionization mode was cycled through positive and negative modes with cone voltage 10 V and 30V and 0.8 kV capillary voltage, temperature of source and probe were 120° C. and 600° C. respectively.

Method-C

Waters Acquity with PDA detector and SQ Detector, column: X-bridge C18, 50*4.6 mm, 3.5 micron, column temperature: 25° C., mobile phase A: 5 mM ammonium bicarbonate in $ddH_2O$ (pH=7.35), mobile phase B: MeOH, mobile phase gradient details: t=0 min (92% A, 8% B); t=0.75 min (92% A, 8% B); gradient to t=3 min (30% A, 70% B gradient to t=3.75 min (5% A, 95% B); gradient to t=4.20 min (0% A, 100% B); t=5.20 min (0% A, 100% B); gradient to t=5.21 min (92% A, 8% B); end of run at t=7 min (92% A, 8% B), Flow rate: 1 mL/min, analysis time 7 min. Mass detector parameter: ionization mode was cycled through positive and negative mode with cone voltage 10 V and 30 V and 3.25 kV capillary voltage, temperature of source and probe were 120° C. and 600° C. respectively.

Method-D

Waters Acquity with PDA detector and SQ Detector, column: X-bridge C18, 50*4.6 mm, 3.5 micron, column temperature: 25° C., mobile phase A: 5 mM ammonium bicarbonate in $ddH_2O$ (pH=7.35), mobile phase B: acetonitrile; mobile phase gradient details: t=0 min (97% A, 3% B) flow: 0.5 mL/min; t=0.2 min (97% A, 3% B) flow: 0.5 mL/min; gradient to t=2.7 min (2% A, 98% B) flow: 0.5 mL/min; gradient to t=3 min (0% A, 100% B) flow: 0.7 mL/min; t=3.5 min (0% A, 100% B) flow: 0.7 mL/min; gradient to t=3.51 min (97% A, 3% B) flow: 0.5 mL/min; end of run at t=4 min (97% A, 3% B), flow rate: 0.5 mL/min, analysis time 4 min. Mass detection parameter: ionization mode was cycled through positive and negative mode with cone voltage 10 V and 30 V and 3.25 kV capillary voltage, temperature of source and probe were 120° C. and 600° C. respectively.

Method E

Waters Acquity UPLC with binary solvent manager, PDA detector and Acquity QDA performance mass detector, column: Xbridge BEH C18, 50*2.1 mm, 2.5 micron, column temperature: 35° C., auto sampler temperature: 5° C.; mobile phase A: 0.1% (v/v) formic acid in $ddH_2O$ (pH=2.70); mobile Phase B: 0.1% formic acid (v/v) in water:acetonitrile (10:90), mobile phase gradient details: t=0 min (97% A, 3% B) flow: 0.8 mL/min; t=0.75 min (97% A, 3% B) flow: 0.8 mL/min; gradient to t=2.7 min (2% A, 98% B) flow: 0.8 mL/min; gradient to t=3 min (0% A, 100% B) flow: 1 mL/min; t=3.5 min (0% A, 100% B) flow: 1 mL/min; gradient to t=3.51 min (97% A, 3% B) flow: 0.8 mL/min; end of run at t=4 min (97% A, 3% B), Flow rate: 0.8 mL/min, analysis time 4 min. Mass detector parameter: ionization mode was cycled through positive and negative modes with cone voltage 10 V and 30 V and 0.8 kV capillary voltage, temperature of source and probe were 120° C. and 600° C. respectively.

Preparatory HPLC Method (for X)

Waters Quaternary-2545 gradient module with Waters 2489-UV/Visible wave-length detector, Column: YMC-TRI ART C18, 250*21.2 mm, 5 micron, column temperature: room temp., mobile phase A: 5 mM ammonium bicarbonate in water, mobile phase B: 100% acetonitrile; mobile phase gradient details: T=0.01 min (50% A, 50% B; gradient to T=17 min (40% A, 60% B); gradient to T=17.01 min (2% A, 98% B); T=19 min (2% A, 98% B); gradient to T=19.01 min (50% A, 50% B); end of run at T=21 min (50% A, 50% B), flow rate: 17 mL/min, analysis time 21 min.

Example 1—Preparation of 1-(6-((2-(2-(4-((2-(2,4-dihydroxy-5-isopropylbenzoyl)isoindolin-5-yl)methyl)piperazin-1-yl)ethoxy)ethyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium

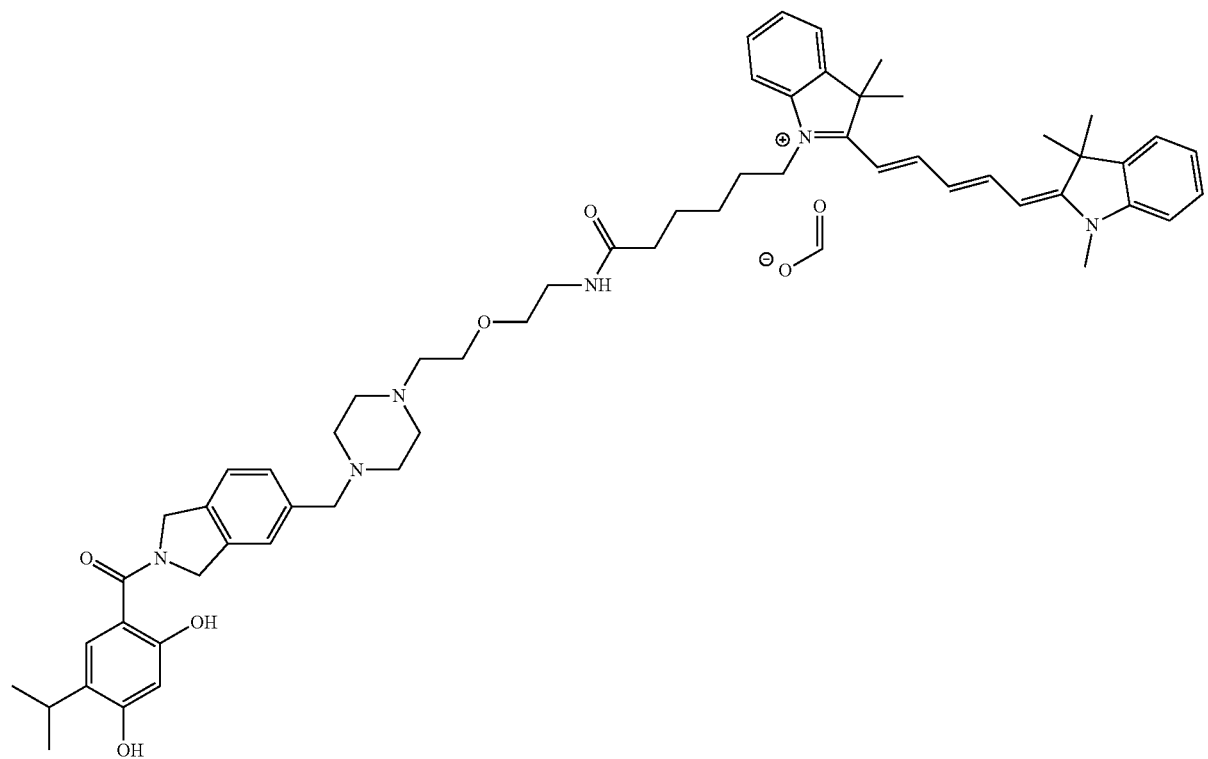

To a solution of (5-((4-(2-(2-aminoethoxy)ethyl)piperazin-1-yl)methyl)isoindolin-2-yl)(2,4-dihydroxy-5-isopropylphenyl)methanone hydrochloride (3.5 mg, 0.0073 mmol) in DMF (1.0 ml) was added Cyanine-5 NHS ester (CAS: 1263093-76-0, 5.1 mg, 0.0040 mmol) and N,N-diisopropylethylamine (3.8 µL, 0.22 mmol). The reaction mixture was stirred at room temperature in the dark for 1 h before being concentrated in vacuo. Purification by chromatography on silica gel (Flash 4 g, 0-20% MeOH:CH$_2$Cl$_2$), then reverse-phase HPLC (Sunfire C18, 5-60% MeCN:H$_2$O (0.1% HCO$_2$H)), followed by freeze drying, afforded the title compound as a blue solid (1.6 mg, 23%). $^1$H NMR (DMSO-d$^6$, 400 MHz) δ 10.1 (br. s, 1H), 9.68 (s, 1H), 8.45-8.31 (m, 2H), 8.19 (s, 1H), 7.97-7.90 (m, 1H), 7.70-7.63 (m, 2H), 7.52-7.23 (m, 9H), 7.09 (s, 1H), 6.61 (t, J=12.4 Hz, 1H), 6.46 (s, 1H), 6.36 (d, J=14.0 Hz, 1H), 6.30 (d, J=14.0 Hz, 1H), 4.90-4.74 (m, 4H), 4.17-4.09 (m, 2H), 3.64-3.83-3.71 (m, 2H), 3.65 (s, 3H), 3.39-3.03 (m, 9H), 2.16-2.08 (m, 2H), 1.75-1.67 (m, 12H), 1.60-1.51 (m, 2H), 1.41-1.35 (m, 2H), 1.32-1.27 (m, 2H), 1.19 (d, J=7.2 Hz, 6H). 8 protons assumed to be obscured by H$_2$O peak; HPLC purity 97%; LC/MS R$_t$=3.83 min; MS m/z: 948.2 [M+H]$^+$.

Example 2—Preparation of 3-(2-((1E,3E)-5-((Z)-3-(5-((2-(2-(4-((2-(2,4-dihydroxy-5-isopropylbenzoyl)isoindolin-5-yl)methyl)piperazin-1-yl)ethoxy)ethyl)amino)-5-oxopentyl)-3-methyl-5-sulfo-1-(3-sulfopropyl)indolin-2-ylidene)penta-1,3-dien-1-yl)-3,3-dimethyl-5-sulfo-3H-indol-1-ium-1-yl)propane-1-sulfonate

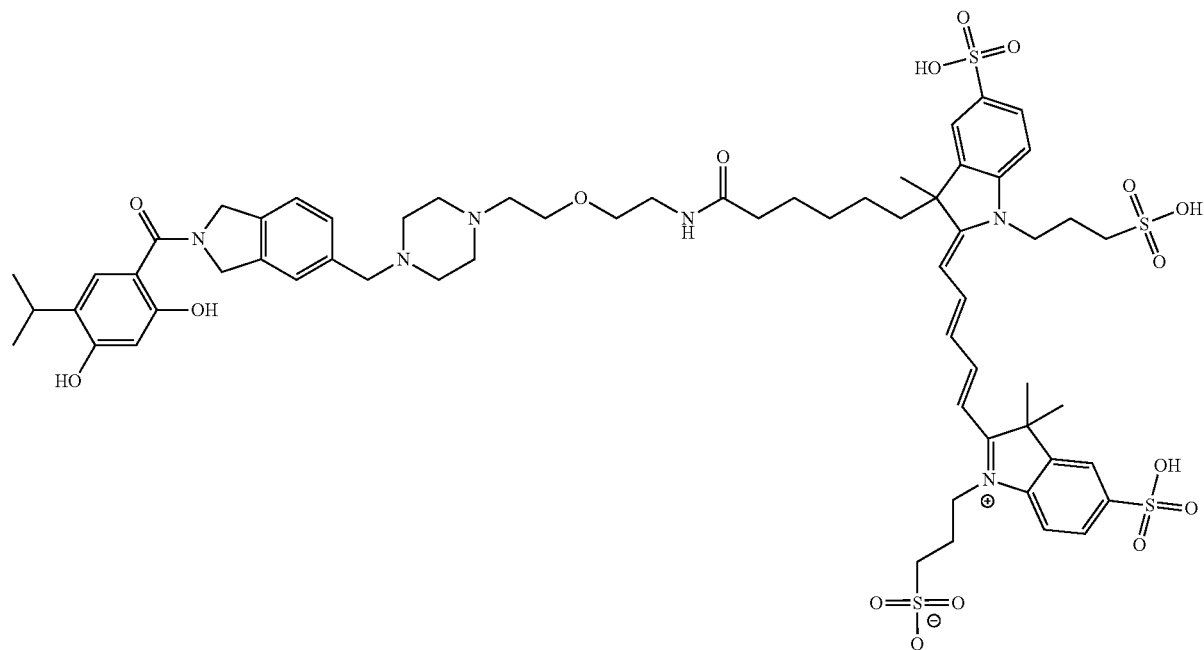

To a solution of (5-((4-(2-(2-aminoethoxy)ethyl)piperazin-1-yl)methyl)isoindolin-2-yl)(2,4-dihydroxy-5-isopropylphenyl)methanone hydrochloride (3.2 mg, 0.0066 mmol) in DMF (1.0 ml) was added AlexaFluor-647 NHS ester (5.0 mg, 0.0076 mmol) and N,N-diisopropylethylamine (2.6 μL, 0.20 mmol). The reaction mixture was stirred at room temperature in the dark for 8 h before being diluted with DMSO to a total volume of 1.5 mL. Purification by reverse-phase HPLC (Sunfire C18, 5-60% MeCN:H$_2$O (10 mM NH$_4$CO$_3$) followed by freeze drying, afforded the title compound as a blue solid (1.3 mg, 25%). HPLC purity 91%; LC/MS R$_t$=2.39 min; MS m/z: 662.8 [M+2H]$^{2+}$.

Example 3—Preparation of 1-(6-((5-(4-((2-(2,4-dihydroxy-5-isopropylbenzoyl)isoindolin-5-yl)methyl)piperazin-1-yl)pentyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium formate

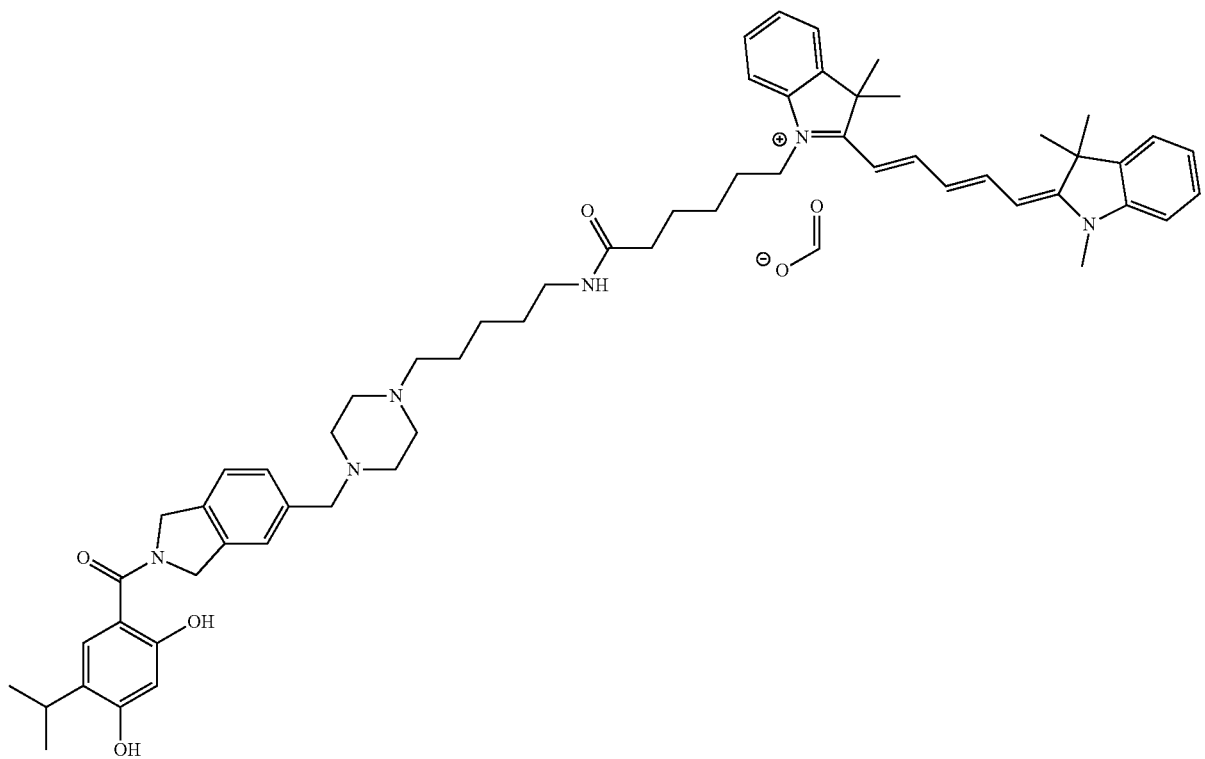

To a solution of (5-((4-(5-aminopentyl)piperazin-1-yl)methyl)isoindolin-2-yl)(2,4-dihydroxy-5-isopropylphenyl)methanone (5 mg, 0.0085 mmol) in DMF (1.0 ml) was added Cyanine-5 NHS ester (CAS: 1263093-76-0, 3.9 mg, 0.0068 mmol) and N,N-diisopropylethylamine (22 μL, 0.13 mmol). The reaction mixture was stirred at room temperature in the dark for 4 h and the crude reaction mixture was purified by reverse-phase HPLC (Sunfire C18, 5-60% MeCN:H$_2$O (0.1% HCO$_2$H)), concentrated in vacuo and freeze dried to give the title compound as a blue solid (3.0 mg, 38%). $^1$H NMR (DMSO-d$^6$, 400 MHz) δ 10.89-9.55 (br. m, 1H), 8.44 (s, 1H), 8.39-8.30 (m, 2H), 7.74 (t, J=5.6 Hz, 1H), 7.65-7.0 (m, 2H), 7.45-7.37 (m, 4H), 7.29-7.16 (m, 5H), 7.04 (s, 1H), 6.61-6.53 (m, 1H), 6.43 (s, 1H), 6.34-6.24 (m, 2H), 4.79-4.72 (m, 4H), 4.12-4.06 (m, 2H), 3.60 (s, 3H), 3.11 (quin, J=6.8, 1H), 3.02-2.95 (m, 2H), 2.37-2.17 (m, 10H), 2.11-2.02 (m, 2H), 1.69 (s, 12H), 1.59-1.51 (m, 3H), 1.40-1.30 (m, 6H), 1.25-1.21 (m, 3H), 1.14 (d, J=6.8 Hz, 6H). 1× OH not observed. 2 protons obscured by H$_2$O peak; LC/MS Rt=3.86 min; MS m/z: 946.0 [M+H]+.

Example 4—Preparation of 2-((5-(4-((2-(2,4-dihydroxy-5-isopropylbenzoyl)isoindolin-5-yl)methyl)piperazin-1-yl)pentyl)carbamoyl)-5-(6-hydroxy-3-oxo-3H-xanthen-9-yl)benzoic acid and 5-((5-(4-((2-(2,4-dihydroxy-5-isopropylbenzoyl)isoindolin-5-yl)methyl)piperazin-1-yl)pentyl)carbamoyl)-2-(6-hydroxy-3-oxo-3H-xanthen-9-yl)benzoic acid

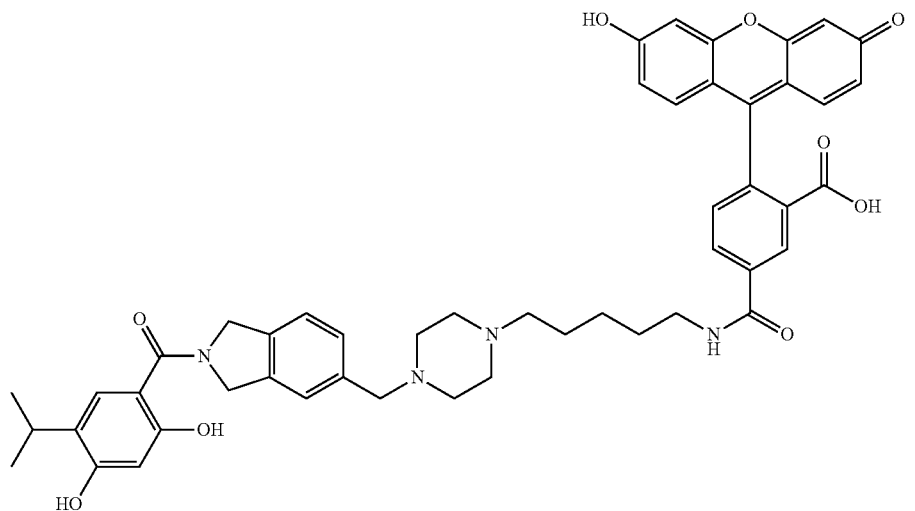

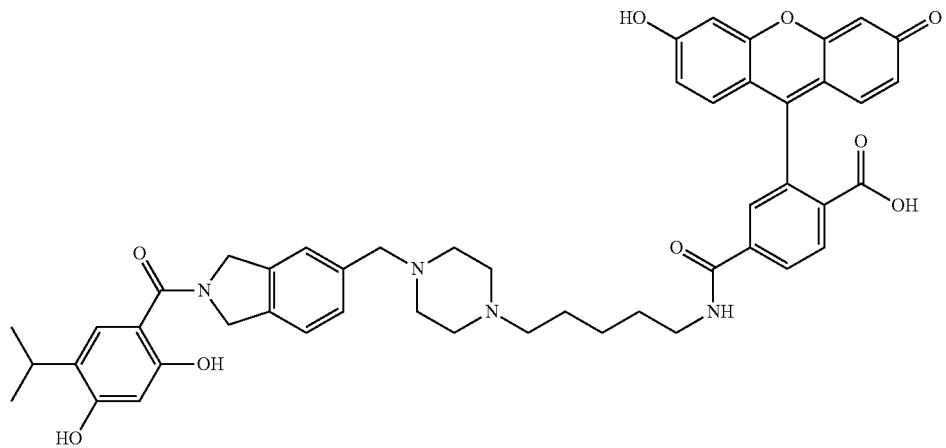

To a solution of (5-((4-(5-aminopentyl)piperazin-1-yl)methyl)isoindolin-2-yl)(2,4-dihydroxy-5-isopropylphenyl)methanone (5.0 mg, 0.0085 mmol) in DMF (1.0 ml) was added NHS-Fluorescein (5/6-carboxyfluorescein succinimidyl ester), mixed isomer (CAS: 117548-22-8, 3.2 mg, 0.0068 mmol) and N,N-diisopropylethylamine (22 μL, 0.13 mmol). The reaction mixture was stirred at room temperature in the dark for 2 h and the crude reaction mixture was purified by reverse-phase HPLC (Sunfire C18, 5-60% MeCN:$H_2O$ (10 mM $(NH_4)_2CO_3$)) and concentrated in vacuo to give the title compound as an orange powder (3.2 mg, 45%). $^1$H NMR (DMSO-d$^6$, 400 MHz) δ 10.50-9.50 (m, 3H), 8.90-8.13 (m, 3H), 7.75-7.24 (m, 4H), 7.13 (s, 1H), 6.74-6.67 (m, 4H), 6.62-6.58 (m, 2H), 6.48 (s, 1H), 4.88-4.79 (m, 4H), 3.18 (quin, J=6.8, 1H), 2.50-2.24 (m, 8H), 1.69-1.28 (m, 6H), 1.22 (d, J=6.8 Hz, 6H). 6 protons obscured by $H_2O$ peak, $CO_2H$ not observed; LC/MS R$_t$=3.32 min; MS m/z: 839.7 [M+H]$^+$.

Example 5—Preparation of 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate ammonium

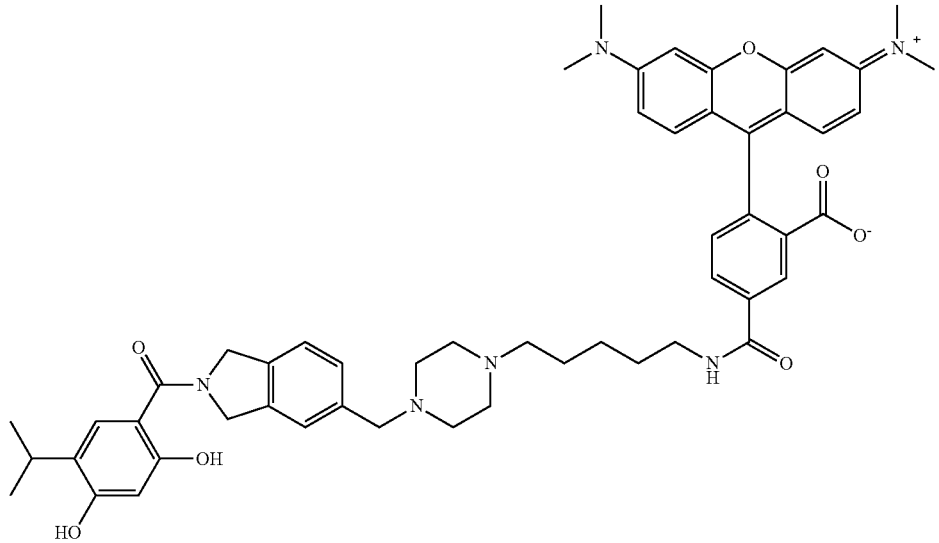 [SMILES: CC(C)c1cc(C(=O)N2Cc3ccc(CN4CCN(CCCCCNC(=O)c5ccc(-c6c7ccc(=[N+](C)C)cc-7oc7cc(N(C)C)ccc67)c(C(=O)[O-])c5)CC4)cc3C2)c(O)cc1O]

To a solution of (5-((4-(5-aminopentyl)piperazin-1-yl)methyl)isoindolin-2-yl)(2,4-dihydroxy-5-isopropylphenyl)methanone (3.8 mg, 0.0064 mmol) in DMF (1.0 ml) was added 5-TAMRA SE (5-carboxytetramethylrhodamine, succinimidyl ester) (CAS: 150810-68-7, 2.7 mg, 0.0052 mmol) and N,N-diisopropylethylamine (17 μL, 0.097 mmol). The reaction mixture was stirred at room temperature in the dark for 2.5 h and the crude reaction mixture was purified by reverse-phase HPLC (Sunfire C18, 20-80% MeCN:$H_2O$ (10 mM $(NH_4)_2CO_3$)), and concentrated in vacuo to give the title compound as a purple powder (3.9 mg, 67%). $^1$H NMR (DMSO-d$^6$, 400 MHz) δ 10.33-10.02 (m, 2H), 9.67 (s, 1H), 8.92-8.83 (m, 1H), 8.54-8.43 (m, 1H), 8.25 (d, J=8.0 Hz, 1H), 7.39-7.18 (m, 7H), 7.11-7.03 (m, 2H), 6.62-6.49 (m, 5H), 6.44 (s, 1H), 4.82-4.73 (m, 4H), 3.60-3.52 (m, 2H), 3.14-2.84 (m, 19H), 1.90-1.56 (m, 4H), 1.41-1.32 (m, 2H), 1.15 (d, J=6.8 Hz, 6H). 6 protons obscured by $H_2O$ and DMSO peaks. 0.5 eq $NH_4CO_3$ adduct; LC/MS $R_t$=3.09 min; MS m/z: 893.8 $[M+H]^+$.

Example 6—(2,4-Dihydroxy-5-isopropylphenyl)(5-((4-(prop-2-yn-1-yl)piperazin-1-yl)methyl)isoindolin-2-yl)methanone

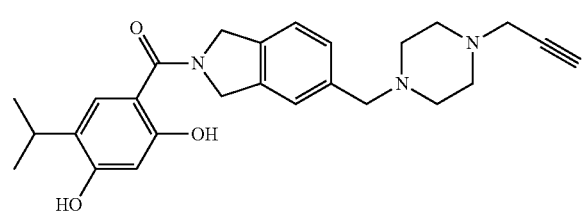 [SMILES: C#CCN1CCN(Cc2ccc3c(c2)CN(C(=O)c2cc(C(C)C)c(O)cc2O)C3)CC1]

Figure 1:
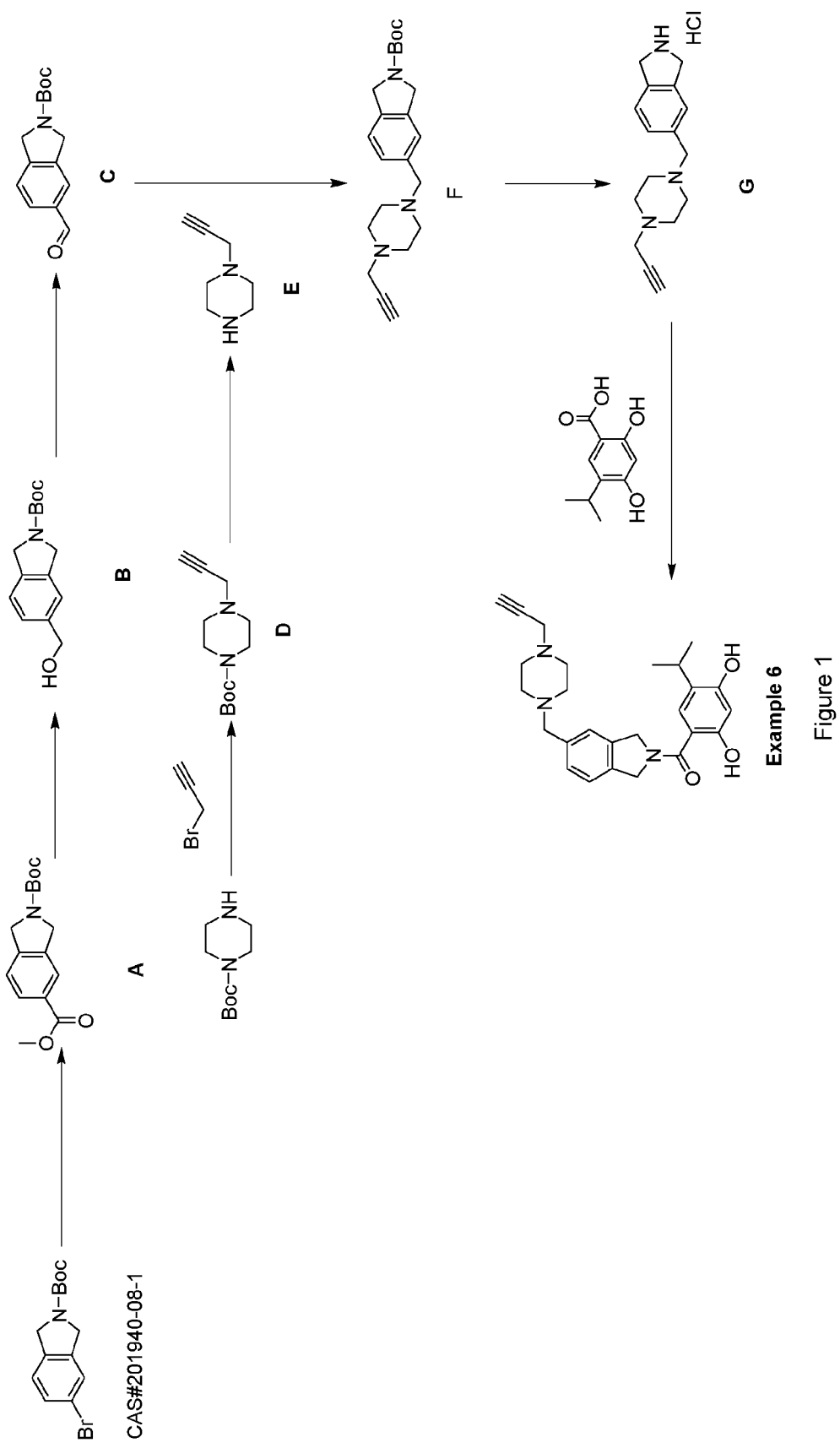
FIG. 1 shows a synthetic scheme for the preparation of (2,4-Dihydroxy-5-isopropylphenyl)(5-((4-(prop-2-yn-1-yl)piperazin-1-yl)methyl)isoindolin-2-yl)methanone (Example 6).

Synthetic Scheme (See FIG. 1)

Tert-butyl-5-methyl isoindoline-2,5-dicarboxylate (A)

To a solution of tert-butyl 5-bromoisoindoline-2-carboxylate (CAS #201940-08-1) (10.0 g, 33.5 mmol) in MeOH:DMF (9:1, 100 mL) was added TEA (14 mL, 137.81 mmol) at room temperature. The reaction mixture was degassed using $N_2$ for 10-15 min. $PdCl_2$(dppf) (4.91 g, 6.71 mmol) was added to the reaction mixture at room temperature. The reaction mixture was subject to 30 kg/cm$^2$ of $CO_{(gas)}$ pressure, heated to 120° C. and stirred for 16 h. The reaction mixture was cooled to room temperature and concentrated under reduced pressure. The obtained crude material was diluted with water (200 mL) and extracted in EtOAc (3×100 mL). The combined organic layer was washed with brine solution (200 mL), dried over sodium sulphate and concentrated under reduced pressure to give crude material which was purified by column chromatography (silica gel, eluting with 12% ethyl acetate in hexane) yielding 2-(tert-butyl) 5-methyl isoindoline-2,5-dicarboxylate (A) as a Brown solid (10 g).

LCMS (Method B): 2.657 min, MS: ES+ 278.18 (M+1); $^1$H NMR (DMSO-d$^6$, 400 MHz): δ 1.45 (s, 9H), 3.84 (s, 3H), 4.61 (t, J=7.6 Hz, 4H), 7.43-7.47 (m, 1H), 7.86-7.91 (m, 2H).

Tert-butyl 5-(hydroxymethyl)isoindoline-2-carboxylate (B)

LiAlH$_4$ solution (1M in THF) (36 mL, 36.10 mmol) was added dropwise to a stirred solution of 2-(tert-butyl) 5-methyl isoindoline-2,5-dicarboxylate (A) (10 g, 36.07 mmol) in THF (200 mL) at 0° C. The reaction mixture was stirred at 0° C. for 3 h and then poured into cold saturated aqueous ammonium chloride solution (100 mL) and extracted into ethyl acetate (3×100 mL). The combined organic layer was dried over anhydrous sodium sulphate, filtered and concentrated under vacuum yielding tert-butyl 5-(hydroxymethyl)isoindoline-2-carboxylate (B) as brown solid (5 g, 56%). This material was used in the next step without further purification. LCMS (Method B): 2.061 min, MS: ES+ 250.18 (M+1); $^1$H NMR (DMSO-d$^6$, 400 MHz): δ 1.45 (s, 9H), 4.48-4.55 (m, 6H), 5.21 (br. s, 1H), 7.19-7.26 (m, 3H).

Tert-butyl 5-formylisoindoline-2-carboxylate (C)

To a solution of tert-butyl 5-(hydroxymethyl)isoindoline-2-carboxylate (B) (3 g, 12.04 mmol) in DCM (30 mL) was added activated MnO$_2$ (10.36 g, 120.40 mmol) at room temperature. The reaction mixture was stirred at room temperature for 16 h. The reaction mixture was filtered through a celite bed, washed with 10% MeOH:DCM (3×50 mL). The combined filtrate was concentrated under vacuum yielding tert-butyl-5-formylisoindoline-2-carboxylate (C) as a grey solid (2.6 g, 86%). This material was used in the next step without any further purification.
LCMS (Method B): 2.387 min, MS: ES+ 248.18 (M+1); $^1$H NMR (CDC$_3$, 400 MHz): δ 1.54 (s, 9H), 4.73-4.76 (m, 4H), 7.40-7.45 (dd, J=8.4, 7.6 Hz, 1H), 7.77-7.82 (m, 2H), 10.20 (s, 1H).

Tert-butyl 4-(prop-2-yn-1-yl)piperazine-1-carboxylate (D)

To a solution of tert-butyl piperazine-1-carboxylate (15 g, 80.51 mmol) in acetonitrile (300 mL) was added K$_2$CO$_3$ (22.26 g, 161.30 mmol) at 0° C. Propargyl bromide (80% (w/v) solution in toluene) (12 mL, 80.51 mmol) was added dropwise to the reaction mixture at 0° C. The resulting reaction mixture was slowly warmed to room temperature and stirred at room temperature for 1.5 h. The reaction mixture was filtered and washed with acetonitrile (100 mL). The combined filtrate was concentrated under vacuum and the resultant crude material was purified by column chromatography (silica gel, eluting with 3% (v/v) MeOH in DCM) yielding tert-butyl 4-(prop-2-yn-1-yl)piperazine-1-carboxylate as a brown solid (12.5 g, 71%).
LCMS (Method A): 0.937 min, MS: ES+ 225.20 (M+1); $^1$H NMR (DMSO-d$^6$, 400 MHz): δ 1.38 (s, 9H), 2.36 (t, J=4.8 Hz, 4H), 3.18 (t, J=2.4 Hz, 1H), 3.27-3.34 (m, 6H).

1-(Prop-2-yn-1-yl)piperazine (E)

4M HCl in dioxane (20 mL) was added dropwise to a solution of tert-butyl 4-(prop-2-yn-1-yl)piperazine-1-carboxylate (D) (2 g, 8.93 mmol) in DCM (10 mL) at 0° C. under a nitrogen atmosphere. The reaction mixture was stirred 0° C. for 10-15 min. The reaction mixture was slowly warmed to room temperature and stirred at room temperature for 2 h. The resulting reaction mixture was concentrated under vacuum and neutralized using dropwise addition of methanolic ammonia (pH 7). The resulting precipitate was collected by filtration and dried under high vacuum yielding 1-(prop-2-yn-1-yl)piperazine (E) as a brown oil (1.45 g). This material was used for next step without any further purification.
LCMS (Method A): 0.295 min, MS: ES+ 125.00 (M+1); $^1$H NMR (DMSO-d$^6$, 400 MHz): δ 2.36-2.38 (m, 4H), 2.73 (t, J=4.8 Hz, 4H), 3.16 (t, J=2.4 Hz, 1H), 3.22 (d, J=2.4 Hz, 2H), 3.58 (br. s, 1H).

Tert-butyl 5-((4-(prop-2-yn-1-yl)piperazin-1-yl)methyl)isoindoline-2-carboxylate (F)

To a mixture of tert-butyl 5-formylisoindoline-2-carboxylate (C) (0.996 g, 4.03 mmole) and 1-(prop-2-yn-1-yl)piperazine (E) (0.5 g, 4.03 mmol) in DCM (10 mL) was added acetic acid (4-5 drops) at room temperature. The reaction mixture was stirred at room temperature for 3 h. The reaction mixture was cooled to 0° C. NaBH(OAc)$_3$ (2.13 g, 10.05 mmol) was added portion-wise to the reaction mixture at 0° C. The reaction mixture was slowly warmed to room temperature and stirred at room temperature for 24 h. The reaction mixture was poured into water (50 mL) and extracted in EtOAc (3×50 mL). The combined organic layer was washed with sat. aq. NaHCO$_3$ (50 mL), dried over sodium sulphate, filtered and concentrated under vacuum. The crude material was purified by flash chromatography (silica gel, eluting with 2.5% (v/v) MeOH in DCM) to give tert-butyl 5-((4-(prop-2-yn-1-yl)piperazin-1-yl)methyl) isoindoline-2-carboxylate (F) as an off white solid (0.550 g, 77%).
LCMS (Method A): 1.588 min, MS: ES+ 356.27 (M+1); $^1$H NMR (DMSO-d$^6$, 400 MHz): δ 1.45 (s, 9H), 2.32-2.43 (m, 8H), 3.14 (s, 1H), 3.23 (d, J=2.4 Hz, 2H), 3.43 (s, 2H), 4.54-4.55 (m, 4H), 7.18-7.25 (3H).

5-((4-(Prop-2-yn-1-yl)piperazin-1-yl)methyl)isoindoline hydrochloride (G)

4M HCl in dioxane (5 mL) was added dropwise to a solution of tert-butyl 5-((4-(prop-2-yn-1-yl)piperazin-1-yl) methyl)isoindoline-2-carboxylate (F) (0.55 g, 15.48 mmol) in DCM (5 mL) at 0° C. The reaction mixture was stirred at 0° C. for 10-15 min. The reaction mixture was slowly warmed to room temperature and stirred for 16 h. The resulting mixture was concentrated under vacuum and the crude material was triturated with diethyl ether (2×10 mL); the resulting solid material was concentrated under high vacuum yielding 5-((4-(prop-2-yn-1-yl)piperazin-1-yl) methyl)isoindoline hydrochloride (G) as a white solid (0.55 g). This material was used for next step without any further purification.
LCMS (Method D): 1.24 min, MS: ES+ 256.46 (M+1); $^1$H NMR (DMSO-d$^6$, 400 MHz): 3.24-3.43 (m, 6H), 3.69 (br. s, 1H), 3.90 (br s, 2H), 4.36 (br. s, 3H), 4.50-4.51 (m, 4H), 7.48 (d, J=7.6 Hz, 1H), 7.62 (d, J=8.8 Hz, 2H), 10.13 (br. s, 1H), 11.70 (br. s, 1H).

(2,4-Dihydroxy-5-isopropylphenyl)(5-((4-(prop-2-yn-1-yl)piperazin-1-yl)methyl)isoindolin-2-yl)methanone (Example 6)

To a mixture of 5-((4-(prop-2-yn-1-yl)piperazin-1-yl) methyl)isoindoline hydrochloride (G) (0.058 g, 0.198 mmol) and 2,4-dihydroxy-5-isopropylbenzoic acid (0.032 g, 0.163 mmol) in DMF (2 mL) was added N-(3-Dimethylaminopropyl)-N'-ethylcarbodiimide hydrochloride (0.063 g, 0.33 mmol), HOBt (0.033 g, 0.24 mmol) and DIPEA (0.057 mL, 0.33 mmol) at room temperature in a microwave glass tube. The microwave glass tube was sealed and irradiated under microwave at 120° C. for 3 h. The resulting reaction mixture was poured into ice cold water (30 mL) and extracted in EtOAc (3×30 mL). The combined organic layer was dried over sodium sulphate and concentrated under vacuum; the crude material was purified by flash chromatography (silica gel, eluting with 6.8% (v/v) MeOH in DCM) yielding (2,4-dihydroxy-5-isopropylphenyl)(5-((4-(prop-2-yn-1-yl) piperazin-1-yl)methyl)isoindolin-2-yl)methanone (Example 6) as an off white solid (0.032 g, 43%).
LCMS (Method A): 1.340 min, MS: ES+ 434.22 (M+1); $^1$H NMR (DMSO-d$^6$, 400 MHz): 1.07-1.13 (dd, J=7.5, 6.8 Hz, 6H), 2.32-2.45 (m, 8H), 3.05-3.11 (m, 1H), 3.14 (s, 1H), 3.23 (s, 2H), 3.43 (s, 2H), 4.74-4.76 (m, 4H), 6.39 (s, 1H), 7.03 (s, 1H), 7.20-7.29 (m, 3H), 9.62 (br. s, 1H), 10.32-10.10 (m, 1H).

Example 7—3-(5,5-Difluoro-7-(1H-pyrrol-2-yl)-5H-4λ⁴,5λ⁴-dipyrrolo[1,2-c:2',1'-f][1,3,2] diazaborinin-3-yl)-N-(5-(4-((2-(2,4-dihydroxy-5-isopropylbenzoyl)isoindolin-5-yl)methyl)piperazin-1-yl)pentyl)propanamide

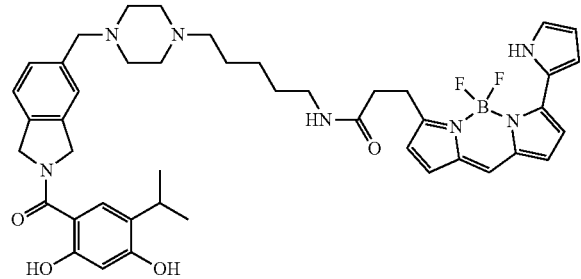

(5-((4-(5-aminopentyl)piperazin-1-yl)methyl)isoindolin-2-yl)(2,4-dihydroxy-5-isopropylphenyl)methanone (5.4 mg, 0.011 mmol) was charged into a 5 mL amber vial and DMF (1 mL) was added. To the stirred solution was added N,N-diisopropylethylamine (5.9 μL, 0.034 mmol) and stirring was continued for 5 min. NanoBRET® 590-SE (5.8 mg, 0.014 mmol) was added, the vial was capped and allowed to stir for 2 h in the dark. The mixture was diluted with 1:1:0.01 acetonitrile, water, TFA and was subjected to reverse-phase prep HPLC purification using Standard Method 1. Product containing fractions were pooled and concentrated under reduced pressure to give a purple film that was dissolved in acetonitrile (10 mL) and concentrated to dryness in triplicate to remove spurious trifluoracetic acid. The resulting residue was dried under high vacuum to give the product (8.1 mg, 91.1%) as a purple solid.

MS (ESI, m/z) calcd. for $C_{44}H_{53}BF_5N_7O_4$ [M+H]⁺: 792.4, found 792.5.

Example 8—1-(3-(5,5-Difluoro-7-(1H-pyrrol-2-yl)-5H-4λ⁴,5λ⁴-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)-3,6,9,12-tetraoxapentadecan-15-amide

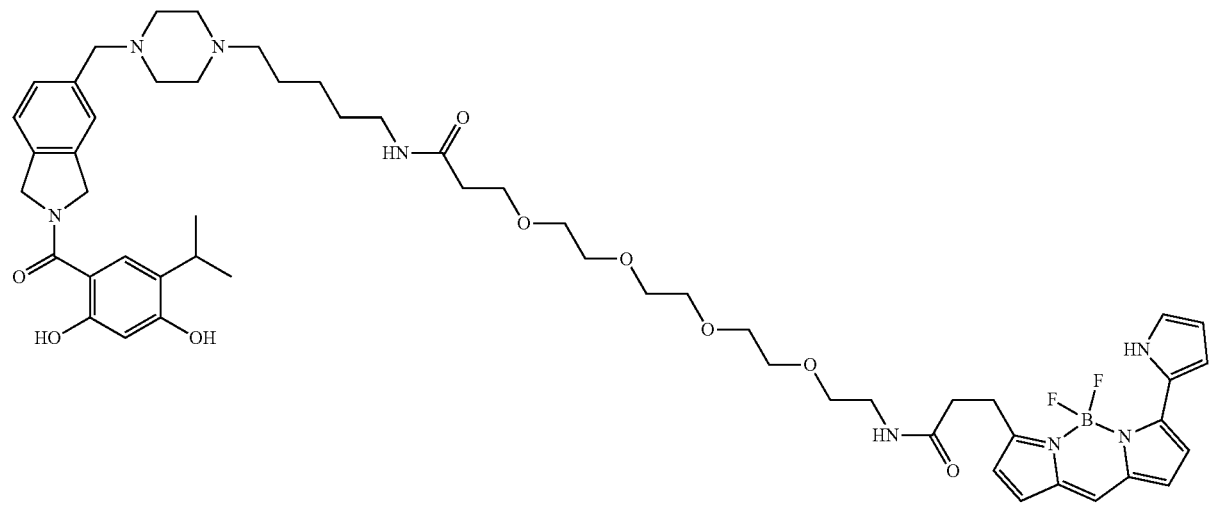

(5-((4-(5-aminopentyl)piperazin-1-yl)methyl)isoindolin-2-yl)(2,4-dihydroxy-5-isopropylphenyl)methanone (5.0 mg, 0.010 mmol) was charged into a 5 mL amber vial and was treated with DMF (0.5 mL). To the suspension was added N,N-diisopropylethylamine (5.4 μL, 0.031 mmol) which rendered the solution clear. NanoBRET® 590 PEG-O4-SE (8.4 mg, 0.012 mmol) was dissolved in 0.5 mL DMF and was added to the reaction mixture using an additional 2×0.5 mL portions of DMF to quantitatively transfer the reactive dye. The mixture was capped and allowed to stir for 2 h in the dark. The mixture was diluted with 1:1:0.01 acetonitrile, water, TFA and was subjected to reverse-phase preparative HPLC purification using Standard Method 1. Product containing fractions were pooled and concentrated under reduced pressure to give a purple film that was dissolved in acetonitrile (10 mL) and concentrated to dryness in triplicate to remove spurious trifluoracetic acid. The resulting residue was dried under high vacuum to give the product (8.3 mg, 76.4%) as a purple solid.

MS (ESI, m/z) calcd. for $C_{55}H_{74}BF_2N_8O_9$ [M+H]$^+$: 1039.6, found 1039.7.

Example 9—4-(3-(5,5-Difluoro-7-(1H-pyrrol-2-yl)-5H-5λ$^4$,6λ$^4$-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)butanamide

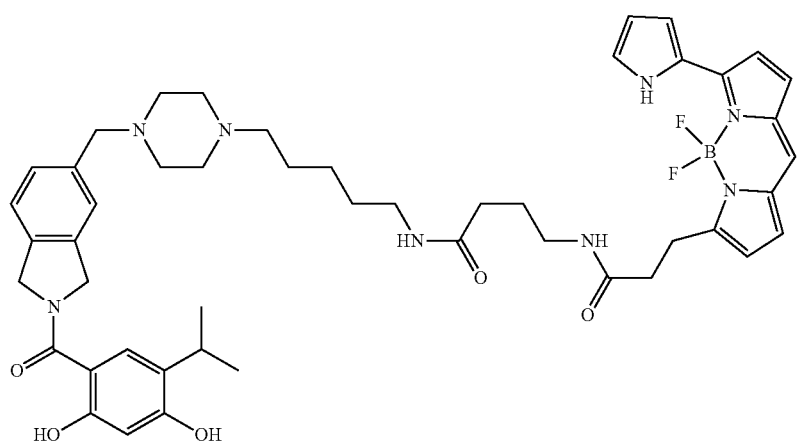

(5-((4-(5-aminopentyl)piperazin-1-yl)methyl)isoindolin-2-yl)(2,4-dihydroxy-5-isopropylphenyl)methanone (5.0 mg, 0.010 mmol) was charged into a 5 mL amber vial and DMF (1 mL) was added. To the stirred solution was added N,N-diisopropylethylamine (7.6 µL, 0.042 mmol) and stirring was continued for 5 min. NanoBRET 590®-C4-SE (6.4 mg, 0.012 mmol) was added, the vial was capped and allowed to stir for 2 h in the dark. The mixture was diluted with 1:1:0.01 acetonitrile, water, TFA and was subjected to reverse-phase preparative HPLC purification using Standard Method 1. Product containing fractions were pooled and concentrated under reduced pressure to give a purple film that was dissolved in acetonitrile (10 mL) and concentrated to dryness in triplicate to remove spurious trifluoracetic acid. The resulting residue was dried under high vacuum to give the product (3.6 mg, 39.4%) as a purple solid.

MS (ESI, m/z) calcd. for $C_{48}H_{60}BF_2N_8O_5$ [M+H]$^+$: 877.5, found 877.6.

Example 10—3-(5,5-Difluoro-7-(1H-pyrrol-2-yl)-5H-4λ$^4$,5λ$^4$-dipyrrolo[1,2-c:2',1'-f][1,3,2] diazaborinin-3-yl)-1-(4-((2-(2,4-dihydroxy-5-isopropylbenzoyl)isoindolin-5-yl)methyl)piperazin-1-yl)propan-1-one

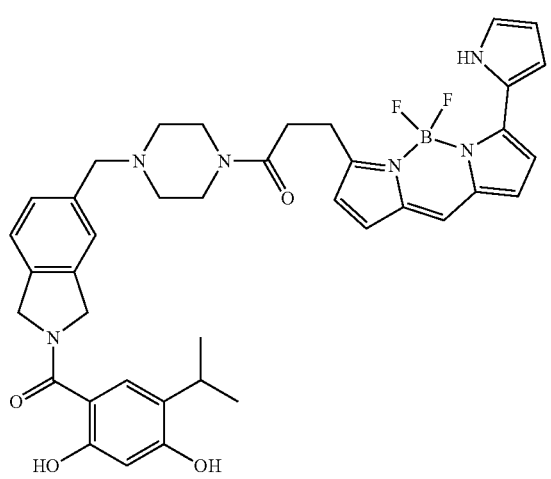

(2,4-dihydroxy-5-isopropylphenyl)(5-(piperazin-1-ylmethyl)isoindolin-2-yl)methanone hydrochloride (5.0 mg, 0.012 mmol) was charged into a 5 mL amber vial and DMF (1 mL) was added. To the stirred solution was added N,N-diisopropylethylamine (8.1 μL, 0.046 mmol) and stirring was continued for 5 min. NanoBRET® 590-SE (5.9 mg, 0.014 mmol) was added, the vial was capped and allowed to stir for 2 h in the dark. The mixture was diluted with 1:1:0.01 acetonitrile, water, TFA and was subjected to reverse-phase prep HPLC purification using Standard Method 1. Product containing fractions were pooled and concentrated under reduced pressure to give a purple film that was dissolved in acetonitrile (10 mL) and concentrated to dryness in triplicate to remove spurious trifluoracetic acid. The resulting residue was dried under high vacuum to give the product (3.25 mg, 39.7%) as a purple solid.

MS (ESI, m/z) calcd. for $C_{39}H_{42}BF_2N_8O_4$ $[M+H]^+$: 707.3, found 707.4.

Example 11—3-(5,5-Difluoro-7-(1H-pyrrol-2-yl)-5H-4$\lambda^4$,5$\lambda^4$-dipyrrolo[1,2-c:2',1'-f][1,3,2] diazaborinin-3-yl)-N-(15-(4-((2-(2,4-dihydroxy-5-isopropylbenzoyl)isoindolin-5-yl)methyl)piperazin-1-yl)-15-oxo-3,6,9,12-tetraoxapentadecyl)propanamide

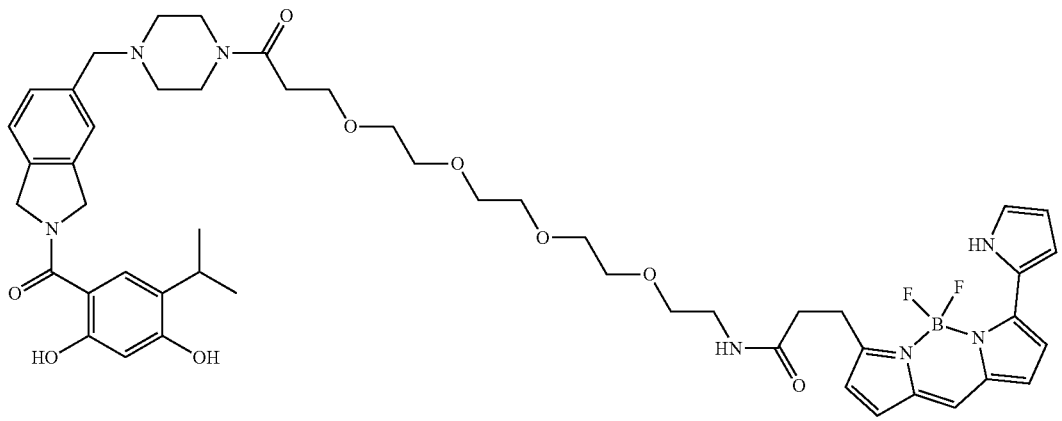

(2,4-dihydroxy-5-isopropylphenyl)(5-(piperazin-1-ylmethyl)isoindolin-2-yl)methanone hydrochloride (5.0 mg, 0.012 mmol) was charged into a 5 mL amber vial and was treated with DMF (0.5 mL). To the mixture was added N,N-diisopropylethylamine (8.1 μL, 0.046 mmol) and the resulting solution was stirred for 5 min. NanoBRET® 590 PEG-O4-SE (8.6 mg, 0.013 mmol) was dissolved in 0.5 mL DMF and was added to the reaction mixture using an additional 2×0.5 mL portions of DMF to quantitatively transfer the reactive dye. The reaction mixture was capped and allowed to stir for 2 h in the dark, diluted with 1:1:0.01 acetonitrile, water, TFA and was subjected to reverse-phase preparative HPLC purification using Standard Method 1. Product containing fractions were pooled and concentrated under reduced pressure to give a purple film that was dissolved in acetonitrile (10 mL) and concentrated to dryness in triplicate to remove spurious trifluoracetic acid. The resulting residue was dried under high vacuum to give the product (4.8 mg, 43.6%) as a purple solid.

MS (ESI, m/z) calcd. for $C_{50}H_{63}BF_2N_7O_9$ $[M+H]^+$: 954.5, found 954.6.

Example 12—3-(5,5-Difluoro-7-(1H-pyrrol-2-yl)-5H-5λ⁴,6λ⁴-dipyrrolo[1,2-c:2',1'-f][1,3,2] diazaborinin-3-yl)-N-(4-(4-((2-(2,4-dihydroxy-5-isopropylbenzoyl)isoindolin-5-yl)methyl)piperazin-1-yl)-4-oxobutyl)propanamide

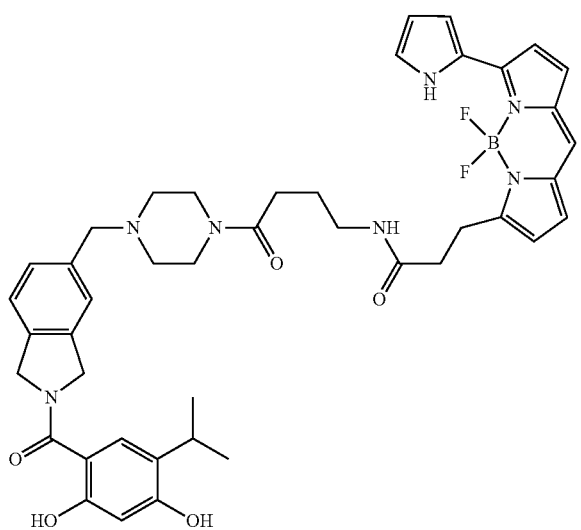

(2,4-dihydroxy-5-isopropylphenyl)(5-(piperazin-1-ylmethyl)isoindolin-2-yl)methanone hydrochloride (5.0 mg, 0.012 mmol) was charged into a 5 mL amber vial and DMF (1 mL) was added. To the mixture was added N,N-diisopropylethylamine (20.2 µL, 0.116 mmol) and stirring was continued for 5 min. NanoBRET® 590-C4-SE (8.9 mg, 0.017 mmol) was added, the vial was capped and allowed to stir for 2 h in the dark. The mixture was diluted with 1:1:0.01 acetonitrile, water, TFA and was subjected to reverse-phase preparative HPLC purification using Standard Method 1. Product containing fractions were pooled and concentrated under reduced pressure to give a purple film that was dissolved in acetonitrile (10 mL) and concentrated to dryness in triplicate to remove spurious trifluoroacetic acid. The resulting residue was dried under high vacuum to give the product (2.3 mg, 24.7%) as a purple solid.

MS (ESI, m/z) calcd. for $C_{43}H_{49}BF_2N_7O_5$ [M+H]⁺: 792.4, found 792.5.

Preparation of Intermediates

Figure 2:
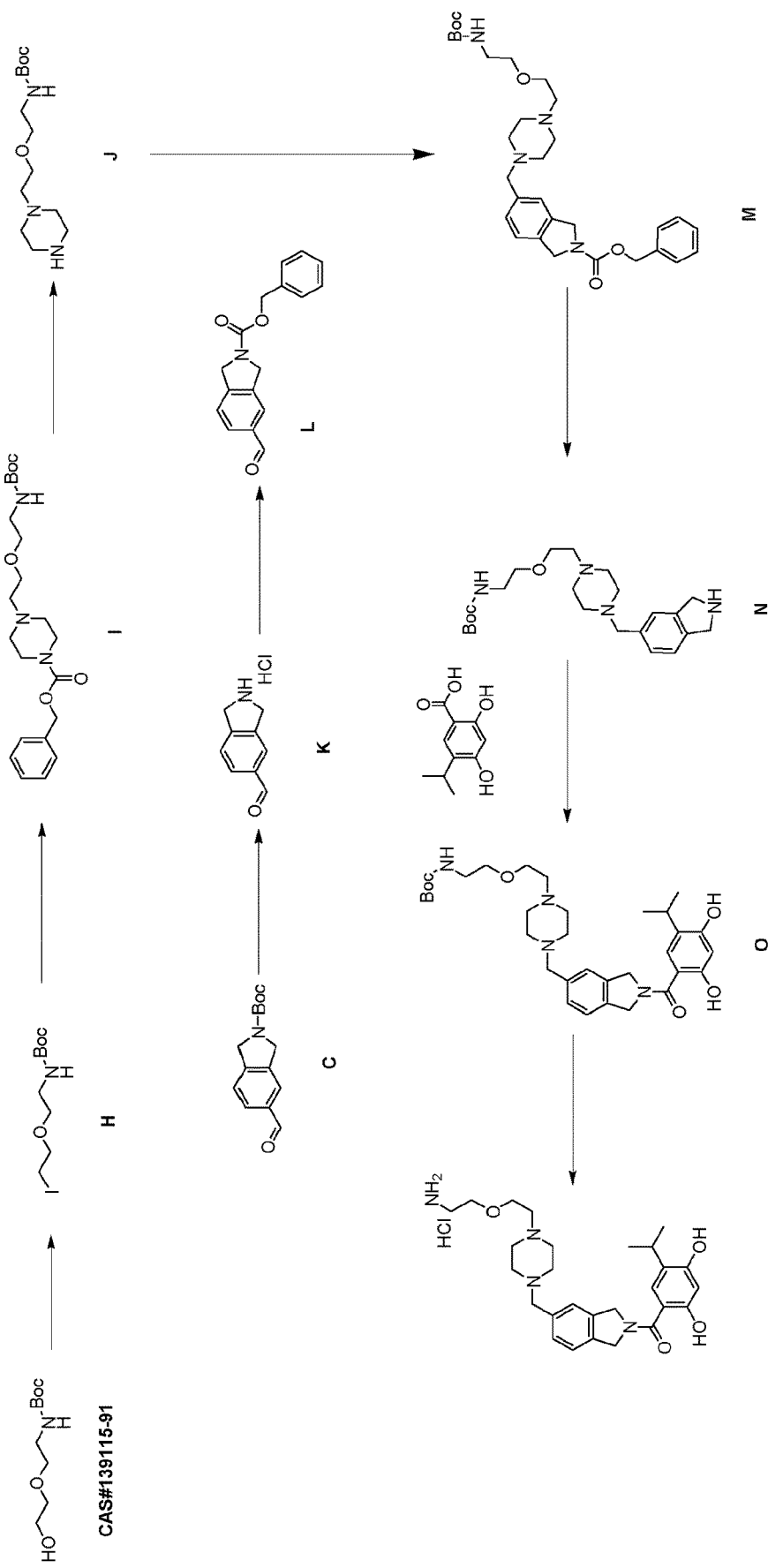
FIG. 2 shows a synthetic scheme for the preparation of (5-((4-(2-(2-aminoethoxy)ethyl)piperazin-1-yl)methyl)isoindolin-2-yl)(2,4-dihydroxy-5-isopropylphenyl)methanone hydrochloride.

Preparation of (5-((4-(2-(2-aminoethoxy)ethyl)piperazin-1-yl)methyl)isoindolin-2-yl)(2,4-dihydroxy-5-isopropylphenyl)methanone hydrochloride (FIG. 2)

Tert-butyl (2-(2-iodoethoxy)ethyl)carbamate (H)

To a solution of tert-butyl (2-(2-hydroxyethoxy) ethyl) carbamate (CAS #139115-91-6) (5.2 g, 25.36 mmol) in DCM (60 mL) at room temperature was added triphenyl phosphine (7.98 g, 30.43 mmol) and imidazole (0.569 g, 8.36 mmole). The reaction mixture was cooled to 0° C. Iodine (8.36 g, 32.92 mmol) was added portion-wise to the reaction mixture at 0° C. The reaction mixture was slowly warmed to room temperature and stirred for 20 h. The reaction mixture was poured into water (100 mL) and extracted with DCM (3×50 mL). The combined organic layer was dried over sodium sulphate, filtered and concentrated under reduce pressure. The crude material was added diethyl ether (100 mL) and the resulting precipitate was filtered and washed with diethyl ether (3×50 mL). The combined filtrate was concentrated under reduced pressure and the crude material was purified by column chromatography (silica gel, eluting with 20% (v/v) ethyl acetate in hexane) yielding tert-butyl (2-(2-iodoethoxy)ethyl)carbamate (H) as a colorless oil. (7.8 g, 98%).

LCMS (Method B): 2.254 min, MS: ES+ 316.13 (M+1); ¹H NMR (DMSO-d⁶, 400 MHz): δ 1.36 (s, 9H), 3.04-3.08 (m, 2H), 3.30 (t, J=6.4 Hz, 2H), 3.40 (t, J=6.4 Hz, 2H), 3.62 (t, J=6.4 Hz, 2H), 6.08 (s, 1H).

Benzyl 4-(2-(2-((tert-butoxycarbonyl)amino)ethoxy)ethyl)piperazine-1-carboxylate (I)

To a solution of tert-butyl (2-(2-iodoethoxy)ethyl)carbamate (H) (2.0 g, 6.35 mmol) and benzyl piperazine-1-carboxylate (CAS #31166-44-6) (1.25 g, 5.72 mmol) in acetone (20 mL) were added $K_2CO_3$ (2.45 g, 17.75 mmole) and NaI (0.38 g, 2.54 mmol) at room temperature. The reaction mixture was heated at 70° C. for 16 h. The reaction mixture was concentrated under vacuum, diluted with water (100 mL) and extracted with ethyl acetate (3×100 mL). The combined organic layer was dried over anhydrous sodium sulphate, filtered and concentrated under vacuum; the crude material was purified by flash chromatography (silica gel, eluting with 2.5% (v/v) MeOH in DCM) yielding benzyl 4-(2-(2-((tert-butoxycarbonyl)amino) ethoxy)ethyl)piperazine-1-carboxylate (I) as a yellow oil (2.0 g, 77%).

LCMS (Method A): 1.640 min, MS: ES+ 408.32 (M+1); ¹H NMR (DMSO-d⁶, 400 MHz): δ 1.35 (s, 9H), 2.38 (t, J=4.8 Hz, 4H), 2.44-2.47 (m, 2H), 3.02-3.06 (m, 2H), 3.33-3.36 (m, 6H), 3.48 (t, J=5.6 Hz, 2H), 5.06 (s, 2H), 6.80 (t, J=5.2 Hz, 1H), 7.29-7.39 (m, 5H).

Tert-butyl (2-(2-(piperazin-1-yl)ethoxy)ethyl)carbamate (J)

To a mixture of benzyl 4-(2-(2-((tert-butoxycarbonyl) amino)ethoxy)ethyl)piperazine-1-carboxylate (I) (1.5 g, 3.68 mmol) and acetic acid (0.23 mL, 4.03 mmol) in MeOH (7 mL) was added 10% Pd(OH)₂ on carbon (0.45 g) at room temperature. The reaction mixture was bubbled with H₂(g) for 4 h. The reaction mixture was filtered through a celite bed, washed with MeOH (2×10 mL) and the combined filtrate concentrated under vacuum followed by lyophilization yielding tert-butyl (2-(2-(piperazin-1-yl)ethoxy)ethyl) carbamate (J) as an oil (0.971 g, 96%). This material was used in the next step without further purification.

¹H NMR (DMSO-d⁶, 400 MHz): δ 1.36 (s, 9H), 2.39-2.42 (m, 6H), 2.71 (t, J=4.8 Hz, 4H), 3.02-3.06 (m, 2H), 3.34 (t, J=6.0 Hz, 2H), 3.45 (t, J=5.6 Hz, 2H), 5.76 (s, 1H), 6.80 (t, J=5.2 Hz, 1H).

Isoindoline-5-carbaldehyde hydrochloride (K)

4M HCl in dioxane solution (20 mL) was added dropwise to a solution of tert-butyl 5-formylisoindoline-2-carboxylate (C) (1.3 g, 5.26 mmol) in DCM (20 mL) 0° C. The reaction mixture was slowly warmed to room temperature and stirred for 6 h. The reaction mixture was concentrated under reduce pressure and the crude material purified by triturating with diethyl ether (3×20 mL). The resultant solid material was dried under high vacuum yielding isoindoline-5-carbaldehyde hydrochloride (K) as an off white solid (0.8 g, 83%).

LCMS (Method C): 2.154 min, MS: ES+ 148.18 (M+1); $^1$H NMR (DMSO-d$^6$, 400 MHz) δ 4.57 (d, J=4.0 Hz, 4H), 7.62 (d, J=8.0 Hz, 1H), 7.92 (d, J=7.6 Hz, 2H), 10.21 (s, 1H), 10.63 (s, 1H).

Benzyl 5-formylisoindoline-2-carboxylate (L)

To a solution of isoindoline-5-carbaldehyde hydrochloride (K) (0.8 g, 4.37 mmol) in THF (10 mL) was added TEA (2.30 mL, 13.02 mmol) at room temperature. The reaction mixture was cooled to 0° C. Benzyl chloroformate (0.745 g, 4.38 mmol) was added dropwise to the reaction mixture at 0° C. The reaction mixture was stirred at 0° C. for 30 min. The reaction mixture was concentrated under vacuum, diluted with 2M HCl (10 mL) and extracted with ethyl acetate (3×30 mL). The combined organic layer was washed with water (100 mL), dried over anhydrous sodium sulphate, filtered and concentrated under vacuum. The crude material was purified by column chromatography (silica gel, eluting with 25% (v/v) ethyl acetate in hexane) yielding benzyl 5-formylisoindoline-2-carboxylate (L) as a yellow solid (1.0 g, 82%).

$^1$H NMR (DMSO-d$^6$, 400 MHz) δ 4.72-4.80 (m, 4H), 5.15 (s, 2H), 7.32-7.43 (m, 5H), 7.53-7.58 (m, 1H), 7.84-7.88 (m, 2H), 9.99 (d, J=1.6 Hz, 1H).

Benzyl-5-((4-(2-(2-((tert-butoxycarbonyl)amino) ethoxy)ethyl)piperazin-1-yl)methyl) isoindoline-2-carboxylate (M)

To a solution of benzyl 5-formylisoindoline-2-carboxylate (L) (1.0 g, 3.56 mmol) and acetic acid (0.1 mL) in DCM (20 mL) was added tert-butyl (2-(2-(piperazin-1-yl)ethoxy) ethyl)carbamate (J) (0.971 g, 3.56 mmol) at room temperature. The reaction mixture was stirred at room temperature for 5 h. NaBH(OAc)$_3$ (4.52 g, 21.35 mmol) was added to the reaction mixture and the mixture was stirred at room temperature for 24 h. The reaction mixture poured into sat. aq. NaHCO$_3$ (50 mL) and extracted in DCM (2×150 mL). The combined organic layer was dried over sodium sulphate and concentrated under vacuum; the crude material was purified by flash chromatography (silica gel, eluting with 7% (v/v) MeOH in DCM) yielding benzyl 5-((4-(2-(2-((tert-butoxycarbonyl)amino)ethoxy)ethyl) piperazin-1-yl)methyl)isoindoline-2-carboxylate (M) as a brown oil (0.9 g, 48%).

LCMS (Method C): 4.34 min, MS: ES+ 539.64 (M+1); $^1$H NMR (DMSO-d$^6$, 400 MHz): δ 1.34 (s, 9H), 2.32-2.43 (m, 8H), 3.02-3.04 (m, 2H), 3.31-3.34 (m, 2H), 3.42-3.46 (m, 4H), 4.48-4.49 (m, 1H), 5.22 (t, J=5.6 Hz, 1H), 4.62-4.68 (m, 4H), 5.14 (s, 2H), 6.72-6.77 (t, J=5.2 Hz, 1H), 7.20-7.42 (m, 8H).

Tert-butyl (2-(2-(4-(isoindolin-5-ylmethyl)piperazin-1-yl)ethoxy)ethyl)carbamate (N)

To a solution of benzyl 5-((4-(2-(2-((tert-butoxycarbonyl) amino)ethoxy)ethyl)piperazin-1-yl)methyl)isoindoline-2-carboxylate (M) (0.1 g, 0.186 mmol) in EtOH (5 mL) was added 10% Pd/C (50% moisture) (0.020 g) at room temperature. The reaction mixture was bubbled with H$_2$(g) for 12 h. The reaction mixture was filtered through a celite bed, washed with MeOH (2×5 mL). The combined filtrate was concentrated under vacuum to give tert-butyl (2-(2-(4-(isoindolin-5-ylmethyl)piperazin-1-yl)ethoxy)ethyl)carbamate (N) as brown oil (0.076 g, 100%). This material was used in the next step without any further purification.

LCMS (Method A): 1.036 min, MS: ES+ 405.32 (M+1)

Tert-butyl (2-(2-(4-((2-(2,4-dihydroxy-5-isopropylbenzoyl)isoindolin-5-yl)methyl)piperazin-1-yl) ethoxy)ethyl) carbamate (O)

To a mixture of tert-butyl (2-(2-(4-(isoindolin-5-ylmethyl)piperazin-1-yl)ethoxy)ethyl) carbamate (N) (0.076 g, 0.187 mmol) and 2,4-dihydroxy-5-isopropylbenzoic acid (0.030 g, 0.153 mmol) in DMF (2 mL) was added N-(3-Dimethylaminopropyl)-N'-ethylcarbodiimide hydrochloride (0.059 g, 0.307 mmol), HOBt (0.020 g, 0.148 mmol) and DIPEA (0.05 mL, 0.305 mmol) at room temperature in a microwave glass tube; the tube was sealed and irradiated under microwave at 120° C. for 1 h. The resulting reaction mixture was poured into ice cold water (20 mL) and extracted in EtOAc (5×30 mL). The combined organic layer was dried over sodium sulphate, filtered and concentrated under vacuum to give crude material which was purified by flash chromatography (silica gel, eluting with 8% (v/v) MeOH in DCM) to yield tert-butyl (2-(2-(4-((2-(2,4-dihydroxy-5-isopropylbenzoyl)isoindolin-5-yl)methyl)piperazin-1-yl)ethoxy)ethyl) carbamate (O) as a brown oil (0.020 g, 18%).

LCMS (Method A): 1.728 min, MS: ES+ 583.5 (M+1); $^1$H NMR (DMSO-d$^6$, 400 MHz): δ 1.12 (d, J=6 Hz, 6H), 1.34 (s, 9H), 2.23-2.33 (m, 10H), 3.04 (s, 4H), 3.46 (s, 4H), 4.75 (s, 4H), 6.39 (s, 1H), 6.78 (br. s, 1H), 7.02 (br. s, 1H), 7.20-7.28 (m, 4H), 9.63 (s, 1H), 10.09 (d, J=24.4 Hz, 1H).

(5-((4-(2-(2-aminoethoxy)ethyl)piperazin-1-yl) methyl)isoindolin-2-yl)(2,4-dihydroxy-5-isopropylphenyl)methanone hydrochloride To a solution of tert-butyl (2-(2-(4-((2-(2,4-dihydroxy-5-isopropylbenzoyl)isoindolin-5-yl)methyl)piperazin-1-yl) ethoxy)ethyl)carbamate (O) (0.015 g, 0.0257 mmol) in DCM (1 mL) was added 4M HCl in Dioxane (0.2 mL) at 0° C. under nitrogen atmosphere. The reaction mixture was stirred at 0° C. for 4 h. The resulting reaction mixture was concentrated under vacuum to give crude material which was triturated with diethyl ether (2×10 mL) and dried under high vacuum yielding (5-((4-(2-(2-aminoethoxy)ethyl)piperazin-1-yl)methyl)isoindolin-2-yl)(2,4-dihydroxy-5-isopropylphenyl)methanone hydrochloride as a brown oil (0.012 g, 90%).

LCMS (Method B): 1.456 min, MS: ES+ 483.5 (M+1); $^1$H NMR (DMSO-d$^6$, 400 MHz): δ 1.12 (d, J=6.8 Hz, 6H), 1.29-1.30 (m, 4H), 2.99-3.07 (m, 4H), 3.25-3.30 (m, 4H), 3.62-3.63 (m, 3H), 3.76-3.77 (m, 2H), 4.32-4.37 (br. s, 2H), 4.75-4.80 (m, 4H), 6.43 (s, 1H), 7.01 (s, 1H), 7.38-7.52 (m, 3H), 8.10 (br. s, 3H), 9.68 (bs, 1H), 10.03 (bs, 1H).

Figure 3:
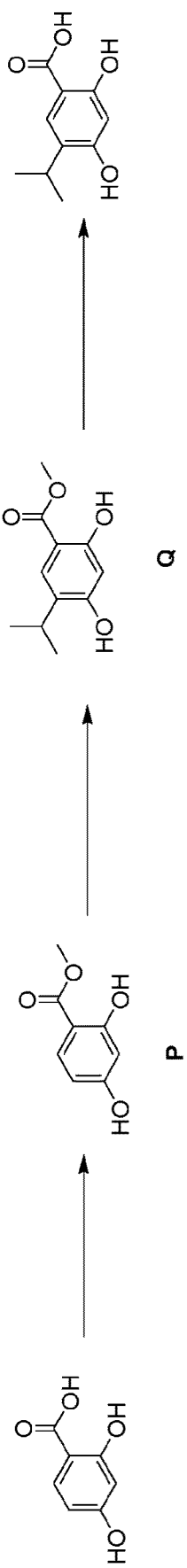
FIG. 3 shows a synthetic scheme for the preparation of 2,4-Dihydroxy-5-isopropylbenzoic acid.

Preparation of 2,4-Dihydroxy-5-isopropylbenzoic acid (FIG. 3)

Methyl 2,4-dihydroxybenzoate (P)

To a stirred solution of 2,4-dihydroxybenzoic acid (100 g, 649.35 mmol) in methanol (400 mL) was added concentrated H$_2$SO$_4$ (50 mL) at room temperature. The reaction mixture was heated to 100° C. and stirred for 12 h. The resulting solution was concentrated under vacuum and poured into water (500 mL). The resulting precipitate was collected by filtration and dried under high vacuum yielding methyl 2,4-dihydroxybenzoate (P) as an off white solid (170 g, 78%). This material was used for the next step without any further purification.

LCMS (Method C): 4.24 min, MS: ES+ 169.19 (M+1); $^1$H NMR (CDC$_3$, 400 MHz) δ 3.39 (s, 3H), 5.72 (br. s, 1H), 6.38-6.42 (m, 2H), 7.74 (d, J=8.8 Hz, 1H), 11.02 (s, 1H).

Methyl 2,4-dihydroxy-5-isopropylbenzoate (Q)

To a solution of methyl 2,4-dihydroxybenzoate (80 g, 475.76 mmol) in DCM (1200 mL) were added anhydrous AlCl$_3$ (126.87 g, 951.48 mmol) followed by isopropyl bromide (351.09 g, 2854.62 mmol added in 3 equal portions (117.03 g each) every 6 h) at 50° C. After completion of the addition of isopropyl bromide, the reaction was heated at 50° C. for 6 h; the total reaction time was 24 h. The reaction mixture was concentrated under vacuum and the crude material diluted with water (1000 mL) and extracted with ethyl acetate (4×500 mL). The combined organic layer was dried over Na$_2$SO$_4$, filtered and concentrated under vacuum. The obtained crude material was purified three times by column chromatography (silica gel, eluting with 3% (v/v) EtOAc in hexane) yielding methyl 2,4-dihydroxy-5-isopropylbenzoate (Q) as yellow solid (25.5 g, 26%).

LCMS (Method A): 2.069 min, MS: ES+ 211.11 (M+1); $^1$H NMR (DMSO, 400 MHz) δ 1.13 (d, J=7.6 Hz, 6H), 3.03-3.16 (m, 1H), 3.83 (s, 3H), 6.35 (s, 1H), 7.49 (s, 1H), 10.48 (s, 1H), 10.57 (s, 1H).

2,4-Dihydroxy-5-isopropylbenzoic acid

To a solution of methyl 2,4-dihydroxy-5-isopropylbenzoate (Q) (23.0 g, 109.40 mmol) in MeOH:Water (2:1, 300 mL) was added NaOH (21.88 g, 547.00 mmol) at room temperature. The reaction mixture was heated to 70° C. for 4 h. The reaction mixture was cooled to room temperature, diluted with ice-cold water (500 mL) and acidified using 1M HCl (pH 5). The resulting precipitates were collected by filtration and dried under high vacuum yielding 2,4-dihydroxy-5-isopropylbenzoic acid as a white solid (13 g, 61%)

LCMS: (Method B) 2.044 min, MS: ES+ 197.22 (M+1); $^1$H NMR (DMSO-d$^6$, 400 MHz): δ 1.02 (d, J=6.8 Hz, 6H), 3.02-3.09 (m, 1H), 6.34 (s, 1H), 7.48 (s, 1H), 10.44 (s, 1H), 11.24 (s, 1H), 13.33 (br. s, 1H).

Figure 4:
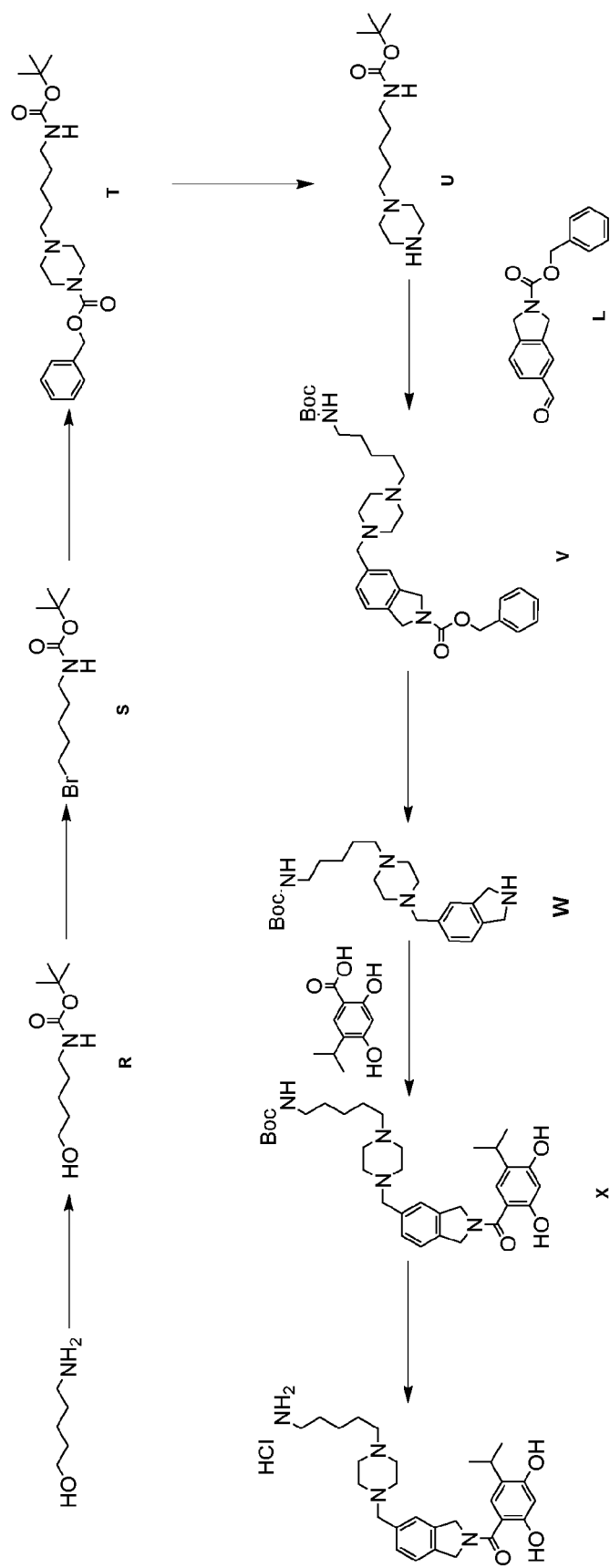
FIG. 4 shows a synthetic scheme for the preparation of (5-((4-(5-aminopentyl)piperazin-1-yl)methyl)isoindolin-2-yl)(2,4-dihydroxy-5-isopropylphenyl)methanone.

Preparation of (5-((4-(5-aminopentyl)piperazin-1-yl)methyl)isoindolin-2-yl)(2,4-dihydroxy-5-isopropylphenyl)methanone (FIG. 4)

Tert-butyl (5-hydroxypentyl)carbamate (R)

A mixture of 5-aminopentan-1-ol (CAS #2508-29-4) (5 g, 48.54 mmol) in DCM (50 mL) was cooled to 0° C. Boc anhydride (11.16 mL, 48.46 mmol) was added to the reaction mixture at 0° C. The resulting reaction was warmed to room temperature and stirred for 16 h. The reaction mixture was poured in water (150 mL) and extracted in DCM (2×100 mL). The combined organic layer dried over anhydrous sodium sulphate, filtered and concentrated under vacuum. The obtained crude material was purified by flash chromatography (silica, eluting with 18% (v/v) ethyl acetate in hexane) yielding tert-butyl (5-hydroxypentyl)carbamate (R) as a pale yellow oil (15 g, 76%).

$^1$H NMR (CDCl$_3$, 400 MHz): δ 1.34-1.40 (m, 2H), 1.43 (s, 9H), 1.46-1.51 (m, 2H), 1.54-1.61 (m, 2H), 1.97 (br. s, 1H), 3.10-3.11 (m, 2H), 6.63 (t, J=6.40 Hz, 2H), 4.63 (bs, 1H).

Tert-butyl (5-bromopentyl) carbamate (S)

To a mixture of tert-butyl (5-hydroxypentyl)carbamate (R) (8 g, 39.41 mmol) in THF (80 mL) were added triphenyl phosphine (15.48 g, 59.11 mmol) and CBr$_4$ (19.60 g, 59.11 mmol) at 0° C. The resulting reaction mixture was slowly warmed to room temperature and stirred for 16 h. The reaction mixture was poured into water (150 mL) and extracted with ethyl acetate (3×150 mL). The combined organic layer was dried over sodium sulphate, filtered and concentrated under reduce pressure. The crude material was purified by column chromatography (silica gel, eluting with 10% (v/v) ethyl acetate in hexane) yielding tert-butyl (5-bromopentyl) carbamate (S) as a colorless oil. (9 g, 86%).

LCMS (Method A): 2.150 min, MS: ES+ 210.1, 212.1 (M-56); $^1$H NMR (CDCl$_3$, 400 MHz): δ 1.32-1.36 (m, 13H), 1.75-1.79 (m, 2H), 2.88-2.90 (m, 2H), 3.51 (t, J=6.8 Hz, 2H), 6.81 (t, J=5.6 Hz, 1H).

Benzyl 4-(5-((tert-butoxycarbonyl)amino)pentyl)piperazine-1-carboxylate (T)

To a mixture of benzyl piperazine-1-carboxylate (CAS #31166-44-6) (4.135 g, 18.79 mmol) in acetone (50 mL), was added K$_2$CO$_3$ (7.78 g, 56.38 mmol) and NaI (1.40 g, 9.39 mmol) at room temperature. The reaction was stirred at room temperature for 15 min. Tert-butyl(5-bromopentyl) carbamate (S) (5 g, 18.79 mmol) was added to the reaction mixture at room temperature. The reaction mixture was heated at 70° C. for 16 h. The resulting reaction mixture was cooled to room temperature, diluted with water (150 mL) and extracted with ethyl acetate (3×150 mL). The combined organic layer was dried over anhydrous sodium sulphate, filtered and concentrated under vacuum to give crude material that was purified by flash chromatography (silica gel, eluting with 3% (v/v) MeOH in DCM) yielding benzyl 4-(5-((tert-butoxycarbonyl)amino)pentyl)piperazine-1-carboxylate (T) as a brown oil (6.5 g, 85%).

LCMS (Method A): 1.492 min, MS: ES+ 406.42 (M+1); $^1$H NMR (DMSO-d$^6$, 400 MHz): δ 1.21-1.23 (m, 2H), 1.35 (s, 11H), 2.28-2.32 (m, 6H), 2.85-2.90 (m, 2H), 3.32-3.34 (m, 6H), 5.06 (m, 2H), 6.77 (s, 1H), 7.31-7.38 (m, 5H).

Tert-butyl (5-(piperazin-1-yl)pentyl)carbamate (U)

To a solution of benzyl 4-(5-((tert-butoxycarbonyl)amino)pentyl)piperazine-1-carboxylate (T) (6.4 g, 15.80 mmol) in MeOH (70 mL) was added 10% Pd/C (50% moisture) (0.640 g, 10% w/w) at room temperature. The reaction mixture was purged with H$_2$(g) for 5 h. The reaction mixture was filtered through a celite bed, washed with MeOH (2×10 mL) and the combined filtrate concentrated under reduced pressure to give tert-butyl (5-(piperazin-1-yl)pentyl)carbamate (U) as brown oil (4 g, 93%). This material was used for next step without further purification.

MS: ES+ 272.20 (M+1). $^1$H NMR (CDCl$_3$, 400 MHz): δ 1.28-1.35 (m, 2H), 1.43 (s, 9H), 1.43-1.50 (m, 2H), 2.14 (br. s, 3H), 2.29-2.33 (m, 2H), 2.42 (bs, 4H), 2.90-2.92 (m, 3H), 3.10-3.11 (m, 2H), 3.47 (s, 1H), 4.61 (bs, 1H).

Benzyl-5-((4-(5-((tert-butoxycarbonyl)amino)pentyl)piperazin-1-yl)methyl)isoindoline-2-carboxylate (V)

To a mixture of benzyl 5-formylisoindoline-2-carboxylate (L) (1.6 g, 5.69 mmol) and tert-butyl (5-(piperazin-1-yl)pentyl)carbamate (U)(1.54 g, 5.69 mmol) in DCM (50 mL) was added acetic acid (0.2 mL) at room temperature. The reaction mixture was stirred at room temperature for 2 h. The reaction mixture was cooled to 0° C. NaBH(OAc)$_3$ (3.618 g, 17.078 mmol) was added to the reaction mixture at 0° C. The reaction mixture was slowly warmed to room temperature and stirred for 16 h. The reaction mixture poured into water (50 mL) and extracted in DCM (2×150 mL). The combined organic layer was dried over sodium sulphate, filtered and concentrated under vacuum; the crude material was purified by flash chromatography (silica gel, eluting with 3% (v/v) MeOH in DCM) yielding benzyl 5-((4-(5-((tert-butoxycarbonyl)amino)pentyl)piperazin-1-yl)methyl)isoindoline-2-carboxylate (V) as a brown oil (2.2 g, 72%).

LCMS (Method A): 1.552 min, MS: ES+ 537.41 (M+1); $^1$H NMR (DMSO-d$^6$, 400 MHz): δ 1.15-1.23 (m, 2H), 1.36 (s, 11H), 1.51 (br. s, 2H), 1.90 (s, 1H), 2.32-2.39 (m, 2H), 2.88-2.95 (m, 7H), 3.53 (br. s, 2H), 4.63-4.69 (m, 4H), 5.14 (s, 2H), 6.82 (br. s, 1H), 7.23-7.42 (m, 8H), 10.04 (br. s, 1H), 11.99 (br. s, 1H).

Tert-butyl (5-(4-(isoindolin-5-ylmethyl)piperazin-1-yl)pentyl)carbamate (W)

To a solution of benzyl 5-((4-(5-((tert-butoxycarbonyl)amino)pentyl)piperazin-1-yl)methyl)isoindoline-2-carboxylate (V) (2.1 g, 3.92 mmol) in EtOH (60 mL) was added 10% Pd/C (50% moisture) (0.420 g, 20% w/w) at room temperature. The reaction mixture was purged with H$_2$(g) for 5 h. The reaction mixture was filtered through a celite bed, washed with MeOH (2×20 mL) and the combined filtrate concentrated under vacuum to yield tert-butyl (5-(4-(isoindolin-5-ylmethyl)piperazin-1-yl)pentyl)carbamate (W) as brown oil (1.7 g, Quantitative). This material was used without further purification.

LCMS (Method A): 0.757 min, MS: ES+ 403.37 (M+1); $^1$H NMR (DMSO-d$^6$, 400 MHz): δ 1.19-1.22 (m, 2H), 1.36 (s, 13H), 2.19-2.21 (m, 2H), 2.23-2.27 (m, 3H), 2.28-2.32 (m, 3H), 2.86-2.87 (m, 2H), 2.96-2.97 (m, 1H), 3.40-3.43 (m, 4H), 4.32-4.33 (m, 4H), 6.77-6.79 (m, 1H), 7.15-7.29 (m, 3H).

Tert-butyl (5-(4-((2-(2,4-dihydroxy-5-isopropylbenzoyl)isoindolin-5-yl)methyl)piperazin-1-yl)pentyl)carbamate (X)

To a mixture of tert-butyl (5-(4-(isoindolin-5-ylmethyl)piperazin-1-yl)pentyl)carbamate (W) (0.504 g, 1.253 mmol) and 2,4-dihydroxy-5-isopropylbenzoic acid (0.205 g, 1.046 mmol) in DMF (8 mL) were added N-(3-dimethylaminopropyl)-N'-ethylcarbodiimide hydrochloride (0.399 g, 2.081 mmol), HOBt (0.141 g, 1.042 mmol) and DIPEA (0.428 mL, 2.502 mmol) at room temperature in microwave glass tube. The microwave glass tube was sealed and irradiated under microwave at 120° C. for 3 h. The resulting reaction mixture was poured into cold water (50 mL) and extracted in EtOAc (3×50 mL). The combined organic layer was dried over sodium sulphate, filtered and concentrated under vacuum to give crude material (270 mg). 180 mg crude material was purified by HPLC (5 mM Ammonium bicarbonate in water/MeCN). The isolated fractions were lyophilized yielding tert-butyl (5-(4-((2-(2,4-dihydroxy-5-isopropylbenzoyl)isoindolin-5-yl)methyl)piperazin-1-yl)pentyl)carbamate (X) as an off white solid (0.032 g, 5%).

LCMS (Method A): 1.728 min, MS: ES+ 583.5 (M+1); $^1$H NMR (DMSO-d$^6$, 400 MHz): δ 1.12 (d, J=6 Hz, 6H), 1.20-1.23 (m, 4H), 1.34 (s, 9H), 2.33-2.50 (m, 10H), 3.03-3.04 (m, 4H), 3.35-3.46 (m, 4H), 4.74-4.75 (m, 4H), 6.39 (s, 1H), 6.78 (s, 1H), 7.07 (s, 1H), 7.20-7.28 (m, 3H), 9.63 (s, 1H), 10.03-10.09 (d, J=24.4 Hz, 1H).

(5-((4-(5-aminopentyl)piperazin-1-yl)methyl)isoindolin-2-yl)(2,4-dihydroxy-5-isopropylphenyl)methanone To a solution of tert-butyl (5-(4-((2-(2,4-dihydroxy-5-isopropylbenzoyl)isoindolin-5-yl)methyl)piperazin-1-yl)pentyl)carbamate (X) (0.060 g, 0.103 mmol) in DCM (2 mL), was added 4M HCl in dioxane (0.6 mL) at 0° C. The reaction mixture was stirred at 0° C. for 1 h. The resulting reaction mixture was concentrated under vacuum and the crude material was triturated with diethyl ether (2×5 mL). The obtained solid was dried under lyophilization yielding (5-((4-(5-aminopentyl)piperazin-1-yl)methyl)isoindolin-2-yl)(2,4-dihydroxy-5-isopropylphenyl)methanone as a brown sticky solid (0.043 g, 80%).

LCMS (Method B): 1.625 min, MS: ES+ 481.50 (M+1); $^1$H NMR (DMSO-d$^6$, 400 MHz): δ 1.13 (d, J=6.8 Hz, 6H), 1.32-1.34 (m, 2H), 1.52-1.57 (m, 2H), 1.70-1.72 (m, 2H), 2.81-2.83 (m, 2H), 3.20-3.30 (m, 5H), 3.40-3.50 (m, 3H), 4.35 (m, 2H), 4.77-4.80 (m, 4H), 6.45 (s, 1H), 7.02 (s, 1H), 7.40-7.54 (m, 3H), 7.93 (br. s, 3H), 9.68 (bs, 1H), 10.38 (br. s, 1H), 11.78-12.09 (br. s, 2H).

Figure 5:
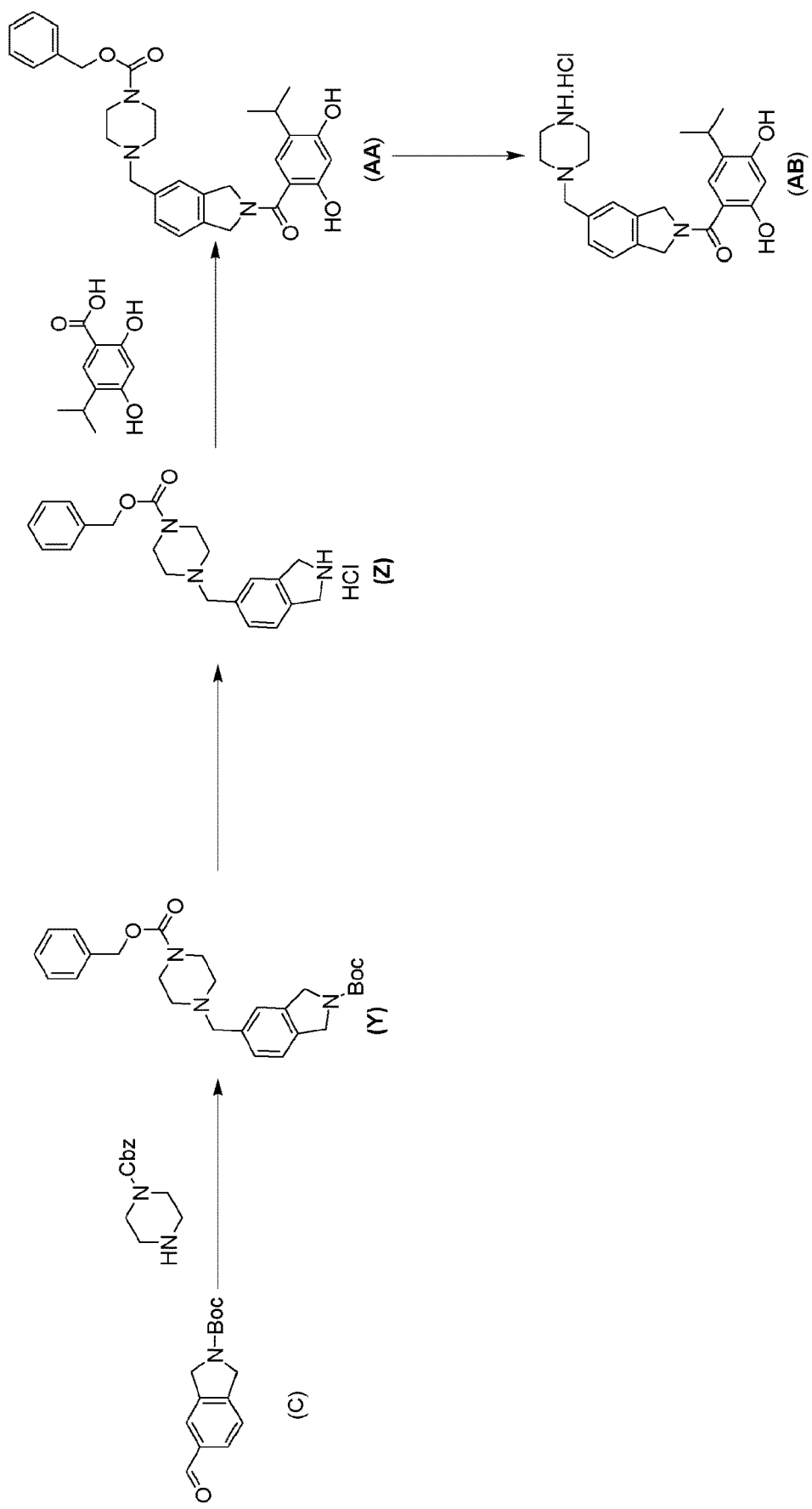
FIG. 5 shows a synthetic scheme for the preparation of benzyl 4-((2-(2,4-dihydroxy-5-isopropylbenzoyl)isoindolin-5-yl)methyl)piperazine-1-carboxylate (AA) and (2,4-dihydroxy-5-isopropylphenyl)(5-(piperazine-1-ylmethyl)isoindolin-2-yl)methanone hydrochloride (AB).
Figure 6:
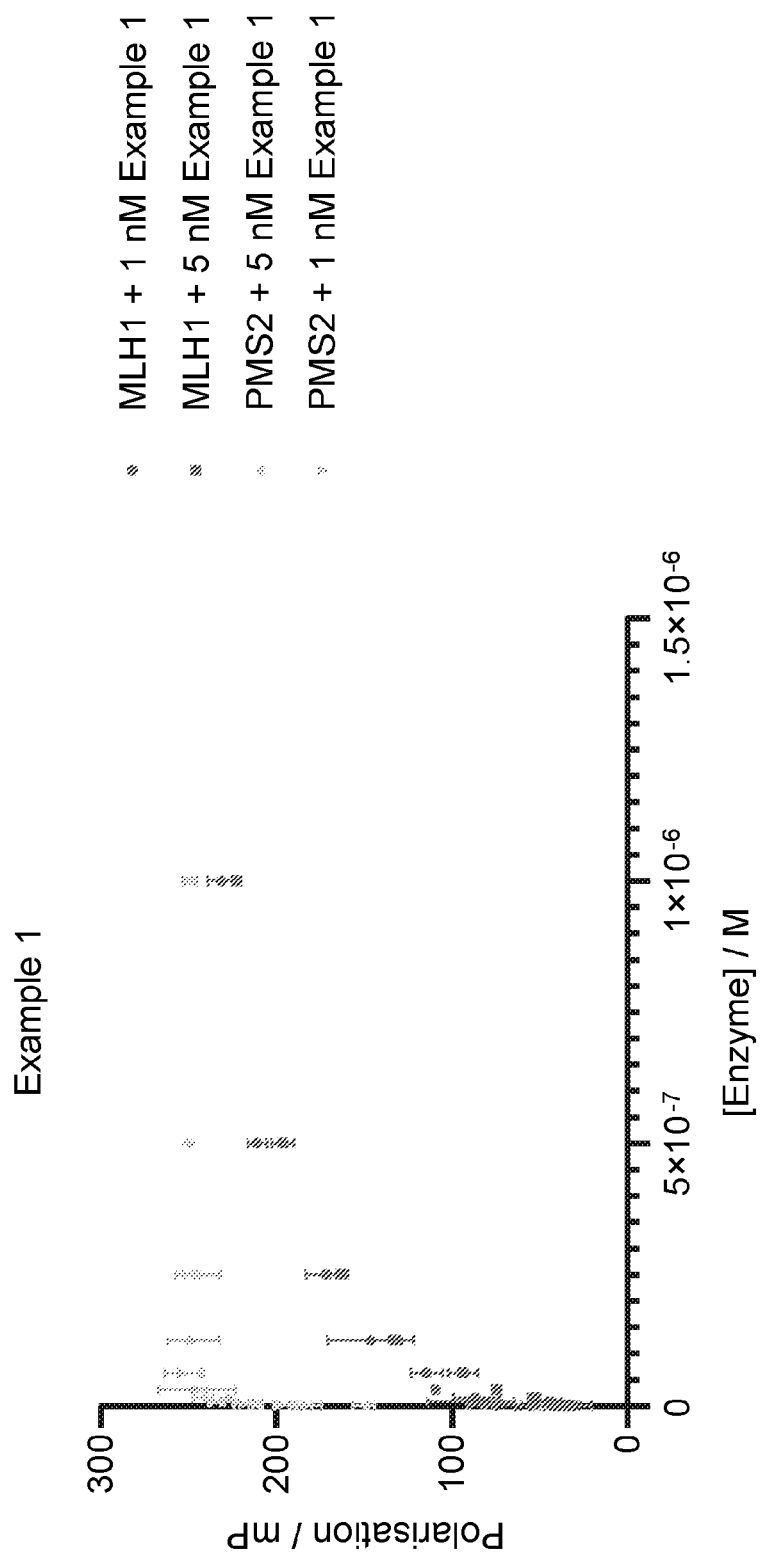
FIG. 6 shows data of Example 1 plotted and analysed in GraphPad Prism 8.1.0.
Figure 7:
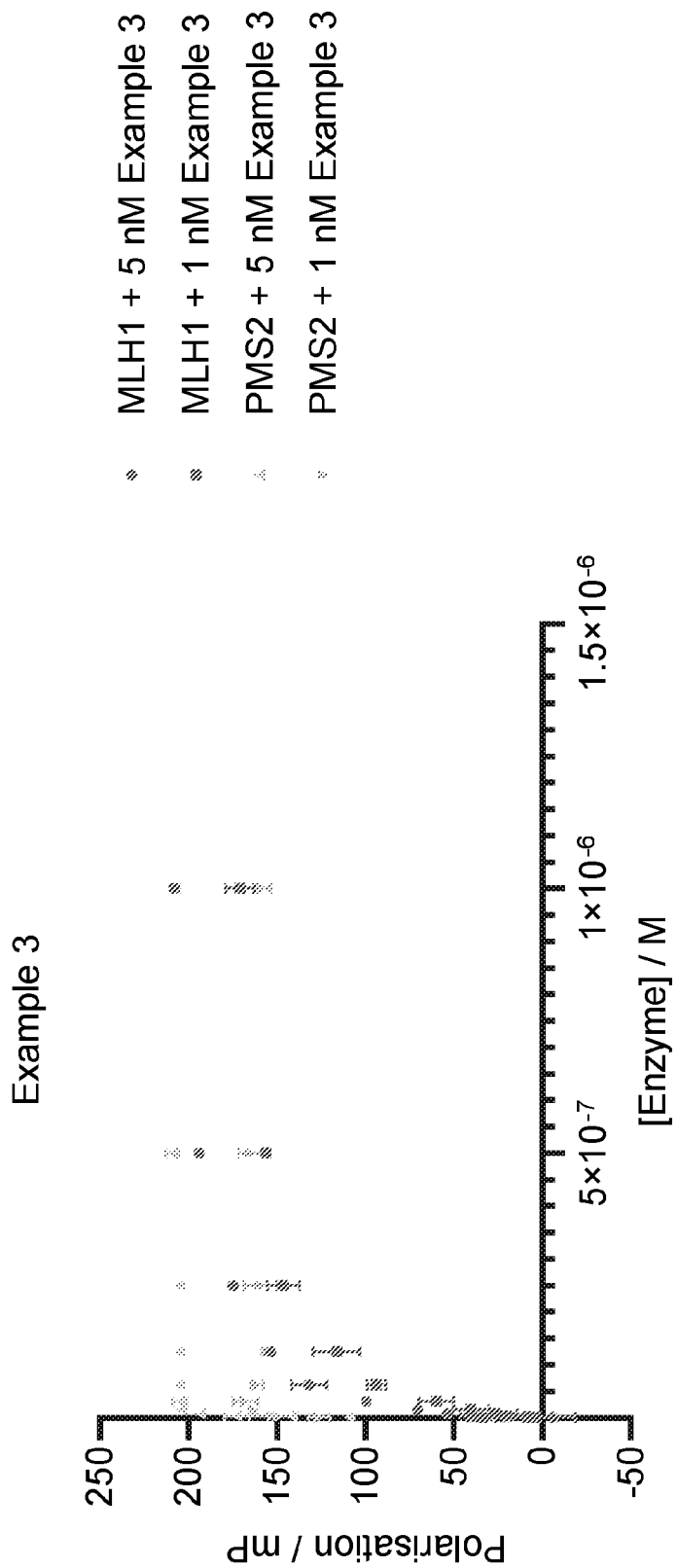
FIG. 7 shows data of Example 3 plotted and analysed in GraphPad Prism 8.1.0.
Figure 8:
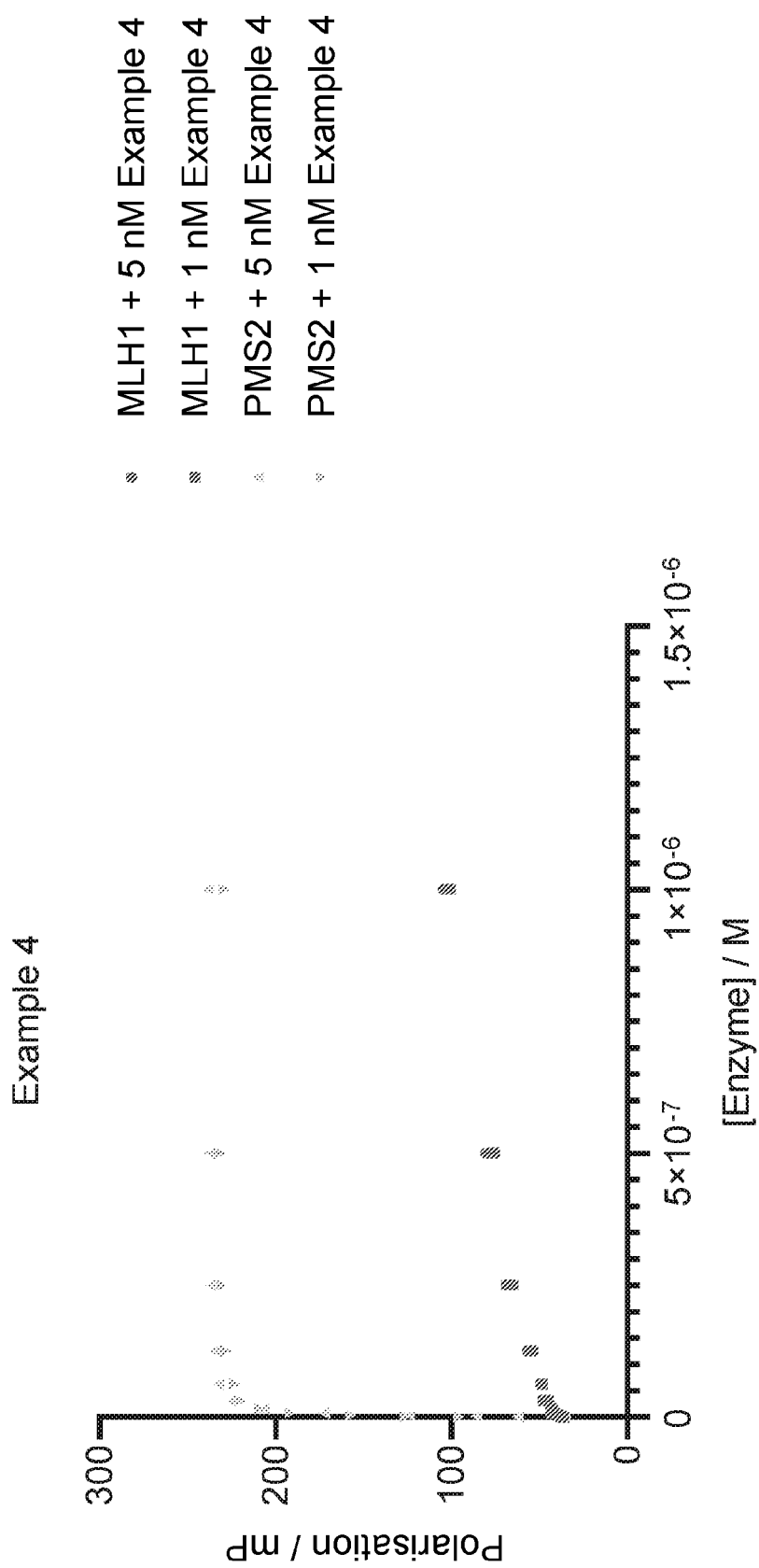
FIG. 8 shows data of Example 4 plotted and analysed in GraphPad Prism 8.1.0.
Figure 9:
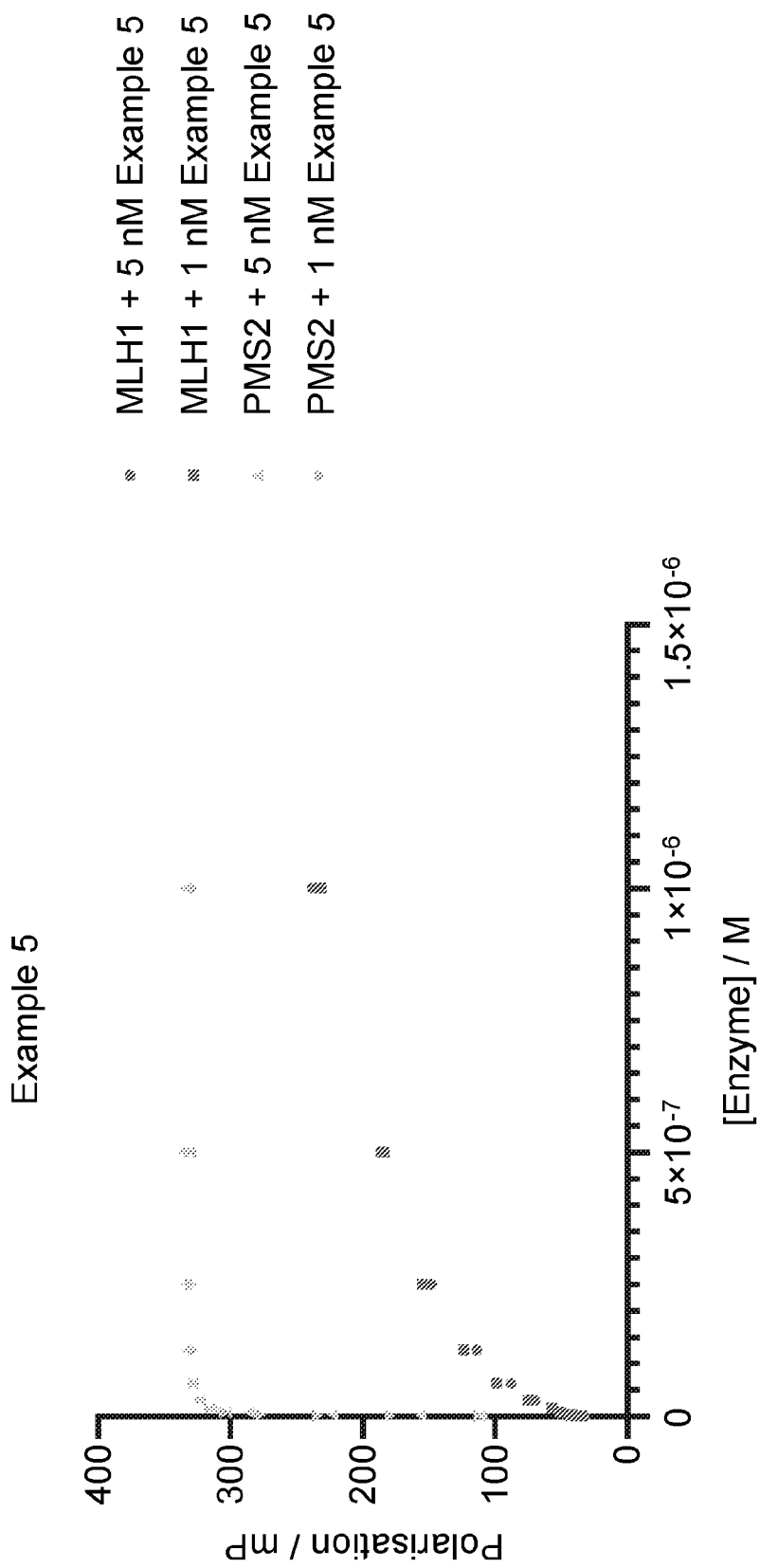
FIG. 9 shows data of Example 5 plotted and analysed in GraphPad Prism 8.1.0.

Preparation of benzyl 4-((2-(2,4-dihydroxy-5-isopropylbenzoyl)isoindolin-5-yl)methyl)piperazine-1-carboxylate (AA) and (2,4-dihydroxy-5-isopropylphenyl)(5-(piperazine-1-ylmethyl)isoindolin-2-yl)methanone hydrochloride (AB) (FIG. 5)

Tert-butyl-5-((4-((benzyloxy)carbonyl)piperazin-1-yl)methyl)isoindoline-2-carboxylate (Y)

A mixture of tert-butyl-5-formylisoindoline-2-carboxylate (C) (see Example-6) (3.0 g, 12.13 mmol) and benzyl piperazine-1-carboxylate (CAS: 31166-44-6) (3.2 g, 14.54 mmol) in MeOH (10 mL) was evaporated to dryness at 40° C. (to remove water of condensation). The residue was dissolved in dichloromethane (50 mL) and evaporated to dryness (to remove traces of methanol); this process was repeated once to complete removal of methanol. The obtained residue was dissolved in DCM (90 mL), placed under a nitrogen atmosphere and cooled to 0° C. NaBH(OAc)$_3$ (3.8 g, 17.93 mmol) was added portion wise to the reaction mixture at 0° C. The reaction mixture was slowly warmed to room temperature and stirred for 16 h. The previous preparation was conducted in 2 parallel batches and the combined reaction mixtures poured into water (200 mL) and extracted in DCM (3×250 mL). The combined organic layer was washed with saturated aqueous sodium bicarbonate solution (2×100 mL) and dried over sodium sulphate, filtered and concentrated under vacuum to give crude material that was purified by flash chromatography (silica gel, eluting with 25% (v/v) EtOAc in n-hexane) yielding tert-butyl 5-((4-((benzyloxy)carbonyl)piperazin-1-yl)methyl)isoindoline-2-carboxylate (Y) as a brown oil (5.0 g, 46%).

LCMS (Method A): 1.631 min, MS: ES+ 452.32 (M+1); $^1$H NMR (DMSO-d$^6$, 400 MHz): δ 1.45 (s, 9H), 2.30-2.33 (m, 4H), 3.33-3.39 (m, 4H), 3.48 (s, 2H), 4.56 (d, J=8.8 Hz, 4H), 5.07 (s, 2H), 7.22-7.37 (m, 8H).

Benzyl 4-(isoindolin-5-ylmethyl)piperazine-1-carboxylate hydrochloride (Z)

To a solution of tert-butyl-5-((4-((benzyloxy)carbonyl)piperazin-1-yl)methyl)isoindoline-2-carboxylate (Y) (1.0 g, 2.21 mmol) in DCM (20 mL) was added 4M HCl in dioxane (5.0 mL) at 0° C. The reaction mixture was stirred at 0° C. for 2 h and then concentrated under vacuum and the crude material triturated with diethyl ether (3×10 mL). The obtained solid was dried under high vacuum yielding benzyl 4-(isoindolin-5-ylmethyl)piperazine-1-carboxylate hydrochloride (Z) as a green solid (0.99 g, quantitative).

LCMS (Method E): 0.865 min, MS: ES+ 352.22 (M+1); $^1$H NMR (DMSO-d$^6$, 400 MHz): δ 3.02-3.04 (m, 2H), 3.26-3.29 (m, 2H), 3.36-3.46 (m, 2H), 3.60-3.62 (m, 4H), 4.06-4.10 (m, 2H), 4.32-4.34 (m, 2H), 4.50-4.52 (m, 4H), 5.11 (s, 2H), 7.32-7.40 (m, 5H), 7.48 (d, J=7.6 Hz, 1H), 7.62 (d, J=8 Hz, 1H), 10.23 (br. s, 2H), 11.71 (br s, 1H).

Benzyl 4-((2-(2,4-dihydroxy-5-isopropylbenzoyl) isoindolin-5-yl)methyl)piperazine-1-carboxylate (AA)

To a mixture of 2,4-dihydroxy-5-isopropylbenzoic acid (0.205 g, 1.046 mmol) in DMF (10 mL) was added N-(3-dimethylaminopropyl)-N'-ethylcarbodiimide hydrochloride (0.97 g, 5.06 mmol), HOBt (0.340 g, 2.51 mmol) and DIPEA (0.65 g, 5.03 mmol) at room temperature in a microwave glass tube. Benzyl-4-(isoindolin-5-ylmethyl) piperazine-1-carboxylate hydrochloride (Z) (0.980 g, 2.52 mmol) was added to the reaction at room temperature. The microwave glass tube was sealed and microwave irradiated at 120° C. for 1 h. The resulting reaction mixture was poured into cold water (60 mL) whereupon a solid material precipitated, isolation and drying under vacuum gave 0.8 g crude material. Purification by flash chromatography (silica gel, eluting with 1.5% (v/v) MeOH in DCM) yielded benzyl 4-((2-(2,4-dihydroxy-5-isopropylbenzoyl)isoindolin-5-yl) methyl)piperazine-1-carboxylate as an off white solid (0.395 g, 30%).

LCMS (Method E): 1.567 min, MS: ES+ 530.22 (M+1); $^1$H NMR (DMSO-d$^6$, 400 MHz): δ 1.10-1.19 (m, 6H), 2.30-2.32 (m, 4H), 3.06-3.13 (m, 1H), 3.39-3.43 (m, 4H), 3.48 (s, 2H), 4.66-4.76 (m, 4H), 5.07 (s, 2H), 6.39 (s, 1H), 7.04 (s, 2H), 7.22-7.28 (m, 2H), 7.30-7.39 (m, 5H), 9.61 (s, 1H), 10.06 (s, 1H).

(2,4-dihydroxy-5-isopropylphenyl)(5-(piperazin-1-ylmethyl)isoindolin-2-yl)methanone hydrochloride (AB)

To a solution of benzyl-4-((2-(2,4-dihydroxy-5-isopropylbenzoyl)isoindolin-5-yl)methyl)-piperazine-1-carboxylate (AB) (0.30 g, 0.56 mmol) in EtOH (20 mL) was added AcOH (0.6 mL) and 10% Pd/C (50% moisture) (0.20 g, 20% w/w) at room temperature. The reaction mixture was cooled to between 10° C. and 15° C. and purged with H$_2$(g) for 2 h. The reaction mixture was filtered through a celite bed, washed with 10% MeOH:DCM (200 mL) to give crude material (0.40 g) which was purified by Prep. HPLC using (0.05% HCl in water and acetonitrile). The obtained fractions were lyophilized yielding (2,4-dihydroxy-5-isopropylphenyl)(5-(piperazin-1-ylmethyl)isoindolin-2-yl)methanone hydrochloride as an off white solid (0.20 g, 82%).

LCMS (Method E): 1.072 min, MS: ES+ 396.27 (M+1); $^1$H NMR (DMSO-d$^6$, 400 MHz): δ 1.12-1.14 (m, 6H), 3.07-3.10 (m, 1H), 3.40-3.47 (m, 8H), 4.36-4.37 (m, 2H), 4.77-4.49 (m, 4H), 6.49 (s, 1H), 7.01 (s, 1H), 7.38-7.59 (m, 3H), 9.73 (s, 1H), 9.92 (s, 1H), 10.05 (s, 1H).

Protein Dependence of Fluorescence Polarisation

An 11 point 1 in 2 serial dilution of protein (either recombinant N-terminal PMS2 (residues 1-365) or recombinant N-terminal MLH1 (residues 15-340)) in assay buffer (25 mM HEPES, pH 7.5, 250 mM NaCl, 10 mM MgCl$_2$, 0.01% Triton X-100, 5 mM Dithiothreitol) was constructed in a clear polypropylene plate (Greiner Bio-One, item number 784201). The top concentration of the serial dilution was 2 µM. The 12$^{th}$ concentration point was buffer only (no protein control).

The serial dilution was used as the 2× protein and 20 µL was added to a Black Fluotrac 200 384-well medium binding plate (Greiner Bio-One, item number 781076). Plates were centrifuged for 1 minute at 250×g and were incubated at room temperature for 30 minutes prior to the addition of 20 µL of 2× (either 5 nM or 2 nM) of probe in assay buffer (prepared from a 100 µM DMSO stock) with a MultiDrop Combi (ThermoFisher).

Compound plates were centrifuged for 1 minute at 250×g for 1 minute and were incubated at room temperature for 1 hour before being read on a PheraStar FSX (fitted with 384-well aperture spoon and appropriate FP module). The gain and focus were adjusted before each plate was read so that the polarisation of the no protein control was equal to 35 mP. Data was plotted and analysed in GraphPad Prism 8.1.0 (FIGS. 6-9).

Assay Protocols

Assay A: Fluorescence Polarisation Assay for MLH1

Test compounds, as 10 mM DMSO stocks, were dispensed into a Black Fluotrac 200 384-well medium binding plate (Greiner Bio-One, item number 781076) using a Labcyte Echo acoustic liquid handler. Test compounds were added to wells in columns 1-22 whilst DMSO was added to wells in columns 23 and 24 in order to normalise the plate. 20 µL of a 2× solution (200 nM) of recombinant N-terminal MLH1 (residues 15-340) in assay buffer (25 mM HEPES, pH 7.5, 250 mM NaCl, 10 mM MgCl$_2$, 0.01% Triton X-100, 5 mM Dithiothreitol) was added to all wells in columns 1-23 and 20 µL assay buffer was added to all wells in column 24 using a MultiDrop Combi (ThermoFisher). Plates were centrifuged for 1 minute at 250×g and were incubated at room temperature for 30 minutes prior to the addition of 20 µL of 2× (10 nM) of 1-(6-((2-(2-(4-((2-(2,4-dihydroxy-5-isopropylbenzoyl)isoindolin-5-yl)methyl)piperazin-1-yl) ethoxy)ethyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium (Example 1) in assay buffer (prepared from a 1 mM DMSO stock) with a MultiDrop Combi (ThermoFisher). The final concentration of N-terminal MLH1 was 100 nM and the final concentration of 1-(6-((2-(2-(4-((2-(2,4-dihydroxy-5-isopropylbenzoyl)isoindolin-5-yl)methyl)piperazin-1-yl)ethoxy)ethyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium (Example 1) was 5 nM. Compound plates were centrifuged for 1 minute at 250×g for 1 minute and were incubated at room temperature for 1 hour before being read on a PheraStar FSX (fitted with 384-well aperture spoon and 590 675 675 FP optic module). The gain and focus were adjusted before each plate was read so that the polarisation of a no enzyme control (column 24) was equal to 35 mP. Data were normalised against the no inhibitor controls (column 23) and no enzyme controls (column 24).

Assay B: Fluorescence Polarisation Assay for MLH1

Test compounds, as 10 mM DMSO stocks, were dispensed into a Black Fluotrac 200 384 well medium binding plate (Greiner Bio-One, item number 781076) using a Labcyte Echo acoustic liquid handler. For single point screening, test compounds were added to wells in columns 1-22 whilst DMSO was added to wells in columns 23 and 24 in order to normalise the plate. For potency determination, serial dilutions of test compounds were added to wells in columns 3-22 and DMSO volume was normalised across the plate.

20 μL of a 2× solution (200 nM) of recombinant N-terminal MLH1 (residues 15-340) in assay buffer (25 mM HEPES, pH 7.5, 250 mM NaCl, 10 mM $MgCl_2$, 0.01% Triton X-100, 5 mM Dithiothreitol) was added to all wells in columns 2-23 for potency determination or columns 1-23 for single point screening. 20 μL assay buffer was added to all wells in columns 1 and 24 (column 24 only for single point screening) using a MultiDrop Combi (ThermoFisher). Plates were centrifuged for 1 minute at 250×g and were incubated at room temperature for 30 minutes prior to the addition of 20 μL of 2× (10 nM) of 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate (Example 5) in assay buffer (prepared from a 100 μM DMSO stock) with a MultiDrop Combi (ThermoFisher). The final concentration of N-terminal MLH1 was 100 nM and the final concentration of 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate (Example 5) was 5 nM.

Compound plates were centrifuged for 1 minute at 250×g and were incubated at room temperature for 15 minutes before being read on a PheraStar FSX (fitted with 384-well aperture spoon and 540 590 590 FP optic module). The gain and focus were adjusted before each plate was read so that the polarisation of a no enzyme control (column 24) was equal to 35 mP. Data were normalised against the no inhibitor controls (column 23) and no enzyme controls (column 24).

Assay C: Fluorescence Polarisation Assay for PMS2

Test compounds, as 10 mM DMSO stocks, were dispensed into a Black Fluotrac 200 384 well medium binding plate (Greiner Bio-One, item number 781076) using a Labcyte Echo acoustic liquid handler. For single point screening, test compounds were added to wells in columns 1-22 whilst DMSO was added to wells in columns 23 and 24 in order to normalise the plate. For potency determination, serial dilutions of test compounds were added to wells in columns 3-22 and DMSO volume was normalised across the plate.

20 μL of a 2× solution (20 nM) of recombinant N-terminal PMS2 (residues 1-365) in assay buffer (25 mM HEPES, pH 7.5, 250 mM NaCl, 10 mM $MgCl_2$, 0.01% Triton X-100, 5 mM Dithiothreitol) was added to all wells in columns 2-23 for potency determination or columns 1-23 for single point screening. 20 μL assay buffer was added to all wells in columns 1 and 24 (column 24 only for single point screening) using a MultiDrop Combi (ThermoFisher). Plates were centrifuged for 1 minute at 250×g and were incubated at room temperature for 30 minutes prior to the addition of 20 μL of 2× (20 nM) of 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate (Example 5) in assay buffer (prepared from a 100 μM DMSO stock) with a MultiDrop Combi (ThermoFisher). The final concentration of N-terminal PMS2 was 10 nM and the final concentration of 5-((5-(4-((2-(2,4-dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate (Example 5) was 5 nM.

Compound plates were centrifuged for 1 minute at 250×g and were incubated at room temperature for 1 hour before being read on a PheraStar FSX (fitted with 384-well aperture spoon and 540 590 590 FP optic module). The gain and focus were adjusted before each plate was read so that the polarisation of a no enzyme control (column 24) was equal to 35 mP. Data were normalised against the no inhibitor controls (column 23) and no enzyme controls (column 24).

Figure 10:
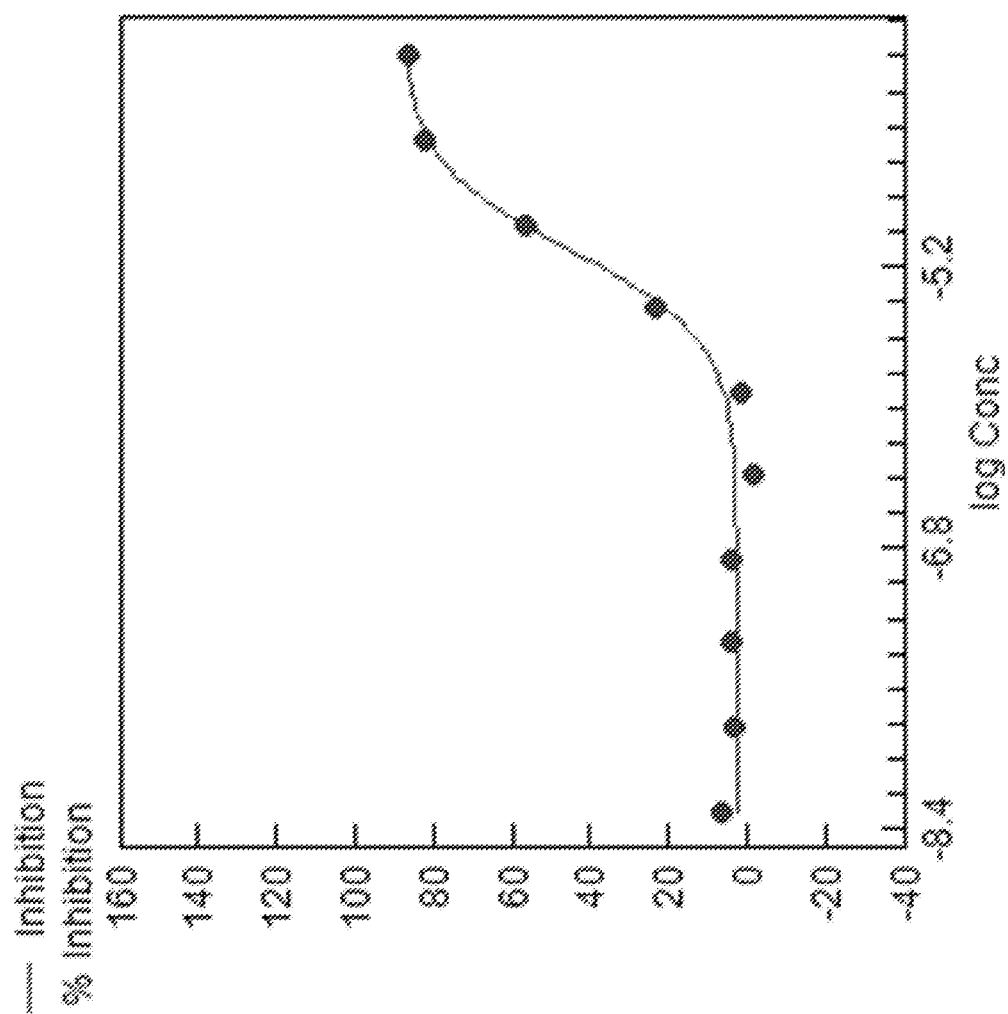
FIG. 10 shows inhibition data for compound AB, the IC$_{50}$ determined using Assay Protocol A.

The above assays can be used to screen for compounds that bind to MLH1 and/or PMS2. For example, the $IC_{50}$ for compound AB is determined as 10.7 μM using Assay Protocol A (FIG. 10); the $IC_{50}$ for compound AB is determined as 0.179 μM using Assay Protocol C, (FIG. 11).

REFERENCES

1. The HSP90 chaperone machinery, F. H. Schopf, M. M. Biebl and J. Buchner, Nat. Rev. Mol. Cell Biol., 2017, 18, 345-360.
2. Mismatch Repair, R. Fishel, J. Biol. Chem., 2015, 290, 44, 26395-26403.
3. DNA Gyrase: structure and function, R. J. Reece and A. Maxwell, Crit. Rev. Biochem. Mol. Biol., 1991, 26, 335-375.
4. GHKL, an emergent ATPase/kinase superfamily, R. Dutta and M. Inouye, Trends Biochem. Sci. 2000, 25, 24-28.
5. Hsp90 inhibitors as anti-cancer agents, from basic discoveries to clinical development, S Soga, S. Akinaga, Y Shiotsu, Curr. Pharm. Des., 2013, 19, 366-76
6. Hsp90 molecular chaperone inhibitors: are we there yet? P. Workman and L. Neckers, Clin. Canc. Res., 2012, 18, 64-76.
7. A fluorescence polarization assay for inhibitors of Hsp90 R. Howes, X. Barrila, B. W. Dymock, K. Grant, C. J. Northfield, A. G. S. Robertson, A. Surgenor, J. Wayne, L. Wright, K. James, T. Matthews, K.-M. Cheung, E. McDonald, P. Workman, M. J. Drysdale; Analytical Biochemistry, 2006, 350, 202-213.
8. Development of a Fluorescence Polarization Assay for the Molecular Chaperone Hsp90. J. Kim, S. Felts, L. Llauger, H. He, H. Huezo, N. Rosen, and G. Chiosis, J. Biomol. Screen, 2004, 9, 375-381.
9. A High-Throughput Fluorescence Polarization Assay for Inhibitors of Gyrase B: B. T. Glaser, J. P. Malerich, S. J. Duellman, J. Fong, C. Hutson, R. M. Fine, B. Keblansky, M. J. Tanga and P. B. Madrid, J. Biomol. Screen., 2011, 16, 230-238.

The invention claimed is:

1. A probe compound of formula I or II, or a salt thereof:

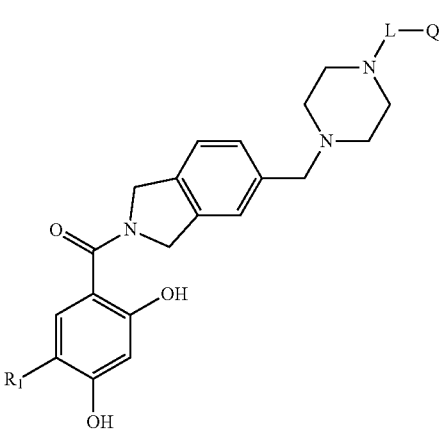

-continued

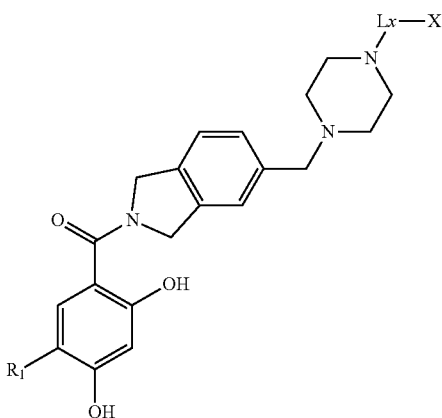

II wherein:
R$_1$ is halo or a (1-6C)alkyl, (3-6C)cycloalkyl or (3-4C)cycloalkyl-(1-2C)alkyl group, each of which is optionally substituted by one or more substituents selected from halo, cyano or hydroxy;
L is a linker having the formula:

-L$_1$-X$_1$-L$_2$-X$_2$-L$_3$- wherein
L$_1$ is absent or a (2-6C)alkylene;
X$_1$ is absent or selected from —O—, —C(O)—, —C(O)NR$_{10}$— or —NR$_{10}$C(O)—;
L$_2$ is a (2-6C)alkylene or a group of the formula —[CH$_2$CH$_2$—O]$_a$—[CH$_2$]$_b$— or —[CH$_2$]—[O—CH$_2$CH$_2$]$_a$—,
wherein a is 2 to 10 and b is 2 to 4;
X$_2$ is absent or selected from —O—, —C(O)—, —C(O)NR$_{10}$— or —NR$_{10}$C(O)—;
L$_3$ is absent or a (2-6C)alkylene;
wherein R$_{10}$ is hydrogen or methyl; and
with the proviso that at least one of X$_1$ or X$_2$ is present;
Q is a fluorophore;
L$_x$ is a (1-3C)alkylene linker; and
X is a functional group selected from halo, N$_3$, or ethynyl (—C≡CH).

2. A probe compound according to claim 1, wherein R$_1$ is halo or a (1-6C)alkyl, (3-4C)cycloalkyl or (3-4C)cycloalkyl-(1-2C)alkyl group, each of which is optionally substituted by one or more halo substituents.

3. A probe compound according to claim 1, wherein R$_1$ is selected from methyl, ethyl, propyl, isopropyl, butyl, sec-butyl, tert-butyl, cyclopropyl, cyclopropylmethyl, cyclobutyl, and trifluoromethyl.

4. A probe compound according to claim 1, wherein R$_1$ is isopropyl.

5. A probe compound according to claim 1, wherein L is a linker having the formula:

-L$_1$-X$_1$-L$_2$-X$_2$-L$_3$- wherein
L$_1$ is a (2-6C)alkylene;
X$_1$ is selected from —O—, —C(O)—, —C(O)NR$_{10}$— or —NR$_{10}$C(O)—;
L$_2$ is a (2-6C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 2 to 10 and b is 2 to 4;
X$_2$ is selected from —O—, —C(O)NR$_{10}$— or —NR$_{10}$C(O)— or a triazole ring;
L$_3$ is absent or a (2-6C)alkylene;
wherein R$_{10}$ is hydrogen or methyl; and
with the proviso that at least one of X$_1$ or X$_2$ is present.

6. A probe compound which is selected from any one of the following:
1-(6-((2-(2-(4-((2-(2,4-Dihydroxy-5-isopropylbenzoyl)isoindolin-5-yl)methyl)piperazin-1-yl)ethoxy)ethyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium;
3-(2-((1E,3E)-5-((Z)-3-(5-((2-(2-(4-((2-(2,4-dihydroxy-5-isopropylbenzoyl)isoindolin-5-yl)methyl)piperazin-1-yl)ethoxy)ethyl)amino)-5-oxopentyl)-3-methyl-5-sulfo-1-(3-sulfopropyl)indolin-2-ylidene)penta-1,3-dien-1-yl)-3,3-dimethyl-5-sulfo-3H-indol-1-ium-1-yl)propane-1-sulfonate;
1-(6-((5-(4-((2-(2,4-Dihydroxy-5-isopropylbenzoyl)isoindolin-5-yl)methyl)piperazin-1-yl)pentyl)amino)-6-oxohexyl)-3,3-dimethyl-2-((1E,3E)-5-((E)-1,3,3-trimethylindolin-2-ylidene)penta-1,3-dien-1-yl)-3H-indol-1-ium formate;
2-((5-(4-((2-(2,4-Dihydroxy-5-isopropylbenzoyl)isoindolin-5-yl)methyl)piperazin-1-yl)pentyl)carbamoyl)-5-(6-hydroxy-3-oxo-3H-xanthen-9-yl)benzoic acid and 5-((5-(4-((2-(2,4-dihydroxy-5-isopropylbenzoyl)isoindolin-5-yl)methyl)piperazin-1-yl)pentyl)carbamoyl)-2-(6-hydroxy-3-oxo-3H-xanthen-9-yl)benzoic acid;
5-((5-(4-((2-(2,4-Dihydroxy-5-isopropylbenzoyl)isoindolin-5-yl)methyl)piperazin-1-yl)pentyl)carbamoyl)-2-(6-(dimethylamino)-3-(dimethyliminio)-3H-xanthen-9-yl)benzoate ammonium;
2,4-Dihydroxy-5-isopropylphenyl)(5-((4-(prop-2-yn-1-yl)piperazin-1-yl)methyl)isoindolin-2-yl)methanone;
3-(5,5-Difluoro-7-(1H-pyrrol-2-yl)-5H-4λ$^4$,5λ$^4$-dipyrrolo[1,2-c:2',1'-f][1,3,2] diazaborinin-3-yl)-N-(5-(4-((2-(2,4-dihydroxy-5-isopropylbenzoyl)isoindolin-5-yl)methyl)piperazin-1-yl)pentyl)propanamide;
1-(3-(5,5-Difluoro-7-(1H-pyrrol-2-yl)-5H-4λ$^4$,5λ$^4$-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)-3,6,9,12-tetraoxapentadecan-15-amide;
4-(3-(5,5-Difluoro-7-(1H-pyrrol-2-yl)-5H-5λ$^4$,6λ$^4$-dipyrrolo[1,2-c:2',1'-f][1,3,2] diazaborinin-3-yl)propanamido)-N-(5-(4-((2-(2,4-dihydroxy-5-isopropylbenzoyl)isoindolin-5-yl)methyl)piperazin-1-yl)pentyl)butanamide;
3-(5,5-Difluoro-7-(1H-pyrrol-2-yl)-5H-4λ$^4$,5λ$^4$-dipyrrolo[1,2-c:2',1'-f][1,3,2] diazaborinin-3-yl)-1-(4-((2-(2,4-dihydroxy-5-isopropylbenzoyl)isoindolin-5-yl)methyl)piperazin-1-yl)propan-1-one;
3-(5,5-Difluoro-7-(1H-pyrrol-2-yl)-5H-4λ$^4$,5λ$^4$-dipyrrolo[1,2-c:2',1'-f][1,3,2] diazaborinin-3-yl)-N-(15-(4-((2-(2,4-dihydroxy-5-isopropylbenzoyl)isoindolin-5-yl)methyl)piperazin-1-yl)-15-oxo-3,6,9,12-tetraoxapentadecyl)propanamide;
3-(5,5-Difluoro-7-(1H-pyrrol-2-yl)-5H-5λ$^4$,6λ$^4$-dipyrrolo[1,2-c:2',1'-f][1,3,2] diazaborinin-3-yl)-N-(4-(4-((2-(2,4-dihydroxy-5-isopropylbenzoyl)isoindolin-5-yl)methyl)piperazin-1-yl)-4-oxobutyl)propanamide;
Tert-butyl (2-(2-(4-((2-(2,4-dihydroxy-5-isopropylbenzoyl)isoindolin-5-yl)methyl)piperazin-1-yl)ethoxy)ethyl)carbamate;
(5-((4-(2-(2-aminoethoxy)ethyl)piperazin-1-yl)methyl)isoindolin-2-yl)(2,4-dihydroxy-5-isopropylphenyl)methanone hydrochloride;

Tert-butyl (5-(4-((2-(2,4-dihydroxy-5-isopropylbenzoyl)isoindolin-5-yl)methyl)piperazin-1-yl)pentyl)carbamate; and (5-((4-(5-aminopentyl)piperazin-1-yl)methyl)isoindolin-2-yl)(2,4-dihydroxy-5-isopropylphenyl)methanone;

or a salt thereof.

7. An assay for determining the binding affinity of a test molecule for the ATP-binding site of a target protein, the assay comprising:
   (i) incubating a test molecule with the target protein in the presence of a probe compound of formula I, or a salt thereof, according to claim 1; and
   (ii) determining whether any probe compound is displaced from the ATP-binding site of the target protein.

8. A method for determining the binding affinity of a test molecule for the ATP-binding site of a target protein, the assay comprising:
   (i) incubating a test molecule with the target protein in the presence of a probe compound of formula I, or a salt thereof, according to claim 1; and
   (ii) determining whether any probe compound is displaced from the ATP-binding site of the target protein.

9. An assay for determining the quantity and location of a target protein in a biological sample, the assay comprising:
   (i) contacting the biological sample with a probe compound of formula I, or a salt thereof, according to claim 1; and
   (ii) determining distribution and quantity of the compound of formula I within the sample by detecting and quantifying the location and distribution of the compound of formula I in the biological sample.

10. An assay for determining the quantity and location of a target protein in a biological sample, the assay comprising:
    (i) contacting the biological sample with a probe compound of formula II, or a salt thereof, according to claim 1;
    (ii) contacting the biological sample with a detection moiety that is capable of reacting with the functional group X present on the compound of formula II to form a compound of formula I according to claim 1 in situ within the biological sample; and
    (iii) determining distribution and quantity of the compound of formula I within the sample by detecting and quantifying the location and distribution of the compound of formula I in the biological sample.

11. An assay according to claim 7, wherein the target protein is MLH1 or PMS2.

12. An assay according to claim 9, wherein the target protein is MLH1 or PMS2.

13. An assay according to claim 10, wherein the target protein is MLH1 or PMS2.

14. A method according to claim 8, wherein the target protein is MLH1 or PMS2.

15. A probe compound according to claim 1, wherein L is a linker having the formula:

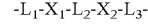

wherein
$L_1$ is a (2-6C)alkylene;
$X_1$ is selected from —O—, —C(O)NR$_{10}$—, or —NR$_{10}$C(O)—;
$L_2$ is a (2-6C)alkylene or a group of the formula —[CH$_2$CH$_2$—O]$_a$—[CH$_2$]$_b$— or —[CH$_2$]$_b$—[O—CH$_2$CH$_2$]$_a$—, wherein a is 2 to 10 and b is 2 to 4;
$X_2$ is selected from —O—, —C(O)NR$_{10}$—, or —NR$_{10}$C(O)—;
$L_3$ is a (2-6C)alkylene;
wherein $R_{10}$ is hydrogen or methyl; and
with the proviso that at least one of $X_1$ or $X_2$ is present.

16. A probe compound according to claim 1, wherein Q is a fluorophore selected from the group consisting of AlexaFluor dyes, Cyanine dyes, fluorescein, BODIPY or BODIPY derivatives, TAMRA, Oregon Green dyes, FITC, Ru(bpy)$_3$, Rhodamine dyes, Acridine orange, and Texas Red.

17. A probe compound according to claim 1, wherein Q is a fluorophore selected from the group consisting of AlexaFluor-647, AlexaFluor-633, AlexaFluor-594, AlexaFluor-488, Cyanine-5B, Cyanine-3B, Fluorescein, BODIPY or BODIPY derivatives, TAMRA, Oregon Green 488, Oregon Green 514, FITC, Ru(bpy)3, Rhodamine dyes, Acridine orange, and Texas Red.

18. A probe compound according to claim 1, wherein X is ethynyl or N$_3$.

* * * * *